(12) United States Patent
Newman et al.

(10) Patent No.: US 12,156,036 B2
(45) Date of Patent: Nov. 26, 2024

(54) SUB-NETWORK TOPOLOGY FOR CYBERSECURE 5G AND 6G COMMUNICATIONS

(71) Applicants: David E. Newman, Poway, CA (US); R. Kemp Massengill, Palos Verdea, CA (US)

(72) Inventors: David E. Newman, Poway, CA (US); R. Kemp Massengill, Palos Verdea, CA (US)

(*) Notice: Subject to any disclaimer, the term of this patent is extended or adjusted under 35 U.S.C. 154(b) by 0 days.

(21) Appl. No.: 18/644,009

(22) Filed: Apr. 23, 2024

(65) Prior Publication Data

US 2024/0314572 A1    Sep. 19, 2024

Related U.S. Application Data

(63) Continuation of application No. 18/497,631, filed on Oct. 30, 2023, now Pat. No. 11,997,498.

(60) Provisional application No. 63/591,038, filed on Oct. 17, 2023, provisional application No. 63/588,678, filed on Oct. 6, 2023, provisional application No. 63/578,649, filed on Aug. 24, 2023.

(51) Int. Cl.
| | | |
|---|---|---|
| H04W 12/71 | (2021.01) | |
| H04W 12/121 | (2021.01) | |
| H04W 24/10 | (2009.01) | |

(52) U.S. Cl.
CPC ......... *H04W 12/71* (2021.01); *H04W 12/121* (2021.01); *H04W 24/10* (2013.01)

(58) Field of Classification Search
CPC .... H04W 12/71; H04W 12/121; H04W 24/10
See application file for complete search history.

(56) References Cited

U.S. PATENT DOCUMENTS

| | | |
|---|---|---|
| 11,470,104 B1 | 10/2022 | Chamorro |
| 11,483,339 B1 | 10/2022 | Kaimal |
| 2015/0370383 A1* | 12/2015 | Oyama .................. G06F 3/0418 345/173 |
| 2016/0330629 A1 | 11/2016 | Laifenfeld |

(Continued)

OTHER PUBLICATIONS

Saad et al., "ScatterEditor: An Eclipse based Tool for Programming, Testing and Managing Wireless Sensor Networks", Oct. 2007, International Conference on Sensor Technologies and Applications, pp. 441-450 (Year: 2007).*

*Primary Examiner* — Kenneth W Chang

(57) ABSTRACT

Cybersecurity is a critical requirement for 5G-Advanced and 6G, in part due to the large attack surface represented by the exponentially increasing number of reduced-capability devices needing wireless service but intensely cost-constrained by their applications. Therefore, disclosed is a network topology that enables an unlimited number of basic sensor/actuator "end devices" to communicate, securely, with a user device of a managed 3GPP-compliant network. The user device or "hub" device serves as both manager and gateway, and more importantly, as a firewall preventing attackers from penetrating the managed network through the end devices. In addition, the end devices can obtain iron-clad protection by booting and operating from ROM only, and transferring only pre-configured replies up to their hub device. The topology enables the hub and end devices to perform the edge work largely autonomously, while insulating the managed network from cyberattacks.

20 Claims, 17 Drawing Sheets

(56) References Cited

U.S. PATENT DOCUMENTS

| | | | |
|---|---|---|---|
| 2017/0171196 A1* | 6/2017 | Britt | H04L 63/0876 |
| 2018/0309619 A1* | 10/2018 | Hall | H04B 1/69 |
| 2019/0253254 A1* | 8/2019 | Brownlee | G06K 19/0725 |
| 2020/0259896 A1* | 8/2020 | Sachs | H04W 56/0065 |
| 2021/0053574 A1 | 2/2021 | Bielby | |
| 2021/0203682 A1 | 7/2021 | Bajpai | |
| 2022/0141004 A1 | 5/2022 | Murray | |
| 2022/0159444 A1 | 5/2022 | Newman | |
| 2022/0240088 A1* | 7/2022 | Nelson | H04W 12/069 |
| 2022/0294789 A1 | 9/2022 | Tikhomirov | |
| 2022/0369112 A1 | 11/2022 | Sharma | |
| 2022/0377560 A1 | 11/2022 | Zeng | |
| 2022/0394032 A1 | 12/2022 | Matsumura | |
| 2022/0394471 A1 | 12/2022 | Zhang | |
| 2022/0400118 A1 | 12/2022 | Jiang | |
| 2023/0022063 A1 | 1/2023 | Zheng | |
| 2023/0254147 A1 | 8/2023 | Huo | |
| 2023/0254294 A1 | 8/2023 | Williams | |
| 2023/0269224 A1 | 8/2023 | Whittle | |

* cited by examiner

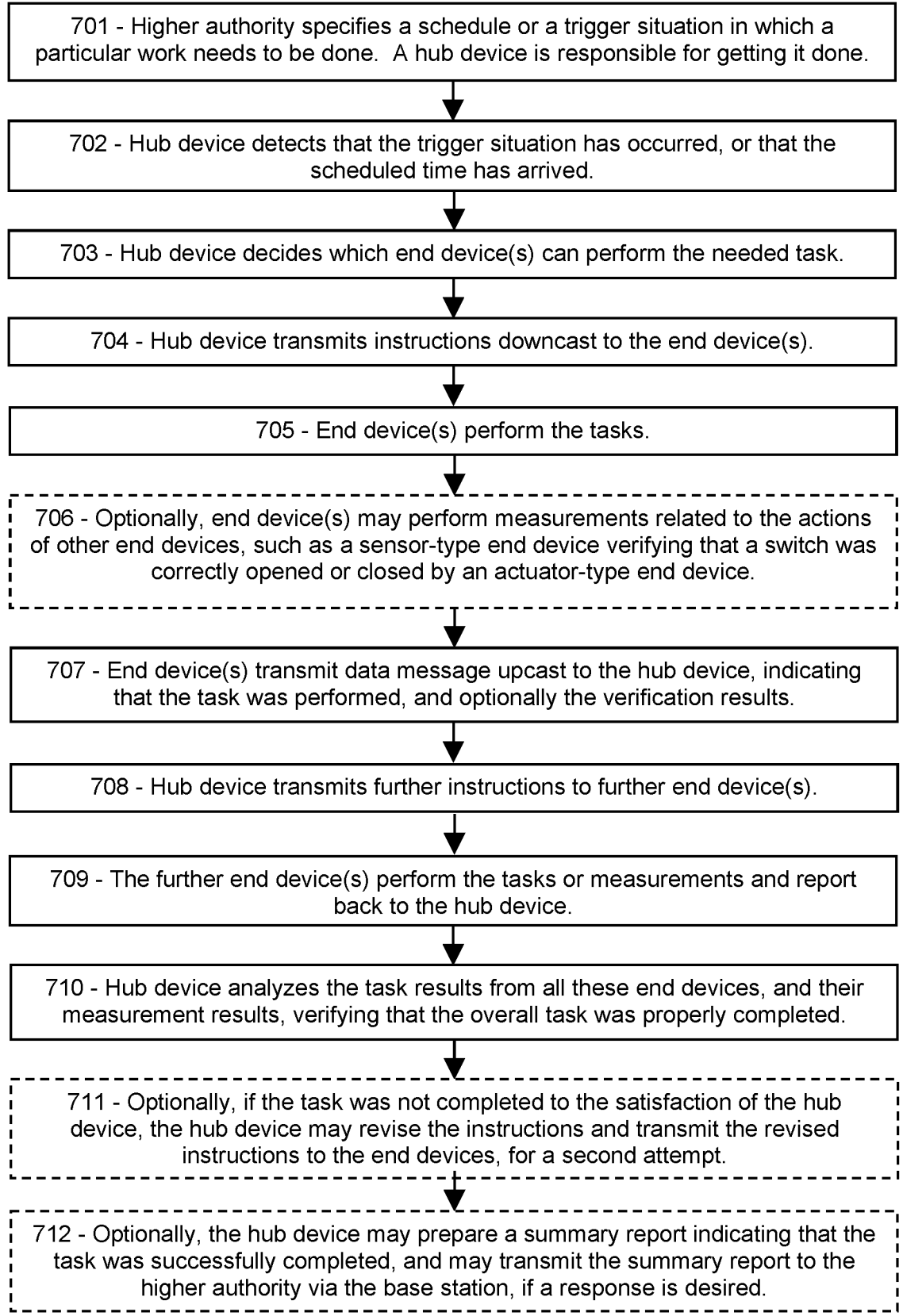

FIG. 8A

| 801 - THREAT TYPES | 802 - SUB-NETWORK SECURITY |
|---|---|
| Arbitrary code execution<br>Advanced persistent threat<br>Zombie (under control of attacker) | The microcontroller cannot execute code from RAM because there is no executable RAM. |
| Backdoor (unsecured access)<br>Rootkits, bootkits | The microcontroller boots from ROM and operates code only from ROM. |
| Polymorphic (hidden in other code)<br>Drive-by download | ROM cannot be altered by wireless signals. |
| Hardware backdoor or circuit flaw<br>Hardware trojan (malware in chip) | Op-code is simple, single-task on ROM. Op-code can be tested. |
| Keyloggers (copy keystrokes) | End device does not have keys. |
| Fraudulent dialers | End device does not have phone access. |
| Privilege escalation | End device does not use privileges. |
| Shellcode (start new command shell) | End device does not use shells. |
| Cryptojacking | End device does not use crypto. |
| Email fraud (fake offers, etc.)<br>Email spoofing (fake return address)<br>Phishing (deception or impersonation) | End device does not have access to email. |
| Screen scraping (collect data from user display) | End device does not have a display. |
| Adware (on-line advertising)<br>Denial-of-service attack (message clogging)<br>Spamming (sending many unwanted messages)<br>Botnet (army of corrupted transmitters) | End device is not on the Internet. |
| Social engineering (trickery, manipulation)<br>Scareware (false alerts, threats) | End device is not in contact with people. |

FIG. 8B

| 811 - THREAT TYPES | 812 - SUB-NETWORK SECURITY |
|---|---|
| Logic bombs (triggered by a condition)<br>Time bombs (triggered by time)<br>Fork bombs (self-replicating code)<br>Zip bombs (intended to crash system)<br>Worms (self-replicating code)<br>Viruses (self-replicating intrusion malware)<br>Code-injection (hiding malware in data) | End device has no executable RAM and no hard-drive.<br>End device has no access to any other system.<br>End device has no 5G or 6G capability.<br>End device has no communication software other than the restricted link to Hub device. |
| Trojan horses (code hidden inside code)<br>Code-injection (hiding malware in data)<br>Ransomware (demanding money) | Hub device interprets all messages as measurement data.<br>Hub device alters all data before passing to base station. |
| Rogue security software | End device does not have security software. Firmware is on ROM. |
| Remote access trojans | End device does not have remote access. |
| Cross-site scripting (inject code into website)<br>Web shells (code using website code) | End device does not have a website. |
| Fake Browser-helpers (DLL objects) | End device does not use DLLs. |

SUB-NETWORK TOPOLOGY FOR CYBERSECURE 5G AND 6G COMMUNICATIONS

PRIORITY CLAIMS AND RELATED APPLICATIONS

This application is a continuation of U.S. patent application Ser. No. 18/497,631, entitled "Cybersecure Low-Complexity IoT Sub-Networks for 5G/6G", filed Oct. 30, 2023, which claims the benefit of U.S. Provisional Patent Application Ser. No. 63/591,038, entitled "Cybersecure Low-Complexity IoT Sub-Networks for 5G/6G", filed Oct. 17, 2023, and U.S. Provisional Patent Application Ser. No. 63/588,678, entitled "Cybersecure Low-Complexity IoT Sub-Networks for 5G/6G", filed Oct. 6, 2023, and U.S. Provisional Patent Application Ser. No. 63/578,649, entitled "Intrinsically-Secure Low-Complexity IoT Sub-Networks for 5G/6G", filed Aug. 24, 2023, all of which are hereby incorporated by reference in their entireties.

FIELD OF THE INVENTION

The disclosure pertains to network architecture, and more particularly to local networks of low-complexity IoT devices.

BACKGROUND OF THE INVENTION

Most wireless devices in future 5G and 6G networks are expected to be low-cost, reduced-capability devices of the IoT (Internet of Things), such as sensors and actuators, configured to perform certain predetermined tasks and communicate infrequently. However, the huge number of IoT devices planned in the coming years may clog the networks and interfere with regular users such as cellphones and Internet users. In addition, current standards are so complex and demanding, many valuable applications involving low-cost, low-complexity devices may be excluded. Of even greater concern, the vast array of IoT devices represent an easily breached attack surface for hackers worldwide. What is needed is means for providing primitive IoT devices with the minimal communications that they need, while avoiding interference with other high-demand users and maintaining the same high level of cybersecurity.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a wireless network comprising a base station in signal communication with a plurality of user devices, wherein: a particular user device of the plurality comprises a hub device of a sub-network, the sub-network comprising a plurality of end devices, each end device comprising a sensor or actuator, and the hub device comprising a gateway device between the end devices and the base station; wherein each end device is configured to communicate wirelessly with the hub device and to avoid communicating with the base station; wherein each end device comprises a read-only memory ("ROM") containing a boot sequence and an operating system, the operating system comprising instructions enabling the end device to perform sensor measurements or actuator actuations, and the boot sequence comprising instructions for restoring the end device to a predetermined state; wherein each end device is configured to execute the boot sequence upon receiving a re-boot instruction from the hub device; and wherein each end device is further configured to transmit a message to the hub device, during or after executing the boot sequence, indicating that the end device is executing or has executed the boot sequence.

In another aspect, there is a wireless network comprising a base station in signal communication with a plurality of user devices, wherein: a particular user device of the plurality of user devices comprises a hub device of a sub-network, the sub-network comprising a plurality of end devices, each end device comprising a sensor or actuator, and the hub device comprising a gateway device between the end devices and the base station; wherein a particular end device of the plurality of end devices is configured to set an actuator to a particular state, of a plurality of predetermined states, and to record the particular state in a "state" memory of the end device; wherein the particular end device is further configured to determine, at a later time, whether the actuator is still set to the particular state; wherein, upon determining that the actuator is still set to the particular state at the later time, the particular end device is configured to do nothing until instructed by the hub device to set the actuator to a different state; and wherein, upon determining that the actuator is set to any state different from the particular state at the later time, the particular end device is configured to transmit a message to the hub device indicating that the actuator has spontaneously changed.

In another aspect, there is a wireless network comprising a base station in signal communication with a plurality of user devices, wherein: a particular user device of the plurality of user devices comprises a hub device of a sub-network, the sub-network comprising a plurality of end devices, each end device comprising a sensor or actuator, the hub device comprising a gateway device between the end devices and the base station; wherein the particular hub device is configured to instruct a particular end device to perform a self-test and then transmit a report message to the hub device indicating a result of the self-test; wherein the hub device is further configured to compare the result of the self-test to a predetermined value, thereby determining whether the result of the self-test is correct; wherein the hub device is further configured to measure an elapsed time between instructing the particular end device to perform the self-test and receiving the report message, and to compare the elapsed time to a predetermined time, thereby determining whether the elapsed time is consistent or inconsistent with the predetermined time; and wherein the hub device is further configured, upon determining that the elapsed time is inconsistent with the predetermined time, to transmit an alarm message to the base station, the alarm message indicating that the particular end device is experiencing either a malfunction or a cyber attack.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 7 is a flowchart showing an exemplary embodiment of a procedure for prompting a sub-network to perform a task with an actuator, according to some embodiments.

FIGS. 8A and 8B are schematics showing an exemplary embodiment of sub-network features that prevent various types of cyber attacks, according to some embodiments.

Like reference numerals refer to like elements throughout.

DETAILED DESCRIPTION

Figure 1:
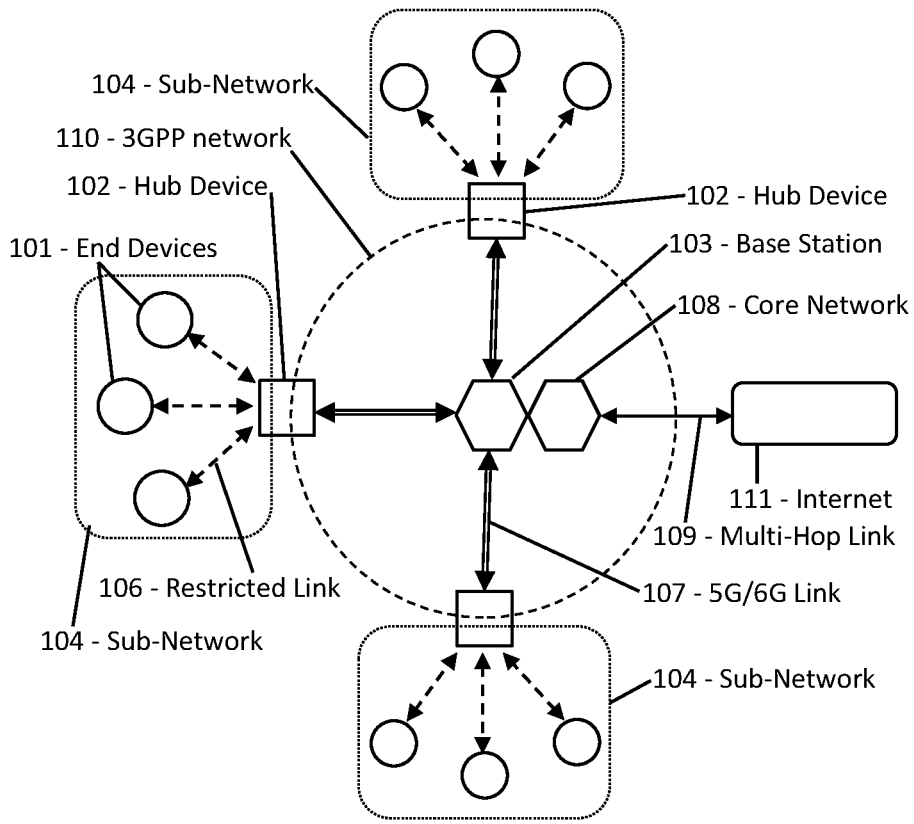
FIG. 1 is a schematic showing an exemplary embodiment of sub-networks connected to a larger managed network, according to some embodiments.

Systems and methods disclosed herein (the "systems" and "methods", also occasionally termed "embodiments" or "arrangements" or "versions" or "examples", generally according to present principles) can provide urgently needed wireless communication protocols to accommodate large numbers of specialized IoT (Internet of Things) devices, efficiently and economically, while avoiding interference with other wireless users, and while retaining the high level of cybersecurity demanded of next-generation communications. Disclosed are examples of "LC-IoT" (low cost, low complexity, low-communication, low-current, low-crosstalk, Internet of things) sub-networks of wireless devices. LC-IoT sub-networks disclosed herein are designed to provide wireless access to reduced-capability devices, such as basic sensors and actuators, connected through a manager/gateway node to a larger network such as a 3GPP (Third-Generation Partnership Project) based network.

Prior-art protocols allegedly designed for reduced-capability IoT devices include NB-IoT (narrow-band IoT), 5G-Light, LTE-M (long-term evolution-machine), eMTC (enhanced machine-type communications), among others; industrial controls such as wireless HART (highway addressable remote transducer), Modbus, IWSN (Industrial/Intelligent wireless sensor network), CAN (controller area network), LIN (local interconnect network), Fieldbus, and others; and non-3GPP protocols such as Wi-Fi, ZigBee, SigFox, Bluetooth, ZeroMQ and others. While these protocols have their place in applications with intermediate-capability devices, many security vulnerabilities remain, and the level of complexity required is still far beyond the capabilities of many low-cost IoT use cases.

Protocols disclosed herein may provide secure communication options that may enable billions of basic, low-cost wireless devices to perform myriad valuable applications, without compromise in cybersecurity. As detailed below, LC-IoT sub-networks may be fully cybersecure, meaning that hackers are physically prevented from breaching the LC-IoT devices, and if they do, they are physically prevented from infecting the manager/gateway node, and if they do, they are physically prevented from infecting the larger network. Embodiments may thereby provide cybersecurity at or above the level of the larger managed networks.

Sub-Network Topology

In some embodiments, the sub-network may be configured in a "hub-and-spoke" or "star" topology, in which a number of IoT "end devices" may communicate exclusively with a single manager/gateway "hub device". For example, the end devices may be basic IoT sensors and actuators, communicating with the hub device, which manages the end devices and receives their data. The hub device may also be a regular member of a larger network, such as a 3GPP-based network or a future non-3GPP network. The hub device may communicate with the base station of the larger network on "managed" channels, in which all communications are scheduled by a base station, on predefined frequencies, according to 5G or 6G standards, for example. The hub device may receive task orders via the base station, and may upload summary reports based on sensor data via the base station.

In some embodiments, the larger network may be managed or directed by a "higher authority" such as a plant operator, or an operations manager, or the owner, or an autonomous entity such as an AI-based controller, or a remote director such as a cloud-based system model. The higher authority may provide general planning and direction to the base station or core network of the 3GPP network, which can then transmit work orders to the hub device. The hub device can then transmit specific task instructions to the end devices, which do the actual work. The end devices can then transmit data or acknowledgements back to the hub, which may may accumulate or process the data and then transmit summary reports to the base station or core network. The base station or core network may then pass occasional status reports up to the higher authority when needed.

In some embodiments, the various tasks and responsibilities may be passed down to the lowest entity capable of doing them. For example, the hub device may be relieved of responsibility for carrying out the actual measurements or pulsing the actuators, because the end devices know exactly how to do it, and the hub device doesn't. The base station and core network of the larger network may be relieved of responsibility for real-time micromanagement of the various sub-networks, because the hub devices are handling all of that autonomously. The higher authority may be relieved of responsibility for routine plant operations that the core network is supervising, and thus may be able to focus on future planning, strategy, policies, external interests, and (hopefully rare) crisis management.

In some embodiments, on the other hand, the higher authority, or its agent in the core network of the larger network, may choose to closely manage the tasks that the sub-networks are to accomplish. In that case, the hub device may serve as a relay between the higher authority (or its agent) and the end devices, with decision-making and planning largely retained by the higher authority or its agent. Even when the higher authority is participating directly in managing the sub-network activities, for security the end devices may be prohibited from communicating directly with the base station or any other entity other than the one hub device that they are assigned to. In addition, all communications to the end devices may be required to pass through the hub device, for further security. With such restrictions on communication, the hub device may serve as a firewall, protecting the larger network from cyber attacks even if an end device were somehow compromised.

In some embodiments, the internal sub-network operations may be configured independently of the type of larger network involved. That is, a pre-configured sub-network may be added to any of a variety of plant-wide networks with little or no modification, as long as the hub device can provide gateway service between the sub-network and the larger network. For example, sub-network protocols may be developed independently of 3GPP standards, so that any sub-network may be readily connected with any of a wide variety of network types, including but not limited to 3GPP networks of various generations, and non-3GPP networks of various types. The hub device may be registered as a regular user of the larger network, and may also include protocols for communicating with its end devices. Usually the sub-network communications, between the hub and end devices, uses much simpler communication techniques than the larger network. Such autonomous sub-networks may then be connected to a variety of types of larger networks as needed, with little or no adaptation of the sub-network, other than registering the hub device as a user device of the larger network. The universality of the sub-network interface may thereby save substantial development costs, especially when diverse applications call for different types of tasks, as listed in examples below.

Restricted Links

In some embodiments, the end devices may communicate with the hub device on "restricted links". A restricted link is a communication channel that provides sufficient connectivity for the end devices to perform all of the tasks that the end device is required to do, and no more. For example, the end devices may be configured to communicate solely with their hub device on the restricted link, and with no other wireless entity. Likewise, the hub device may be configured to communicate with its own end devices on the restricted links, but may be unable to access the end devices of other sub-networks. In addition, communications on the restricted links may be configured to provide only the necessary connectivity. For example, on the restricted links, the hub device may communicate only instructions to the user devices, using predetermined formats for all messages to the end devices. The end devices may be permitted to transmit only data or certain predetermined short messages, such as acknowledgements, to the hub device, on the restricted links. In communicating with the base station, however, the hub device may use the regular managed channels of the larger network, such as the regular PDCCH and PUSCH channels and so forth, of the 5G/6G network, for example.

In some embodiments, each sub-network message may be "unicast" or intended for a single specific entity, such as a specific end device or the hub device. In some embodiments, all the messages may be addressed to the recipient and/or signed by the sender's identification code. In other embodiments, no such identification may be needed since the recipient can determine the sender's identity in some other way, such as by frequency. To clarify the sub-network communications herein, messages from an end device to the hub device are termed "upcast" herein, and messages from the hub to the end devices are "downcast". (This terminology is to contrast with the "uplink" and "downlink" communications of the larger network.)

In some embodiments, all communications on the restricted links may be limited to the specific message types required for the end devices to perform their specific tasks. Each end device may do different tasks, and therefore may use different message types, depending on what communications they need. The restricted link protocols may provide specific immutable forms and formats for each communication between the end devices and the hub device. For example, all messages from the hub to an end device may be in the form of instructions, and configured according to a pre-configured format. All messages from an end device to the hub may be formatted as numerical data or pre-configured replies. In that case, an end device may recognize only certain pre-configured commands in messages from the hub device, rejecting all other communications. Likewise, the hub device may treat all messages from the end devices as raw measurement data, or one of the pre-configured replies, and may reject any other transmissions that fail to comply.

In some embodiments, each end device may be pre-configured to recognize and to transmit only the specific message types that it needs. Alternatively, in other embodiments, each end device may be capable of multiple message types, but may be restricted, by a command from the hub device, to reject all but a few types that are needed for immediate tasks. In some embodiments, those limitations or conventions may be erased each time the end device re-boots; therefore the end devices may be configured to inform the hub device of the current message type restrictions as soon as the end device is finished re-booting, and the hub device may be configured to refresh the restrictions and conventions at that time. Thus the end devices can remain current as to communication options. In addition, an end device that receives a message allegedly from the hub, but using one of the excluded message types, may alert the hub device that a hacker may be involved. In addition, the hub device that receives a message allegedly from one of the end devices, but using an excluded message type, may require the end device to re-boot, or other defensive measure.

In some embodiments, the sub-network may be "closed", whereby each end device and the hub device may reject or ignore all attempts to join the sub-network. An end device receiving such an entry request or illegal communication attempt may transmit an alarm message to the hub device, indicating that a possible cyber attack has been detected. Likewise, the hub device may respond to any entry request or illegal communication attempt on the sub-network frequencies by transmitting an alarm message to the base station. For example, the hub device may ignore or reject any communication not signed by one of the registered end devices, or if it is signed with an incorrect end-device identification code, or is otherwise faulty, even if the message is received on the correct sub-network frequencies, modulation, format, etc. Likewise, the end devices may ignore or reject any communication attempts not signed by their hub device. By restricting the sub-network communications to those pre-configured messages and formats necessary for the end devices to perform their work, and preventing unauthorized entry into the sub-network, the network may obtain greatly enhanced resource efficiency, energy efficiency, and reduced background generation. Even more importantly, the restricted-link protocols may provide cybersecurity equivalent to the 3GPP standards, without the complex security software and complex procedures required for security on the larger network, as detailed below. Thus the closed end devices may serve as a first firewall inhibiting hackers, and the restricted links may serve as a second firewall due to their tightly controlled content, and the hub devices may serve as a third firewall shielding the larger network from attack.

In some embodiments, the restricted links may include predetermined formats for upcast data messages and pre-configured instructions for downcast messages. For example, each downcast message can include an identification code of the intended end device, in which case the end devices can ignore all wireless messages that fail to provide their correct identification code. Each upcast message may also include the transmitting end device's identification, so that the hub device can determine which end device transmitted the message. In some cases, it may be unnecessary to include the hub device's identification code in the messages, since there is only one hub per sub-network. However, if another sub-network comes within radio range, and if it uses some of the same local identification codes as the first sub-network, then an address conflict occurs whenever either sub-network attempts to communicate with one of the local identification codes that they both recognize. To mitigate such address conflicts, the hub device may require that all upcast and downcast messages include both the end device's identification code and the hub device's identification code, thereby resolving the addressing conflict. Other strategies are discussed below.

In some embodiments, a "reserved" interval may be imposed after each downcast message, to allow the recipient end device to acknowledge or reply without contention. However, the reply message must begin within the reserved interval to maintain non-contention status. In addition, the reply message may not need the identification of the replying end device, because that end device is the only one permitted to begin transmitting during the reply interval. For example, responsive to a downcast order for a measurement, the indicated end device may then make its measurement, craft a reply message around the measurement result, and transmit the upcast reply message starting within the reserved interval, while all other end devices are expected to remain silent during the reserved interval to avoid contention. In a similar way, the hub device may reply to an upcast message without contention as long as the reply message starts within the reply interval.

In some embodiments, the sub-network traffic may be so light that a single subcarrier may be sufficient for both upcast and downcast time-spanning messages between the hub device and its end devices. Collision avoidance may be by carrier sensing during an LBT (listen before talk) interval, with a random backoff delay when the subcarrier is found to be busy. In addition, a sufficient reply interval may be imposed after each transmission, to give the recipient time to acknowledge without contention. Emergency messages, such as alarm messages, may be permitted to violate those requirements, for example by transmitting as soon as a previous message is seen to have ended, and/or to repeat an alarm message twice or multiple times, without honoring such a reply interval, to ensure that the alarm is received.

In some embodiments, each end device may be assigned a different subcarrier or frequency, which may be used for both downcast and upcast communications between the hub and that end device. The end device can then recognize that all instructions from the hub device are intended for that end device when they are received on the frequency assigned to the end device. In addition, the hub device can determine which end device is transmitting each upcast message, according to the frequency. In this case, the sub-network messages may not be required to include the end device's or hub device's identification codes, unless another sub-network encroaches and uses the same subcarrier frequencies, in which case the identification codes may be required.

In some embodiments, the hub device may be configured to receive a sufficiently wide bandwidth that all of the individual subcarriers assigned to its end devices are included in the hub device's received bandwidth. In that case, the hub device can receive messages from multiple end devices simultaneously, each upcast message on a different subcarrier frequency, as in the 3GPP network. The hub device can also transmit messages to multiple end devices simultaneously on different frequencies. In some embodiments, crosstalk between subcarrier signals from different end devices can be minimized by selecting the subcarrier frequencies to ensure signal orthogonality between adjacent subcarriers, as in the 3GPP network. In that case the hub device can use the same OFDM signal processing to receive and demodulate the multiple time-spanning sub-network communications on adjacent subcarrier frequencies. The hub device already has such capability because it is needed for receiving the frequency-spanning downlink messages on the 3GPP network. The end devices, on the other hand, have no such capability, nor do they need it, since each end device is restricted to its single assigned subcarrier, in this example.

In some embodiments, on the other hand, certain messages between the end devices and the hub device may occupy multiple subcarriers. For example, upcast messages may be transmitted by the end devices in frequency-spanning OFDM symbols, by which short messages may be contained in a single symbol-time. Downcast messages, from the hub to the end device, may be transmitted time-spanning on a single carrier, to simplify the reception process for primitive IoT receivers. Transmitting frequency-spanning messages may be easier for a reduced-capability end device than receiving them. In that case, the upcast messages may be transmitted frequency-spanning on multiple subcarriers, while the downlink messages may be transmitted time-spanning on a single subcarrier.

In other embodiments, the end devices may be able to process frequency-spanning messages as well, in which case the upcast and downcast messages may both be transmitted frequency-spanning. In some embodiments of OFDM reception by the end devices, protocols for the sub-network frequency-spanning messages may be simpler than the regular 3GPP standards for the larger network. Such a simplification may be necessary to accommodate reduced-capability LP-IoT end devices that do not need the full-performance 3GPP network protocols, yet would benefit from faster OFDM signaling. For example, each resource block may be limited to a smaller number of subcarriers, such as 4 or 8 subcarriers, suitable for low-complexity transmitter and receiver electronics. Optionally, a blank subcarrier may be provided above and below the signal-carrying resource block, to further assist the receiver in separating and demodulating each message element in such an OFDM signal.

In some embodiments, the timing of message symbols in sub-network messages may be slower than in the larger network. For example, a particular sub-network may use symbol-times that are 133 microseconds long, corresponding to 7.5 kHz bandwidth, yet continue to use a 15 kHz frequency separation between subcarriers. While this may seem like "wasting" half of the potential throughput of the medium, it may enable simpler and lower-cost receiver electronics by providing ample sampling time for each waveform, accommodating a larger time and frequency margin due to low-cost low-performance clocks of the end devices, and may also suppress residual inter-subcarrier crosstalk and related frequency-crowding effects that may confuse low-cost receivers.

In some embodiments, the amount of data to be transferred is so low, and the latency demands are so relaxed, that an even narrower bandwidth may be sufficient. For example, an end device that needs to convey just a few bits, on seldom occasions, may find that a single subcarrier at 1 millisecond per symbol, with very low power, fully satisfies its modest communication needs. In such applications, there is no benefit to providing more communication performance than needed.

Restricted links as described, and the other protocols, may prevent an attacker from invading an end device, and if he does, the restricted links can also prevent the attacker from using a compromised end device to propagate the infection to the hub device or to the larger network. Although a determined attacker might succeed in interfering with the operation of a single end device, for example causing it to transmit bogus measurement data, the harm is then limited to the operation of one end device. While annoying, such limited interference is not considered a successful hacking attack because the attacker cannot, in general, use a restricted link to penetrate the 3GPP network by sending bogus measurement data.

ID Codes

In some embodiments, each end device may be configured with a globally unique permanent ID code, such as the 128-bit IPv6 identification, or a longer identification specified in a future "IPv7" standard, or some other standard or convention. For normal usage, however, such a long identification code may be cumbersome. Therefore, a "local" identification code with a smaller number of bits may be assigned to each end device and also to the hub device. For example, the local identification code may have just 4, 6, 8, 12, 16, or 24 bits, or other size depending on how many end devices belong to the sub-network. As long as no conflict is detected between the the local identification codes of the sub-network and those of another sub-network, there should be no confusion. However, if a second sub-network is within radio range of the first sub-network, such that the messages of one sub-network are detectable by the other, then address conflicts may occur if the two sub-networks happen to use the same local identification codes for some of the end devices. Such an address conflict may be detected when the hub device detects a downcast message that includes the local identification code of one of its end devices, yet the hub device did not send that message. Likewise, an end device of one sub-network may detect an upcast message that includes that end device's local identification code, but which the end device did not send. Either event indicates either a cyber attack or an address conflict with another sub-network. When any of those conflicts occur, the hub device has several options, as follows.

In some embodiments, upon detecting an address conflict with another sub-network, the hub device can instruct its end devices to begin using an expanded message format. In a first option, the expanded message format may include switching to a 32-bit local identification code instead of the 8- or 16-bit local identification code. In a second option, each end device and the hub device may have five levels of identification code, such as an 8-bit, 16-bit, 32-bit, 64-bit, and 128-bit code for each device. On command of the hub device, the end devices switch to successively higher levels to avoid address conflicts. If the conflict subsequently subsides (due to motion or termination of the intruding sub-network, for example) the end devices can then switch back down to the shorter local identification codes. In a third option, the hub device can command that each upcast or downcast message will include both the local identification code of the hub device and the local identification code of the end device, further avoiding address conflicts. If conflicts still persist, then the hub device can change its identification code after notifying its end devices. In a fourth option, the conflicting sub-networks may switch to single-subcarrier communication for the entire sub-network, with each sub-network communicating on a different frequency, thereby providing additional segregation by frequency. As a fifth option, in an extreme case of address conflict, the hub device can order its end devices to begin using their unique 128-bit identification codes, and optionally the 128-bit identification code of the hub device as well. This should definitively solve the address conflict problem, but at the expense of slower communications and increased overhead due to the longer codes; however, such extreme conflicts are expected to be extremely rare.

In some embodiments, the various sizes of the identification codes may be uniformly scaled. The scaling factor may be a factor of 2, such as the sequence of: 4, 8, 16, 32, 64, 128 bits per identification code. Alternatively, the scaling factor may be a power of 2, such as 4, resulting in a sequence such as: 8, 32, 128 bits per identification code. Another scaling factor may be chosen depending on the particular implementation. Alternatively, the various sizes of the identification codes may be linearly incremented, as in the sequence: 8, 16, 24, 32, 40, 48, 56 bits per identification code. The particular sizes of identification codes available to the sub-network may be determined by the number of sub-networks connected to the larger network, the spatial density or proximity of the various sub-networks from each other, and/or the number of end devices in each sub-network. In some embodiments, the larger network may assign the local identification codes to the various end devices (communicating exclusively through the hub devices, for security), and may assign those codes to avoid address conflicts between sub-networks that are known to be near each other. In addition, the larger network may assign different local identification codes to the hub devices, for the same reason.

In some embodiments, the sub-network may switch back to the shorter identification codes if the address conflict subsides and is not detected again for a predetermined amount of time. The hub device, or the larger network in communication with the hub device, may determine the amount of time to wait before switching back to the shorter and more efficient local identification codes. The amount of time may be selected according to an average rate of detecting the address conflict when it is present. In that case, an infrequent but persistent conflict would require a longer waiting time to ensure that the problem has really passed, whereas a shorter waiting time may be sufficient for a conflict that occurred frequently and then subsides. For example, the waiting time to switch back to shorter identification codes may be set according to an average interval between conflicts occurring, such as several times that average interval. In addition, if the sub-network reverts to the shorter identification codes and the conflict subsequently returns, then the hub device may decide to lengthen the waiting time farther, to avoid again dropping the long identification codes prematurely. In addition, the hub device may consult with the larger network regarding address conflicts, since the larger network may know when the second sub-network is scheduled to be proximate to the first sub-network and when they are to be beyond radio range. The larger network may also direct that one of the conflicting sub-networks is to use the longer identification codes while a second sub-network may continue to use the shorter identification codes. Such an asymmetric solution may be suitable, for example, when the two sub-networks work on tasks of different urgency or timing requirements. The larger network may keep track of which sub-networks are following which conventions regarding end device identification, and may manage such choices according to priorities of the larger network or the higher authority, for example. An AI model may assist in assigning different sizes of identification codes to the various sub-networks, and other parameters, based for example on the priorities of the tasks performed by each sub-network, the costs associated with conflicted messages, and the throughput requirements, among many other possible inputs.

In some embodiments, the hub device may interpret address conflicts as a possible cyber attack. For example, if the hub device observes that the address conflict persists even when the large globally-unique identification codes are in use, this is a strong indication that an attacker is attempting to emulate one of the end devices or the hub device. In that case, the hub device can take further protective action such as alerting authorities in the larger network, temporarily avoiding any further uplink messages on the larger network, freezing the sub-network operations including end device communications, and/or causing each end device to do a secure re-boot from ROM as detailed below. Optionally, the hub device may re-boot as well. (As used herein, "reset" and "re-boot" are used interchangeably, to indicate when a processor executes an embedded boot sequence which restores the operating system and memory to a previously configured state.)

In some embodiments, the hub device may ask the larger network or the higher authority for assistance upon detecting the first address conflict. For example, instead of switching to longer identifications when an address conflict is detected, the hub device can ask whether another sub-network is within radio range using the same local identification codes. If so, then the hub device can begin using the longer identification codes for disambiguation, or can request that the intruding sub-network do so, or can ask the larger network to mediate between the two competing sub-networks. If, however, there are no other sub-networks with the same end user local identification codes nearby, then the address conflict is likely a cyber attack. In that case, the hub device may order its end devices to re-boot, and may take other defensive measures as described above. An AI model may enable improved detection of hacker signatures. For example, a trained AI model may enable the higher authority to determine whether the unexpected behavior is due to noise, equipment malfunction, or a malevolent attack, for example, based on the type of behavior observed, its frequency of occurrence, and its distribution among multiple end devices or just a single end devices, among other input parameters.

Contention Based

In some embodiments, communications in the sub-network may be contention-based, with an LBT interval before transmitting, and a random backoff delay if another message is detected, as mentioned. The LBT and backoff delay may be at least as long as a reserved acknowledgement interval which is imposed following each message, so that the recipient can acknowledge the message before another one cuts in. However, if the recipient transmits a non-acknowledgement, then another delay, a reserved retransmission interval, may be imposed so that the original sender can begin retransmitting the message, contention-free. In such a priority scheme, an ongoing conversation may have higher priority than new messages; hence the other members of the sub-network remain silent until an acknowledgement is finally detected or a retransmission interval passes unused. For brevity, a positive acknowledgement ACK may be a single bit (that is, a single pulse) transmitted during the reply interval following the message, whereas the non-acknowledgement NACK may be zero bits (no transmission) within the reply interval. If the end device did not receive or recognize the message at all, then of course it would transmit nothing, also indicating a NACK. For this ACK/NACK encoding, there may be no need for a demodulation reference or other calibration before the acknowledgement code, because the difference between zero and one pulse is unambiguous. The retransmission interval is then imposed following zero-pulse NACK, during which the sender can retransmit the message. There is no retransmission interval after an ACK; hence the other members of the sub-network are welcome to begin transmitting (after a random backoff to avoid collisions).

In some embodiments, the random backoff required before initiating a new transmission may be configured to provide higher priority to devices that have been previously blocked from transmitting. For example, the backoff delay may be made longer, on average, before transmitting a new message when the device has not yet been blocked by another transmission, and may be made shorter, on average, upon each instance of being blocked by another transmission. Fairness may be provided thereby, since each device (hub and end device) that was blocked may then be permitted to transmit its message ahead of the others, on average.

In some embodiments, the hub device may have priority over transmissions of the end devices. For example, the hub device may have a shorter backoff time, on average, than the end devices for the initial transmission attempt and shorter backoff delay requirements than the end devices upon each blocked attempt.

In some embodiments, the hub or end device may violate the backoff delay requirement in an emergency. For example, to transmit an alarm or other high-priority message, the device may transmit as soon as the previous message has finished, without waiting for others to transmit an acknowledgement or retransmission. To avoid colliding with the expected acknowledgement or retransmission, the priority device may calculate an expected ending time of another message, based on the form of the other message for example, and may begin transmitting immediately at the time that the earlier message is expected to be finished. In addition, the priority device may transmit noise during the final message elements of the earlier message to ensure that the recipient will reject the collided message, and then may transmit the alarm message without fear of intrusion by another device in the sub-network.

In some embodiments, the hub device may broadcast a message to all of the end devices by providing, as the identification in the broadcast message, a predetermined code that indicates the message is a broadcast message and not a unicast message. The predetermined broadcast identification code may be all-zeros or all-ones or other indicator, thereby indicating that the message is a broadcast message for all of the end devices, not addressed to just one of the end devices. In addition, the all-zeros indicator may indicate that no acknowledgement is needed, whereas the all-ones indicator may indicate that the end devices are requested to acknowledge the broadcast.

In some embodiments, the end devices may acknowledge a broadcast message, when requested, by transmitting a single one-bit pulse at a particular time following the broadcast message, the particular time pre-assigned by the hub. If the end device had trouble receiving the broadcast message, or didn't see it at all, then the end device would remain silent during its reply time. The hub device can then read the series of sequential one-bit pulses following its broadcast message, determining when the pulses and gaps occurred. Based on the positions of the pulses and gaps, the hub device can determine which end devices failed to receive the broadcast. Thus each pulse in the sequence indicates that the associated end device received the broadcast message, and each gap in the sequence of pulses indicates which end device failed to receive the broadcast message. The hub may then send the same information unicast to any end devices that missed the original broadcast, or other action depending on the implementation.

Message Examples

In some embodiments, the hub device can explicitly order each end device to perform its task. For example, the hub device can transmit a predetermined downcast instruction message to the end device, which the end device is configured to interpret by executing predetermined firmware in the end device's memory, which then causes the measurement or actuation to occur. In other embodiments, the end device may initiate the measurement or action itself, such as when certain predetermined conditions are met. For example, the end device may be configured to make a measurement at a pre-scheduled measurement time, or periodically, until instructed to stop. The end device can also be configured to communicate the results to the hub device each time, or it may withhold the results unless certain conditions are met. For example, the end device may be configured to inform the hub device if the measurement result exceeds a threshold, and to remain silent otherwise. Likewise, the end device may be configured to inform the hub device that an attempted actuation fails, or other alarm condition, and otherwise to remain silent. The end device can transmit a message to the hub device in case of any problem in an unsolicited upcast message, which may include the identification code of the end device so the hub device will know which end device is reporting.

In some embodiments, the end device may include pre-configured responses other than numerical values, or both in a combination. For example, a downcast instruction of "change the DRX period to 10 seconds" may elicit the upcast response "done", or "DRX period is now 10 seconds". A downcast instruction of "turn off lights 2 and 3", may get an upcast reply of "light 1 is on, light 2 is off, light 3 is off". A downcast instruction of "report the status of the actuator" may elicit the upcast reply "the actuator is closed" for example. On occasion, it may be necessary for the hub device to provide some kind of data to the end device. In that case, the downcast message may still be configured as a command, such as "change threshold to: 12.3 degrees". (These example messages are shown as readable text for clarity. In a practical sub-network, the messages may be encoded in a terse resource-efficient code, as discussed below.)

In some embodiments, a sub-network may be required to perform tasks that it has not previously performed. For example, the end devices may be capable of doing the new tasks, but require authorization to respond to an associated message format such as a downcast message instructing the end device to do the new task. For example, an actuator may turn a switch on and off on command, but in fact the switch has a third position such as "idle". The end device already has the correct firmware to set the switch to idle, but has not been told to recognize such a command since it was not needed. To solve this, the higher authority may send a message downlink to the hub, requesting that the switch be set to idle when necessary, instead of just on and off. Accordingly, the hub device may inform the end device that the end device is to recognize a new command, "set switch to idle", and to engage the pre-configured firmware in response to that command. Thereafter, the end device can invoke the predetermined firmware regarding the idle state when instructed.

In some embodiments, a hub device may determine, or be told, that a particular tasks is not expected to be needed anymore. The hub device may then instruct the associated end device that the command associated with the task is prohibited until further notice, and is to be ignored. Alternatively, the hub may instruct the end device to flag the prohibited command as a possible cyber attack, if received after being prohibited. After such a prohibition, the end device may then ignore any such command, or may respond with an "illegal command" alarm, or other reaction depending on implementation.

In some embodiments, all of the tasks that a particular end device performs may be no longer necessary. In that case, the hub device may instruct the end device to enter a prolonged DRX or sleep cycle, waking only occasionally to see if the end device is again needed.

In some embodiments, the sub-network communications may occupy frequencies widely separated from those of the larger network, in which case interference with the larger network may be avoided naturally. For example, the larger network may assign a separate frequency range for the sub-networks, widely separated from that used by the larger network. The range assigned to the sub-networks may be the ISM (industrial, scientific, medical) frequencies in the 900 and 2400 MHz regions. In some cases, the hub device may need two antennas to detect the different frequencies of the sub-network and the larger network. In other cases a single antenna may be multi-tuned or sufficiently broadband to operate on both frequency regions.

In some embodiments, the larger network may be responsible for allocating frequencies to its sub-networks and for managing the sub-network policies, but still communicating with the sub-network exclusively through the hub devices. For example, the larger network may require that its sub-networks be synchronized with the larger network. For example, the sub-networks may share the same frame and symbol boundaries as the larger network. The hub device may then provide synchronization pulses and frame timing messages to the end devices, thereby synchronizing all clocks to the larger network.

In some embodiments, the larger network may permit its sub-networks to transmit internal messages (between the hub and end devices) only during certain intervals. For example, the sub-networks may be permitted to transmit only when the larger network is scheduled for uplink communications. This may avoid interfering with communications on the larger network because the sub-network generally uses low power over short distances. However, the uplink communications on the larger network may interfere with the sub-network communications, in which case the hub device may request a different frequency band or other solution.

In some embodiments, the larger network may permit the sub-networks to communicate only during intervals scheduled for downlink communications on the larger network, thereby avoiding the problem of uplink interference on the sub-networks, but trading that for possible interference on the sub-networks due to base station downlink transmissions.

In some embodiments, the larger network may allow the sub-networks to transmit only during unscheduled intervals (that is, intervals when the user devices on the larger network can both transmit and receive messages).

In some embodiments, the larger network may permit the sub-networks to internally transmit only during the guard-space intervals between the symbol-times of the larger network (that is, during the cyclic prefix). In that case, the sub-network communications would be limited to brief time slots much shorter than a symbol-time, which implies a wider bandwidth signal, during the guard spaces of the larger network. Sub-network transmission may interfere with the cyclic prefix of the larger network, but that may be acceptable when the larger network is limited to a small geographical area and propagation times are minimal.

In some embodiments, the larger network may limit the sub-network communications to periods allocated for random access or other grant-free communications on the larger network.

In some embodiments, the larger network may allocate certain intervals for internal sub-network communications, during which the larger network remains silent. However, this may be a high price for a busy 3GPP network. Nevertheless, it may be acceptable if the silent intervals constitute a negligible fraction of the total time, or if the traffic on the larger network is light, or if there are no high-QoS messages on the larger network.

In some embodiments, the hub device can broadcast a message to the end devices indicating when they are permitted to transmit. A compact format may be used to indicate the times of sub-network communications, specified relative to frame or subframe boundaries, for example. Other schema for allocating times and frequencies for sub-network communications, to minimize interference with the larger network, are possible and envisioned.

In some embodiments, each end device can be configured to transmit according to a particular power level, which may be decided according to a planned distance between the end device and the hub device. In some embodiments, the end device transmits at a single pre-configured power level, which may be imposed upon manufacture of the end device or upon installation of the end device within the sub-network.

In some embodiments, each end devices may be capable of adjusting its transmission power to various power levels upon instruction. For example, the hub device may require end devices to change their transmission power level in response to SNR or messaging reliability. For example, the hub device may specify the transmission power level of each end device according to a SNR of upcast messages received by the hub device or a frequency of failed upcast messaging due to noise. To do so, the hub device can transmit a power adjustment message to the end device indicating a particular power level, or an amount of change in the power level relative to a current power level. Alternatively, the hub device may indicate just a direction (increase or decrease) of change, thereby prompting the end device to increase or decrease its power level by a predetermined increment amount, such as 1 dBm or 2% or other increment, and continuing in the same way until the proper power level is achieved. The power adjustment message may be a separate downcast message, or it may be connected with another message such as an acknowledgement message. In a similar fashion, each end device may request that the hub device increase its downcast power levels when the reception of that end device is poor, or may suggest a decrease in downcast power when the received downcast SNR is excessive.

In some embodiments, the larger network may restrict the transmission power used by the sub-networks to avoid interference. For example, the larger network may allow different power levels for the sub-network communications during the intervals scheduled for uplink and downlink. For example, the larger network may permit higher power levels during scheduled uplink intervals and lower power levels during downlink intervals, or vice-versa, to avoid particular patterns of interference noted among the user devices of the larger network. The larger network may permit higher power levels in the sub-networks when traffic on the larger network is relatively light, and may require the sub-network to use less power when traffic on the larger network is heavy. The larger network may demand lower transmission power in the sub-networks after receiving interference complaints from users of the larger network, and may permit higher power levels when no complaints are received for a period of time. Likewise, the larger network may permit higher power limits on the sub-networks after receiving complaints from hub devices that the end devices are experiencing insufficient communication reliability. On the other hand, the base station may reduce the internal sub-network power limits when no such hub device complaints are received for a period of time. In addition, the larger network may impose transmission power limits varying by time-of-day and day-of-week, or other criteria. Since there is only one medium, shared by the larger network and numerous sub-networks, the base station may attempt to balance the power limit allocations to keep all of its constituents happy, or at least functioning adequately. AI may be useful in optimizing such a complex problem involving numerous competing interests.

In some embodiments, a simplified modulation scheme may be used for messages on the restricted links. For example, the sub-network may use phase modulation such as BPSK (binary phase-shift keying), QPSK (quadrature phase-shift keying), or 8PSK, and even higher-order phase modulation if the phase noise can be sufficiently mitigated. In some cases, the sub-networks may use phase modulation schemes with non-power-of-2 number of phase levels (such as 3 or 5 phase modulation levels). The end device, or its hub device, may select the phase modulation scheme, including a number of equally-spaced phase levels, according to a reception reliability criterion. For example, the hub device can select the modulation scheme to optimize messaging throughput, or reliability, or latency among the end devices, in view of the current phase noise. (Fewer phase levels generally result in larger phase-noise margins.) In selecting the modulation scheme, the hub device can prioritize end device reception above hub device reception since hub devices, being fully qualified on the larger network, generally have better receivers than the basic low-cost end devices. Alternatively, the hub device can prioritize hub device reception over the end device reception to reduce the number of upcast retransmissions required. Alternatively, the hub device may use a lower-order modulation scheme for downcast to enhance reliability of reception of the end devices, while the end devices transmit in a higher modulation scheme to optimize upcast throughput, such as BPSK on downcast and QPSK on upcast for example. AI may be useful in selecting the modulation scheme, bandwidths, backoff protocols, and priorities in the sub-network due to the non-linear nature of these decisions under complex messaging scenarios and variable noise/interference conditions.

In some embodiments, the upcast and downcast messages may include a demodulation reference (or "pilot" symbol) proximate to the message. For example, the demodulation reference may be a "short-form" demodulation reference, which exhibits two of the phase levels of the modulation scheme (such as the minimum and maximum phase levels), from which all the other phase levels can be determined by calculation. The receiver can then demodulate the message by comparing the phase value in each message element to the phase levels, selecting the closest match. For example, the hub device or the end device can determine the phase of a received waveform by various analog or digital means (digitizing, mixing with a local oscillator, etc.) and determine the phase of the received waveform without separating the in-phase and quadrature-phase branches. Alternatively, the receiver can separate the I and Q branches, with or without downshifting the frequency, and compare the signs and amplitudes of the branch signals to determine the waveform phase. In some cases, there may be no need for quantitative amplitude measurements, which are generally expensive for end devices. For example, in QPSK with no phase offset (that is, phases of 0, 90, 180, 270 degrees), the various modulation states may be readily discerned without quantitative amplitude measurements by determining which of the I and Q branches has positive, negative, or nearly zero amplitude for each message element, using a threshold criterion or a discriminator circuit, for example. Substantial costs may be avoided by the end devices using such a threshold criterion instead of measuring the value of the amplitude of received signals.

In some embodiments, the sub-network may use amplitude modulation instead of phase modulation, or a combination of amplitude and phase modulation. While some of the examples above specify phase modulation for clarity of explanation, each of the examples may be equally applicable with amplitude modulation or multiplexed amplitude-phase modulation. As mentioned, the hub device may use a different amplitude-phase modulation scheme for downcast and upcast messages, due to the different capabilities of the basic end devices and the more capable hub devices. For example, reduced-capability receivers may struggle to demodulate amplitude levels, but basic transmitters may readily transmit amplitude modulated messages; hence the advantage of tailoring the upcast and downcast modulation and coding scheme according to the capabilities of the end devices.

In some embodiments, the end device can adjust its time-base according to a timestamp point in a short-form demodulation reference from the hub. For example, the timestamp point may be the instant when the phase of the signal changes from a first phase to a second phase. For sharper timing, the short-form demodulation reference may occupy a wider bandwidth, such as three subcarriers, or more subcarriers. For better SNR, the demodulation reference may be extended in time, such as three symbol-times. In other embodiments, the abrupt phase reversal may be between symbol-times, such that a first resource element is transmitted with a first phase and a second resource element is transmitted with a second phase opposite to the first phase. The timestamp point then is the moment of phase reversal. To negate the effects of the limited bandwidth, a known fractional correction to the timing may be applied to the phase reversal detection time. In another embodiment, the receiver may accumulate signal for both symbol-times and adjust the timing until that sum signal averages to zero, due to cancellation of the leading and trailing phase signals before and after the phase reversal. To assist reduced-capability receivers, the transmitter can provide a blank gap between the demodulation reference and the beginning of the message, thereby providing a time sufficient for the receiver to adjust its phase modulation levels and timing according to the demodulation reference, before starting to receive the message itself.

In some embodiments, the end devices may be close enough to the hub device that guard-spaces and cyclic prefixes may not be needed. For example, the transmitter can transmit each message time-spanning on a single subcarrier frequency at low power selected according to the data rate or signal quality required. To receive a time-spanning message on a single subcarrier, the receiver may receive each message element and demodulate it sequentially, in real-time, thereby determining each set of message bits before (or while) receiving the next message element. Real-time demodulation may enable early determination of the destination address, thereby enabling the end device to ignore the remaining message if addressed to a different end device.

In some embodiments, the sub-network subcarriers may have a spacing of 15 or 30 kHz, selected for example to match the 3GPP network, yet the symbol-times may be stretched to provide enhanced SNR and narrower bandwidths. With such a configuration, the signal processing required of the end device's receiver, to demodulate a narrow-bandwidth time-spanning message element, may be greatly simplified since low-cost logic gates may be used for demodulation, instead of expensive high-speed analog/digital components, thereby providing an important cost advantage for many cost-constrained LC-IoT devices. In addition, the ultra-narrow bandwidth of single-carrier sub-network communications may exclude interference due to broadband emissions and unrelated messaging in nearby subcarriers. The ultra-narrow bandwidth may also provide similar savings and simplification for the transmitter, such as economical phase modulation by selecting a pre-configured phase signal using logic gates, as opposed to the complex digital waveform generation required for the large resource blocks and intricate OFDM symbols in frequency-spanning 3GPP communications. For applications in which the cost of the end devices is more important than rapid communications, such savings can be an enabling factor.

Subcarrier Mixing

In some embodiments, the sub-network communications may be configured to occupy two adjacent subcarriers with slightly different frequencies. The transmitter can transmit the message time-spanning on the two subcarriers, with the same data on the two subcarriers but with opposite phases. The receiver can then separate the two signals by analog or digital means using the local oscillator, and can demodulate each signal according to a difference between the modulation states of the two subcarrier signals. The receiver may thereby obtain enhanced SNR since the signals are oppositely modulated. It may be noted that this method produces twice the voltage of a single subcarrier signal, and substantially less noise since most of the noise is generally correlated between the two subcarriers, and therefore cancels in the difference. Therefore, the SNR improvement is at least a factor of 2. In contrast, the SNR improvement obtained by transmitting the same signal on the two subcarriers with the same phase, and then averaging the two separated modulation values, would provide at most $\sqrt{2}$ improvement over a single subcarrier, because the noise present on the two subcarriers would add as well as the signals.

In other embodiments of subcarrier mixing, the transmitter can transmit two signals on adjacent subcarriers, but with a phase difference determined by the bit content of the message. The two subcarriers, received together, generate a characteristic interference pattern that depends on the initial phase difference between the two subcarrier signals. Hence the interference pattern indicates the message bits. More specifically, the phase difference profoundly affects the interference pattern, which the reduced-capability receiver may readily discern, thereby immediately demodulating the message element. The interference pattern is generally in the audio range, which is generally much easier to detect than the high-frequency signals themselves due to the need for expensive fast electronics. Audio-frequency demodulation usually consumes less power, often much less power, than high-speed signal processing electronics. Hence, the receiver may demodulate the message bits based on the interference pattern using low-cost electronics while saving battery life.

In some embodiments of subcarrier mixing, the transmitter may transmit a continuous unmodulated signal at the first subcarrier frequency, starting at a first phase such as zero, and on the second subcarrier, transmit another unmodulated signal at the second subcarrier frequency, but with an initial phase adjusted according to the message bits. The initial phase difference between the two subcarrier signals determines where the interference peaks and valleys occur in the resulting interference pattern. The low-cost receiver can receive the sum of the two subcarrier signals added together, without separating them, and can readily discern the interference pattern in the combined signal, determining where the peaks and valleys occur in each message element. The interference pattern, specifically the locations of the peaks and valleys where the interference changes from constructive to destructive, uniquely determines the message bits encoded in the message element. Thus the initial phase difference between the two subcarrier signals determines the resulting interference pattern, and the receiver can readily determine from the interference pattern what the message bits were. The receiver can thereby demodulate the message based on the interference pattern alone, without expensive high-frequency signal processing.

In some embodiments of subcarrier mixing, the phase difference between the two subcarrier signals may be modulated to encode the message bits according to the four phase levels of QPSK. The receiver then receives the combined signal due to the two subcarrier signals together, without separating them, and readily observes the peaks and valleys in the interference pattern, which determine the encoded bits. Hence the receiver can demodulate the time-spanning message based on the characteristic interference patterns, using just two subcarriers.

In one embodiment of subcarrier mixing, the receiver can rectify the interference signal using, for example, a diode bridge, thereby obtaining a magnitude interference signal. The receiver can then readily observe the shape and position of the interference pattern, and thereby determine the encoded bits. For example, the transmitter can encode two bits in the subcarrier signals by arranging an initial phase difference between the two subcarrier signals at four phase differences, as in QPSK. Due to the rectification step, however, a phase difference of θ degrees is indistinguishable from a phase difference of θ+180 degrees. Therefore the phase difference between the two subcarrier signals may be set by the transmitter at 0, 45, 90, and 135 degrees to encode message bits of 00, 01, 10, and 11 in binary, respectively. Using these four phase differences for modulation, the overall interference envelope shifts to four readily discerned positions in a predetermined way. The receiver can then observe the peak positions in magnitude, and thereby determine the bit content of the message element directly from the interference pattern. For example, suitable rectifier bridges are readily available at negligible cost, and inexpensive low-frequency electronics may be sufficient for the demodulation. The receiver does not need to downshift the frequencies, nor separate the subcarrier signals, nor separate the in-phase and quad-phase branches, nor digitize the fast RF signal. In other words, the receiver can be made cheaper than a conventional receiver that processes each individual high-frequency subcarrier signal, and much cheaper than a receiver adapted to the complex OFDM signals of 3GPP communications. Hence, subcarrier mixing with rectification demodulation may be suitable for LC-IoT receivers.

In another embodiment, the receiver may be configured to determine the sign of the sum-signal instead of the magnitude. With the additional information of the sign, the receiver may demodulate a wider set of the phase differences such as 0, 90, 180, and 270 degrees phase difference. Other versions exist depending on the modulation order. In each case, the message bits are encoded in a phase difference between adjacent subcarrier signals, and are demodulated according to a characteristic shape of the resulting interference pattern, without separating the two subcarrier signals.

An advantage of encoding message bits in a phase difference between adjacent subcarrier signals may be that there may be no need for a demodulation reference (or pilot symbol) because the detected effect—the timing of the interference pattern maxima and minima—is independent of the actual phases of the two signals. The interference pattern depends solely on the initial phase difference, and not the particular phases. Hence, the phase calibration is irrelevant, and no demodulation reference is needed. Another advantage may be that the detected effect may be independent of the amplitudes of the two signals, as long as they are sufficiently similar in amplitude that the maxima and minima in the envelope function can be discerned. Another advantage may be that the detected effect is largely independent of the frequencies of the two signals, as long as they are both mostly within their assigned subcarriers; a small amount of spill-over into adjacent subcarriers would have little or no effect on the demodulation. Another advantage may be that the receiver can demodulate the message without performing high frequency signal processing, nor separating the two subcarrier signals, not digitizing signals at high speed. In fact, it may be sufficient to pass the raw interference signal into a diode bridge with a discriminator, or other simple magnitude detector, to obtain the envelope function, and thereby demodulate each message element. Another advantage may be that phase-difference modulation may be resistant to interference which affects both subcarriers equally, since the demodulation result depends on a relative phase between two closely proximate subcarrier signals. Further exemplary material is provided in figures below.

Intelligent End Devices

In some embodiments, a first end device may seek to transmit information to a second end device of the same sub-network. The first end device can transmit the information to the hub, which can then send it to the second end device in downcast. In some embodiments, however, a more direct communication between the end devices may be permitted within a particular sub-network. Direct communication between the end devices may enable operational efficiency and sharp timing, which is sometimes needed to catch transient phenomena by both end devices, especially when the hub device is busy conversing with the larger network.

In other embodiments, direct communication between the end devices may be forbidden, for security reasons. Generally, the hub device may be expected to know what its end devices are doing, and can manage the actions and timing accordingly. With such management by the hub devices, each end device may be configured to perform only its basic function, while the hub device determines which information is to be transferred to which other end device and when each action is to be taken. For example, the hub device may instruct a first end device to close a valve, then receive a valve closure confirmation from a first end device, and the hub can then transmit a downcast instruction to the second end device instructing it to reduce a heater power or other action. It is a matter of implementation whether the end devices possess some discretion or choice as to what actions to take, or whether they are basic sensor/actuator tools responding deterministically to hub instructions. It is a matter of implementation whether the end devices can communicate directly with each other. For simplicity and security, in some embodiments, the end devices may have no such discretion and no such communication capability, in which case the hub device may make all decisions regarding the sub-network.

In some embodiments, the hub device may need two end devices to make their measurements or take their actions simultaneously. To do so, the hub device may transmit a message to both end devices by including the local identification codes of the two end devices in the message, which may be termed a "dual-address" message. For greater timing precision, the end device may provide a timestamp point after the dual-address message, and the two end devices may take their actions upon detecting the timestamp point. For example, the dual-address message may take the form of a broadcast message, but may include the two local identification codes, with an indication that this is a dual-address message, and another indication that the actions are to be taken by the two indicated end devices synchronized by a timestamp point which will follow shortly. The timestamp point may be separated from the dual-address message by one or more blank symbol-times, to give the two end devices time to prepare. The timestamp point may be a single message element containing a signal transmission after the blank symbol-times, in which case the end devices are to trigger their actions upon detecting the signal. Alternatively, the timestamp point may be a first message element with a first phase, followed by a second message element with the opposite phase, in which case the end devices may trigger their actions upon detecting the phase reversal. Thus the end devices may detect the broadcast message, determine that it is actually a dual-address message, determine that they are the two indicated end devices, determine that their actions are to be synchronous with the following timestamp point, and then upon detecting the timestamp point, may trigger their actions together. The end devices are expected to already know how to interpret the dual-address message and the subsequent timestamp point. For example, the end devices may include firmware, triggered by the dual-address message, controlling the responsive actions of the two end devices. The other end devices of the sub-network may detect the dual-address message and may determine that it does not pertain to them, and therefore may remain silent until after the task has finished, including a report to the hub device, if desired.

In some embodiments, the end devices may be configured to synchronize their actions directly, after a setup message from the hub device. For example, a first end device may be configured to transmit a brief signal and then perform its action, while the second end device may detect the brief signal and then immediately perform its action, so that the two actions are simultaneous other than the propagation time of the brief signal. Optionally, the first device may insert a small delay before performing its action, to compensate for the propagation delay. Propagation delays are generally expected to be negligible in sub-network communications. To coordinate such cooperative action, the hub device may transmit a first downcast message to the first end device, instructing the first end device to determine when some condition is met, and then to transmit the brief signal, and then to trigger the first action. The hub device can also transmit a second message to the second end device, instructing it to wait for the brief signal and then trigger the second action. The hub device may transmit the second message first, and then transmit the first message, thereby giving the second end device time to demodulate its message, prepare for receiving the brief signal, and for triggering its action. All the other end devices may be configured to determine, from the first and second messages, what is going on, and may therefore remain silent until it is over. By either the dual-address method or the brief-signal method, the two end devices may arrange to synchronize their actions.

In some embodiments, an end device may have more than one basic function. For example, an end device may be configured as an actuator to open and close a valve, and may also be able to measure a voltage indicating whether the valve is open or closed. The multifunction end device may be able to detect and report problems such as a stuck valve. In addition, the end device may remember the previous state of the valve, and may discover at a later time that the valve state has unexpectedly changed. Such an observation may raise suspicion that something is amiss, which the end device can then communicate to the hub device.

In some embodiments, the end devices may be capable of doing more than making basic measurements and switching switches. For example, an end device may be instructed by the hub to perform its tasks repetitively, such as periodically, until instructed to stop, or until a pre-set time of day, or until the sensor data reaches a threshold, among many other possible criteria for end devices to automatically start or stop their repetitive tasks. The end devices may be configured to also perform an alarm function, for example by making measurements on a schedule, but without informing the hub device unless the measured value exceeds a predetermined threshold, in which case the end device may transmit an alarm to the hub device. In other embodiments, the end device may be configured to perform analysis of the data, such as providing a running average of the measurement data using, for example, a ring buffer or a memory decay function. In other embodiments, the end device may calculate a smoothed value of noisy data and report just that smoothed value. Alternatively, the end device may report the amplitude of the noise, which may be an indication of whether the sensor needs to be replaced. The end device may be configured to report just the outliers, since these often indicate an imminent failure or other pathological problem. The end device may calculate and report a structure function of the data including the noise, if instructed to do so. In another embodiment, the end device may analyze its running data to discern a trend or rate-of-change, and may extrapolate that trend to a future time, and may warn the hub device of an impending event related to the data, such as a time when the measured parameter is expected to reach a threshold. In other embodiments, the end device may accumulate a number of measurements over a period of time time, and may analyze the series of historical values using embedded firmware. For example, the end device can evaluate uncertainties according to the amount of variation or the noise width in the measurements (with or without de-trending the data). In other embodiments, the end device may attempt to quantify the observed variations an allocate them to sensor noise, or basic instrumentation uncertainty, or inhomogeneities in the measured flow. Such an analysis may be based on statistical criteria, for example. The end device may report each of those values at a particular time, or trending, or extrapolated, or other analysis when requested. In some embodiments, the end device may be configured to filter out the outliers in its sensor data. In other embodiments, the end device may be configured to note and focus on the outliers, such as tallying or quantifying them, depending on the application. The end device may be configured to send an alarm when the number or size of the outliers is an increasing function of time. In each case, the end device may compare any of the above-mentioned analysis results to a predetermined limit or threshold, and may inform the hub if the limit is exceeded or is expected to be exceeded within a predetermined interval. These and many other data processing or signal processing steps may be programmed into the firmware of the end device. In each case, the end device may report the analyzed results to the hub instead of the raw data, thereby minimizing communication costs and avoiding burdening the hub device with volumes of repetitive data. However, when requested, the end device may also transmit the raw data that the analysis results depend on, thereby enabling the hub device to perform additional analyses, for example.

In some embodiments, an end device may have more than one ability, such as a sensor ability and an actuator ability, and may be enabled to operate the actuator autonomously based on the sensor data. For example, and end device serving as a temperature regulator can measure a temperature, and then responsively turn a heater on or off to keep the temperature within predetermined limits. In such an autonomous mode, the end device may silently perform its tasks as long as the temperature remains within the limits, and may contact the hub device when something goes wrong. In a similar way, the hub device may leave the end devices alone during normal operations, and may contact the end device when necessary to turn the autonomous mode on and off, or to change the temperature limits, or to pre-emptively operate an actuator or read the current temperature, for example.

In some embodiments, an end device may be configured to recognize problems and to take mitigating action autonomously. The end device may alert the hub device if the end device is unable to resolve the problem. Alternatively, the end device may alert the hub device upon first detecting the problem, especially if the problems is more urgent. In some embodiments, the end device may be configured to take a second measurement whenever the first measurement is outside normal limits. The second measurement may agree with the first one, thereby indicating that there is some kind of change in whatever stuff the sensor is monitoring. However, if the two measurements are wildly different, this may mean that the sensor needs maintenance, or that something unexpected is happening to the process stream, or that a hacker is involved. In a non-autonomous version, the end device may tell the hub device of each measurement value, and the hub device may then decide whether the measurements are consistent and what to do about it. In an autonomous version, the end device may determine whether the measurements are consistent, and if not what action to take. The end device may also know what to do if that attempted mitigation action fails to solve the problem. The end device may also know when to alert the hub device, such as upon detecting the inconsistency, or after the initial solution attempt, or after failing to solve the problem. The hub device may then ask for the raw data, or shut down the process stream, or contact the base station or higher authority, or other response depending on the application and the problem detected. In each case, the intelligent end device may remain silent as long as everything seems to be normal, may detect a problem by analyzing its own data, and may alert the hub device upon detecting or failing to solve the suspected problem.

In some embodiments, an end device may be configured to detect a cyber attack. For example, the end device may receive a command addressed to that end device, but with unusual or illegal form, or oddly formatted, or at an unexpected time, or conflicting with a previous command, or other predetermined basis for suspicion. The end device may then inform the hub device of the observation, if configured to do so. Alternatively, the end device may silently begin a series of self-checks to verify the problem and perhaps determine whether it is due to an attack or receiver noise or interference or some kind of equipment malfunction. The end device may then inform the hub device of the self-check results. As another alternative, upon detecting a suspicious communication, the end device may immediately re-boot to expel the presumed attacker, and then automatically inform the hub device that it has re-booted. The boot sequence, or the initial part of the operating system, may include automatically transmitting a message to the hub indicating that the end device has re-booted. The hub device can then inform the end device of the current operating conditions and parameters of the sub-network, since that information may be erased upon each re-boot. On the other hand, the suspicious command may in fact be a legitimate message from the hub device. In that case, it is important for the end device to let the hub device know that its command was not acted upon. The hub device may determine this by receiving an alarm message from the end device, or by detecting that the end device has re-booted instead of executing the requested task, or by receiving no acknowledgement, or other means. In that case, the hub device may repeat the command, but with clarification to prevent the misunderstanding, or may revise the command to eliminate the suspicious element, or may update the end device's firmware to accommodate that type of message in the future.

Hub Sidelink

In some embodiments, hub devices may be able to communicate with each other directly, and/or with other user devices of the larger network. Ordinarily, a hub device communicates with the base station on managed uplink/downlink channels, and the base station then sends the message down to the intended recipient, such as another hub device on the larger network. However, this involves numerous delays. For example, user-initiated messages on 3GPP networks generally require the first hub device to wait for an opportunity to submit a scheduling request, then wait some more for an opportunity to indicate the size of the intended message, then wait some more for an opportunity to transmit the message to the base station, then wait some more while the base station alerts the second hub device that a message is coming, and then wait some more until the base station finally sends the message to the second hub device in downlink. Applications requiring hub-to-hub coordination may need a more efficient way to transfer information between hub devices.

In some embodiments, for faster and simpler cooperation, the hub device may communicate directly with another hub device (or other user device) on a sidelink channel or other communication means. For example, the hub device may use sidelink mode-1 for hub-to-hub communications in which the times and frequencies are managed by the base station, or it may use sidelink mode-2 procedures in which one of the hub devices assumes the role of the base station in a local ad-hoc group. In either case, direct hub-to-hub communication may enable faster and more controlled coordination between sub-networks than cumbersome message transfers up and down the larger network, and may avoid clogging the base station with routine communications that the hub devices can handle themselves.

In some embodiments, for even greater autonomy and control, the hub devices may belong to three different networks involving three different communication technologies. For example, the hub device may be configured to communicate with the base station using 3GPP protocols, and with the end devices using the sub-network protocols on restricted links, and also with the other hub devices using another non-3GPP technology. There are many possible non-3GPP communication technologies, one being Wi-Fi. Such direct communication between hub devices, using unmanaged protocols independent of 3GPP protocols, may avoid loading the larger network with routine traffic that can be handled autonomously by the sub-networks. In addition, many applications require time-critical cooperation between two different sub-networks, in which case the hub devices may use direct hub-to-hub communication to avoid delays inherent in the managed networks. For example, one sub-network may be responsible for triggering an action, and a second sub-network may be responsible for measuring the action in real-time to verify correct motion or timing of the action. For example, a first sub-network may trigger a flash tube timed to capture a transient event in real-time by emitting an infrared light pulse when triggered, while a second sub-network measures the effect of the flash or the subsequent motion of the action. Direct hub-to-hub signaling may be needed to ensure that the measurement is properly timed relative to the triggering of the action. In this case, each hub device may belong to three networks: the sub-network, the larger network, and an ad-hoc network providing real-time communication between hub devices. Such time-critical cooperation may be implemented without burdening the larger network, so long as the sub-network, the ad-hoc realtime network, and the larger network all have different frequency bands.

In some embodiments, the end devices may use DRX (discontinuous reception) to save battery power. The DRX may include a schedule or periodicity determining when the end device is to wake up and check for messages. In a first version, each end device may select its own schedule and may inform the hub device. In a second version, the hub device may assign a DRX schedule to each end device. For example, the hub device may cause all the end devices to wake up at the same time for a polling message. In a third version, the DRX schedule may be pre-configured in the firmware of each end device, configured for example by the higher authority when the end device is built, in which case the schedule may be communicated to the hub device through the larger network when the pre-configured end device is installed.

In some embodiments of DRX, the hub device may cause each end device to wake at different times, so that the hub device can transmit each end device's message at the correct time for that end device, while the others remain asleep. No polling message is then needed.

In some embodiments of DRX, the sleep schedule of each end device may be variable. For example, the DRX schedule may have a fast mode and a slow mode (that is, a short periodicity and a long periodicity). The hub device may indicate which mode is in use, depending on circumstances such as how often the end devices are called upon to perform a task. The slow mode may be suitable when process conditions are static or slowly changing, and the fast mode, with a shorter sleep interval, may be suitable when things are happening quickly, or after an alarm condition, or at other time when the hub device needs the end devices available to do tasks.

In some embodiments of DRX, the hub device the end devices may be configured to wake up all at the same time. In that case, the hub device may transmit a polling message at the wake-up time, indicating which end devices have a message on hold. The polling message may be a short message in which each bit position corresponds to one of the end devices, such that the bit is set to 1 if there is a message on hold for the corresponding end device, and zero otherwise. The hub device can transmit the polling message when the end devices are scheduled to wake up. Each end device may then determine from its bit position of the polling message whether it has a message on hold. The end devices that have messages on hold can request their messages, and the others can go back to sleep. In one embodiment, each end device can request its message by replying on a contention-based manner, in which case random backoff delays and LBT intervals may be used to avoid collisions.

In some embodiments, the end devices that have a message on hold may request their messages by transmitting a brief (single bit) signal at a pre-assigned time after the polling message, and the hub device can determine which end devices request their messages according to the positions of those single-bit signals. In one embodiment, the end devices transmit their request signals sequentially, according to the order of mention in the polling message. For example, each end device that is indicated in the polling message may transmit a single bit or pulse in a particular sequence, which is the sequence of mention in the polling message. Thus the first-mentioned end device (with a message on hold) in the polling message may transmit its request message first, followed by the second-mentioned end device in the polling message, and so forth. In another embodiment, the pre-assigned times include all of the end devices of the sub-network, yet only those requesting a message on hold would transmit the brief signal at that time. By either polling response method, the request messages can then be quite short since they do not need to include the identification code of the end device; the hub knows the sequence and therefore knows which end devices are ready for their messages. For example, each request message may be just a single resource element pulse, transmitted at a particular time corresponding to each end device that has a message on hold. The hub device can determine from the series of gaps and pulses which end devices are ready to receive their messages, and can transmit them downcast in, for example, the same order as the series of request pulses.

In some embodiments of DRX, the hub device may transmit a polling message indicating which end devices have messages on hold, using a terse pre-configured bit code for example. The end devices may then get their messages without transmitting request messages at all, if the hub device knows which end devices are scheduled to be awake. For example, the hub device may record or remember the specific DRX schedule of each end device, and after transmitting the polling message, the hub device can then transmit each waiting message sequentially after the polling message, and in the same order as the indicators in the polling message. Each end device that is awake for the polling message can then determine, from its order in the polling message, which of the subsequent messages is intended for that end device.

In some embodiments of DRX, each end device may transmit a brief acknowledgement after receiving its message. For example, each of the end devices that are indicated in the polling message may receive its message in sequence, and can then transmit a brief acknowledgement, such as a single pulse during the acknowledgement delay interval. A single pulse may indicate a successful reception, and silence may represent a failure to receive. There may be no need for the end devices to identify themselves at that time, because the hub device knows which end device is acknowledging. In addition, if an end device over-slept or otherwise failed to recognize its waiting message, the acknowledgement delay interval would be blank, in which case the hub device can contact the missing end device later and ask if it is ok.

In some embodiments, a potential problem with DRX schedules is that the sleeping device's clock may drift out of alignment with the hub clock during long sleep intervals, in which case the sleeping device may wake up too early or too late, and miss the polling message. To resolve this problem, the hub device may transmit a characteristic pre-polling pattern periodically before the polling message, and a different characteristic post-polling pattern periodically after the polling message. For example, the pre-polling pattern may be a single pulse once per millisecond for 3 milliseconds before the polling message, and the post-polling pattern may be a double pulse once per millisecond for 3 milliseconds after the polling message. The end devices, upon waking up and detecting the single pulse pattern, may remain awake long enough to receive the imminent polling message. Those early wakers may also adjust their clock rate and setting to better match the hub device's clock. If the end device detects the two-pulse pattern upon waking, it knows that it has missed the polling message, and therefore may adjust its time and rate accordingly, so that it will wake up on time to receive the next polling message.

Cybersecurity of Sub-Networks

In some embodiments, each end device may include a processor such as a microcontroller, coupled with a secure memory containing a boot sequence and an operating system for the end device. The secure memory may be a ROM (read-only memory). For example, the ROM may be a UROM (unalterable read-only memory) which cannot be altered under any circumstances, or a "PROM" (programmable read-only memory) which can be altered under certain circumstances. The PROM term includes those memory devices that can be rewritten electronically by activating a write-enable feature, and other devices that require a physical enablement, such as an ultraviolet light, to erase and rewrite. PROM also includes those types that can be altered at individual memory addresses, as well as those that must be fully erased and reprogrammed. The term "ROM", without further specification, or "secure memory", will encompass all those types. In contrast, a RAM (random-access memory) is a volatile, transitory, readily altered memory, and therefore may not be secure. Registers and the like in the processor, or elsewhere, are also not secure because they could be altered by a hacker, in principle.

In some embodiments, the end device may include a PROM such as a Flash or EPROM or EEPROM memory (Erasable or Electrically Erasable Programmable Read-Only Memory), each of which may be altered using electrical signals by activating an electronic write-enable function. In addition, the end device may be configured to activate the write-enable function only under certain circumstances, such as upon decrypting a password, or upon providing a physical enablement applied to the end device. For example, the physical enablement may be a physical button press on the end device, a UV (ultraviolet) light applied to the end device, a voltage applied to a pin of the end device, or other actions detailed below.

In some embodiments, the end device may be configured to boot only from its ROM, by executing processor instructions contained in a boot sequence of the ROM. Booting from ROM ensures that any malware injected into RAM by an attacker will be eliminated upon each re-boot, provided that the boot sequence is configured to erase the RAM and registers before passing control to the operating system. Booting from ROM may restore the end device to a pre-configured state, and may thereby expel an attacker.

In some embodiments, the end device may be configured to execute instructions only in the ROM memory, and never from a RAM (random-access memory), if present. Preventing RAM execution can thereby prevent an attack in which the attacker loads malware into RAM. For example, the ROM can include an operating system, which includes routines for acquiring data, communicating with the hub device, performing security tests, and other operations that the end device needs to perform. For security, the ROM firmware may include no routines that the end device does not need, since each unnecessary capability represents a potential attack surface. By limiting the boot and system (collectively, the "firmware") to support only those particular actions that the end device needs, the attack surface may be minimized. In some embodiments, the boot sequence and operating system may be programmed into the ROM during construction of the end device, in which case the end device may be readily bench-tested by technicians or autonomous robots before installing in a sub-network. For example, an autonomous testing device may run the new end device through a wide variety of security tests, revealing any irregularities or defects, including rare failure modes, before releasing the new end device for installation.

In some embodiments, the sub-network may be fully pre-configured and engineered for particular tasks. For example, each end device may be provided with a permanent globally-unique identification code of the end device, a shorter local identification code of the end device, the globally-unique identification code of the hub device, the shorter local identification code of the hub device, the boot sequence, and the operating system including all task functions that the end device is capable of performing. In a first version, these things may be installed in the ROM during manufacture of the end device. In a second version, the ROM memory chip may be manufactured separately and then installed in the new end device before it is mounted in the sub-network. In a third version, the end device may be fully prepared except for programming the PROM, which may be performed just before or just after installation of the end device into an application.

In some embodiments, the new end device may be provided with a transceiver tuned to a communication frequency of the sub-network. The transceiver may be tuned and tested by technicians or autonomous robot testers, before installation in the sub-network. Whenever a new end device is to be installed in an existing sub-network, the hub device may be informed of the change by the higher authority or its agents, by messaging through the 3GPP network. For example, a downlink message from the higher authority or its agents may include the identification codes and planned tasks of the new end device, in which case the end device may become a member the sub-network automatically, as soon as it is placed in radio range of the hub device and powered up. Importantly, the end device may join the sub-network without the need for roaming, search and discovery, authentication and registration, or any of the other entry procedures of 3GPP networks, each of which constitutes a potential attack surface to a creative hacker. Pre-configured end devices may thereby provide strong security intrinsically, without the complex encryption and security protocols of the larger network, many of which may be difficult for LC-IoT devices to perform.

In some embodiments, for even greater security, the end device may be configured to re-boot from ROM frequently. For example, the end device may be configured to re-boot on a predetermined schedule. Alternatively, the end device may be configured to re-boot responsive to an event such as after transmitting each upcast message. The end device may be configured to re-boot periodically, such as once per second or per minute or per hour or other periodicity. The period may be specified in the end device's ROM (in the boot sequence or the operating system for example), or the period may be specified by the hub device in a separate downcast message. In some embodiments, the end device may be configured to re-boot before or after making each measurement or actuating each actuator. In other embodiments, the end device may be configured to re-boot at other times to be determined by the application needs and specified in pre-configured ROM code or instructed by the hub device. Frequent re-booting restores the original state of the operating system and RAM, and therefore may quickly expel any hacker intrusion. Hence, frequent re-booting may greatly complicate the job of the hacker, and may thereby protect both the end device and the hub from attacks.

In some embodiments, all messages between the end devices and the hub device may be encrypted. For example, each end device can be configured with a different encryption key, known only to the end device and the hub device (and optionally to higher authorities having proper security). The hub device may use yet another encryption key for transmitting downcast messages.

In other embodiments, the internal (upcast and downcast) messages of the sub-network may be transmitted plain, not encrypted. Encryption is expensive in terms of time and computation energy, both of which are in limited supply for low-complexity battery-operated end devices. In some embodiments, only the longer messages, such as installation messages, may be encrypted, whereas there may be no reason to encrypt shorter or standard pre-configured messages such as acknowledgements. Most short messages and routine signaling have no private content. It makes little sense to encrypt a single-bit response that indicates whether a light is on or off. In many applications where privacy is not required, and where messages in the sub-network are brief, encryption may be avoided without compromising security. The vast majority of envisioned use cases of LC-IoT involve routine basic messages of a non-private, non-confidential nature, for which routine message encryption may be a waste of resources.

In some embodiments, the hub device, or the higher authority, may use an algorithm to determine which messages are to be encrypted and which are to be sent plain. In some cases, the end device identification code may be in plain text, and the rest of the message may be encrypted, in which case the recipient can tell that the message is encrypted when it fails to correspond to any of the expected formats. In some cases, the encrypted messages may include an indicator indicating that they are encrypted, such as a particular bit pattern as the start of the message or spaced apart from the start of the message by a gap of no transmission. The recipient may determine, according to the presence or absence of the particular bit pattern, and the gap if present, whether the following message is encrypted.

In some embodiments, the end device may be configured to detect a cyber attack. For example, the end device may detect an unexpected change in its RAM memory or registers, which the end device did not do. This is strong evidence of intrusion. Alternatively, the end device may perform a measurement and find an unexpected value, such as a value out of range or inconsistent with other data. This may be due to noise or sensor failure, or may be evidence of an attacker. The end device may become suspicious upon receiving an instruction allegedly from the hub, but malformed or inconsistent or otherwise unexpected. Alternatively, the end device may receive a correctly formatted command as if from the hub device, and may respond to it as usual, only to be asked by the hub why the end device did that. In each case, or for other possible attack signatures, the end device may take defensive action. The defensive action may be to transmit an upcast message to the hub device indicating the observations and the suspected problem. Alternatively, or in addition, the defensive action may be to automatically initiate a series of self-tests that have been defined by operating system instructions. Alternatively, the hub device may instruct the end device to execute those self-tests.

In some embodiments, the end devices may include routines in the ROM firmware for various self-tests, configured to determine whether a suspected problem is due to a cyber attack, or sensor noise, or receiver noise, or equipment malfunction, or some other failure. Depending on the test results, the hub device may do several things. If the test results of the self-tests are all in the normal range, the hub device may allow the end device to resume normal operations, but may treat upcast messages from that end device with special care thereafter. If the test results indicate a likely cyber attack, the hub device may instruct the end device to re-boot, and after the re-boot is done, may instruct the end device to perform the self-tests again. If the second set of self-tests also indicates an attack, then the hub device may quarantine the end device by cutting off all further communication with it, and may submit a maintenance request to the base station or the higher authority. In addition, the hub device may perform its own self-tests to check whether the attack has propagated upward. If the hub's self-tests indicate that the attacker has intruded into the hub device, then the hub device may alert the base station using a pre-configured alarm, and may then quarantine itself by cutting off all further uplink communication to the larger network until the maintenance team can decide what to do. In some embodiments, upon a suspected cyber attack, the end device and/or the hub device may be configured to avoid re-booting, so that the evidence of intrusion may be preserved, from which the identity and/or method of the attacker may be determined. On the other hand, if the self-tests of the end device indicate something other than a cyber attack, such as a flaky sensor, the hub device may respond by adjusting the procedures, for example by averaging multiple measurements to mitigate the sensor noise. If the self-tests indicate that the problem is caused by weak reception or interference, the hub device may increase it downcast power level to improve reception by the end device. If the problem persists or otherwise defies local mitigation attempts, the hub device may request assistance from the maintenance team, or alternatively may ignore and quarantine the sick end device, if that is feasible.

In some situations, an end device may be unable to respond to instructions from the hub device. This may be due to an unknown glitch, or a cyber attack, or some problem with the receiver, among other possibilities. In some embodiments, the hub device or the larger network or the higher authority may be able to force a re-boot of the end device by temporarily cutting off its power. For example, the end devices may be configured to automatically re-boot upon restoration of the power. In addition, the hub device may depower the entire sub-network temporarily, especially if a wider attack is suspected, thereby forcing a re-boot of all the end devices. If the end device remains non-compliant upon re-booting, then the hub device may permanently quarantine the compromised end device to prevent further infection. If feasible, the hub device may reconfigure the other end devices to carry out the tasks of the quarantined device. In each case, the hub device may inform the base station of the problem and the final status.

In some embodiments, the hub device may instruct an end device to perform certain pre-configured self-tests to detect a hacker's presence. For example, the self-tests may be to calculate a hash or parity construct of the PROM contents, including the boot sequence and the operating system, or subsets thereof. Such a self-test would confirm the integrity of the PROM, and would reveal any (unlikely) changes in the ROM, despite its security. If the ROM has somehow been changed, the hub may immediately quarantine the end device and request assistance from the higher authority. Another self-test may be to erase all of the RAM, and then to calculate a hash or parity construct of the RAM memory. The hash or parity should be all zeros in that case, and any other value would indicate something very suspicious is going on. Another self-test may be to perform a measurement or other operation that attempts to set the various registers of the processor into a known configuration, and then to calculate a hash or parity construct of the registers. Any disagreement indicates either an attack or a hardware failure. Another self-test is for the end device to perform a series of sensor measurements or actuator actions in rapid succession, followed by a report of the results. The rapid repetition may be instructed by the hub device, or it may be one of the self-tests written in the end device's firmware. Other self-tests may be included in the operating system firmware for diagnosing problems. The hub device may know the correct answer for each of these tests, but the end device generally does not. Thus the hub device can use the end device's answers to each self-test, for example to evaluate the problem, or to localize the problem to one subsystem of the end device, or at least to determine whether the problem is still present after defensive actions like re-booting.

In some embodiments, the hub device may already know precisely how much time is required for the end device to complete each self-test and report the results. The expected time may be based on a theoretical calculation of the various steps involved, or it may be determined by running those tests during bench testing, or when the end device is initially installed, or at another time. Then after ordering the end device to perform a particular test, the hub device may measure the amount of time between transmitting the order and receiving the result. The hub device may then compare the time required for the self-test to the previously measured time intervals. Even if the test result is correct, the hub device may still interpret any change in the amount of time required for the self-test as evidence of hacking. The execution time may be changed, for example, if a hacker has inserted extra code, substituted malware, or made other changes interfering with the operation of the end device.

Securely Updating

In some embodiments, one or more end devices may be reconfigured after installation on a sub-network. For example, the higher authority may decide that the sub-network needs to be changed by adding or removing one of the end devices, or by adding a new or different task for the current end devices, or by changing procedures or communication, or to fix a bug, among many other possible changes. In each case, the changes involve updating the firmware of one or more end devices. Disclosed below are three versions of a sub-network change. In a first version, the new or changed end device may be reconfigured by physically separating it from the system. In a second version, the PROM memory of the end device may be updated using a physical enablement to activate the write-enable function of the PROM. In a third version, the PROM may be updated wirelessly. In each version, the change may be accomplished without sacrificing cybersecurity, as detailed below.

In a first embodiment, an end device is to be updated with a new operating system in ROM. A maintenance crew may detach the end device from the sub-network, make the changes on an electronics bench or the like, and then re-install it. The hub device may be informed of the update via the larger network. Upon recognizing the updated end device, the hub device may instruct it to perform various tests and calibrations, recording the results of each self-test, comparing those results to the expected values, calibrating the response time for each diagnostic, and other tests to verify that the new or updated end device is working properly.

In a second embodiment, the firmware of an end device may be updated using a physical enablement that hackers cannot copy. The physical enablement is an action that enables the write-enable function of the PROM, but which cannot be done by wireless signals alone. For example, a physical enablement may be a button press on the end device, configured to energize the write-enable input of the PROM. The write-enable input is generally a voltage applied to a pin of the PROM chip, or an ultraviolet light that erases the memory elements. In some embodiments, the update can be performed using a JTAG (joint test action group) connector which does a similar function when connected to a suitable programmer device. The physical enablement may alternatively be the placement of a NFC (near-field communication) device against the end device, in which case the updated code may be transferred through the NFC device wirelessly. Although the NFC method is technically wireless, it is considered a hacker-proof physical enablement because it would require the hacker to gain physical access to the end device. (If an attacker has obtained physical access to the end device, then the attacker has lots of options for causing trouble. But this scenario will not be considered further.) An alternative physical enablement is a SIM (subscriber identity module) card which can be inserted into a SIM card reader on the end device. For example, the new operating system may be included in a memory of the SIM card. The end device may copy the new firmware into its PROM. Alternatively, the end device may treat the SIM memory as its ROM, and may execute the boot sequence and operating system directly from the SIM memory, with no other installation steps required. In that case, replacing the SIM card is equivalent to replacing the firmware. Other physical enablements are possible and envisioned, the important aspect being that the physical enablement allows the firmware to be updated, but cannot be performed remotely. Updating by physical enablement may be suitable when the end devices are accessible to the higher authority or the site maintenance team, but not to a hacker.

In a third embodiment, the end device firmware may be updated using wireless communications alone, without a physical enablement, yet may maintain a high level of cybersecurity on par with the 3GPP network. For example, the end device may have a table of single-use keys installed in protected ROM memory, reserved for system updating. The end device may then use the single-use keys to decrypt and install new firmware. For example, the hub device may encrypt the new firmware using one of the single-use keys, then transmit the encrypted firmware to the end device in a downcast message, along with an index or address indicating which of the single-use keys was used. In some embodiments, the end device does not have direct access to the single-use key table, except when so instructed by the installation message, and then can retrieve only the one key indicated by the index. Thus the end device can retrieve the selected single-use key from the table according to the index provided in the installation message, and may use that key to decrypt the firmware. The decryption does not need to be complex. For example, the end device may use an XOR (exclusive or) operation to combine individual bits of the firmware and the single-use key, the output being the decrypted firmware.

In some embodiments, the single-use keys may be truly random bit sequences, such as those generated by thermal noise or other physically random process, as opposed to a complex pseudo-random algorithm which is generally less secure. In some embodiments, the single-use keys may be sufficiently long to defeat a brute-force attack using current computing capabilities. For example, the single-use keys may be 128 bits in length, or a longer length if needed to defend against future quantum computers and the like.

In some embodiments, the end device may immediately disable its receiver upon receiving an update installation message from the hub device, and may re-enable the receiver after the installation is finished, thereby preventing any interference by a hacker during the updating process. Alternatively, the end device may be configured to ignore or discard all signals received during the updating process. This may defeat attackers attempting to interfere with the firmware updating procedure.

In some embodiments, the end device may have a PROM that includes a password-protected write-enable function. The write-enable function enables the PROM to be altered. In a first version, the write-enable password may be hidden within the system code, at a location known to the end device. In a second version, the write-enable password may be provided by the hub device in the installation message, encrypted along with the system code. In a third version, for even greater security, the write-enable password may be split into two halves, in which the first half of the password is hidden in the system code at a location known only to the end device, and the second half of the password is provided, encrypted, in the installation message. In each case, the end device may readily reconstruct the password while decrypting the system code. Thus the end device may decrypt the password and turn on the write-enable feature of the PROM when it is time to install the new firmware, and may erase the password as soon as the installation is finished. For example, the password may be a truly random bit sequence with a length equal to the single-use keys.

In some embodiments, after copying the new firmware into the PROM, the end device may be configured to erase all temporary memory such as RAM and registers, disable the write-enable feature, restart the receiver, and then re-boot to begin using the updated system code. As an extra (redundant) security feature, the boot sequence or the operating system may include, again, erasing the registers and RAM, disabling the write-enable feature, and restarting the receiver, thereby ensuring that those steps are performed. The updated end device can then resume its tasks immediately after booting up. However, the hub device may call for additional self-testing to verify the update before resuming routine operations. In addition, the hub device may transmit a message to the end device informing it of the current sub-network parameters and conventions, such as which local identification code to use.

In some embodiments, the single-use keys in the key table may be scrambled (or encrypted) for extra security. Each single-use key may be scrambled with a different scrambling code. In some embodiments, the end device does not know the scrambling codes. Thus the single-use key table is protected, in addition to being scrambled by scrambling codes unknown to the end device. The hub device may send the scrambling code in the installation message, along with the index, and the encrypted operating system firmware, and the encrypted password. The end device can then descramble the selected single-use key before decrypting and installing the firmware. The descrambling, like the decryption, may be performed by XOR merging of the selected single-use key and the scrambling code, thereby retrieving the unscrambled single-use key. Scrambling the single-use keys may seem like a redundant step, but this represents a very small cost, and would deter any hacker that somehow reads the single-use keys despite the security. Like the single-use keys, each scrambling code is used only once. The scrambling codes may be truly random bit sequences with a length equal to the single-use keys.

In some embodiments, the new firmware may include a list of which single-use keys have been used, that is, a used-key list. Whenever the end device receives another installation message, the end device can check the used-key list to make sure the message is not from a hacker trying to re-use one of the previously transmitted keys. If either the previously-used index or the associated scrambled key is in the used key list, the end device may reject the installation message and alert the hub device to the presumed hacking attempt. In this scenario, a hacker cannot inject malware by repeating the updating procedure because the attacker does not know the single-use keys; and if he somehow breaks protection of the single-use key table, he still does not know the scrambling code; and if he miraculously got the scrambling code for one of the unused keys, the attacker is still thwarted because he doesn't know the password for unlocking the PROM write-enable feature. If the hacker listens to the installation message and learns those values, and quickly crafts a malware installation instead, he still cannot inject its own firmware in place of the system code, because the end device stops receiving signals immediately at the end of the installation message, and there is simply no time for the hacker to do all those steps before the receiver shuts down. Hence the wireless updating protocols and secret keys may provide very high cybersecurity, on par with the cybersecurity provided to 3GPP user devices, but without the complex and computationally demanding 3GPP security protocols.

In some embodiments, the sub-network may be configured to prevent an attacker from infecting the 3GPP network through the sub-network. For example, such an attack may start by the attacker compromising an end device (despite the above arguments) or by impersonating an end device, or otherwise. The attacker may then attempt to invade the hub device and gain entry into the 3GPP network. For example, in a "code-injection" attack, the attacker conceals executable code in data, such as the measurement data of an end device. However, as mentioned, the hub device may be configured to interpret every upcast message as raw numerical data (such as a sensor measurement) or a predetermined answer (such as an acknowledgement), and never as executable instructions or computer code. By those restrictions, the hub device confines the attacker to the single end device. In addition, the hub device may watch for any indication of hacking, such as an improperly stated answer or an unrequested sensor message or an unreasonable data value or other abnormal event. Any one of those, or other suspicious event, may cause the hub device to suspect an attack attempt, which may lead to further defensive action. In addition, if the hacker somehow managed to get malware into the hub device disguised as data despite these barriers, the attack would still fail because the hub device does not execute it. Moreover, the hub device usually processes the data, which would destroy the attacker's code automatically. For example, the hub device generally combines the measurement data with multiple other measurements, or calculates differences between data from separate end devices, or performs other analysis on the data before passing a summary report uplink, all of which would render the malware code incoherent. In most cases, the hub device either determines that the data is in a normal range or is not. If the data seems normal, the hub device generally averages and then summarizes it, or more commonly discards it as uninteresting. If, however, the data is peculiar, such as exceeding a threshold or other condition, the hub may take some other action. In no case would the raw data remain unaltered by processing. In no case would the hub or other processor attempt to execute the data as code. Thus the restricted link acts as a second firewall, protecting the hub device, even if an end device has somehow fallen under the control of an attacker.

In some embodiments, for even greater security, the end device may be configured to obfuscate any injected malware before transmitting. For example, the end device may be configured to transmit its measurement data in a format that includes an additional 1 or 2 additional bits. The end device may insert random numbers into the extra bits of each data value before transmitting the data, with the extra bits distributed within each measurement value according to a pseudorandom algorithm. The hub device, upon receiving each upcast message, immediately removes the extra bits before processing the remaining bits as proper data. If a hacker tries to insert code into an upcast message, the code will become garbled as soon as the hub device deletes the extra bits. By treating upcast data as data, and by accumulating or processing it before passing it on, and by deleting extra bits hidden in the data, the hub device can protect itself and the 3GPP network, even in the (highly unlikely) event that one or all of the end devices has been taken over by the attacker.

In some embodiments, the single-use key table may be written in a separate, permanently unalterable UROM, instead of the PROM that contains the operating system. The hub device is responsible for maintaining a list of single-use keys that have already been used, and for avoiding using them again. The number of wireless updates is then limited to N, the number of single-use keys. In addition, the used keys, or their indexes, may be recorded in PROM along with the operating system, for easy detection of re-use. Upon receiving an update installation message, the end device can check the used-key list and thereby detect a hacker's attempt to re-use one of the keys. The end device may then contact the hub device, warning of a hacker attempting to emulate the hub device using prior keys from the key table.

To consider a specific non-limiting example, the single-use keys could be 128-bit codes, and the table may contain 256 such codes (thereby enabling N=256 wireless updates). A 4 k byte ROM is sufficient for such a table, and is readily available. In the future, key codes with 256, 512, 1024, or larger bit counts may be necessary to prevent brute-force attacks using quantum or other high-performance computing technologies.

In some embodiments, the firmware may still be updated, even when the N keys have all been used. To do so, a physical enablement may be applied, bypassing the key table, and thereby allowing further updates without limit. Thus the physical enablement may take the place of a single-use key when necessary.

In some embodiments, the boot sequence and the operating system may be in a first PROM, and the single-use key table may be in a second PROM separate from the first. In that case, after all of the single-use keys have all been used, or at any other time, the single-use key table may be replenished using a physical enablement to rewrite the key table in the second PROM. Hence there could be an unlimited number of updates.

In some embodiments, a new single-use key table may be included in each new system code, encrypted along with the system code in each installation message. The new key table may be the same as the old key table but with all of the previously-used keys erased, or more preferably replaced with new and different keys, thereby preventing a hacker from re-using the previously used keys. Alternatively, for greater security, all of the single-use keys in the new table may be different from all of the old ones, even though only one of the old keys was actually used. Since the key table is replaced upon each usage, an unlimited number of updates is supported, and an attacker that somehow learned of the previous key values would be thwarted when the all-new key table is installed.

In some embodiments, the single-use key table may be embedded in the processor, for example in permanently unalterable memory locations within the processor circuitry. Such an in-processor key table may be written at the same time that the other processor functions are fabricated, such as micro-code and the like. The update installation message may then provide the end device with authorization to access the in-processor key table and to retrieve the key at the index mentioned in the update installation message. If the in-processor key table is unalterable, the end device may include in PROM a list of already used keys, so that they cannot be used again. In another embodiment, the in-processor key table is alterable, such as a PROM included in the processor circuitry. In that case, the used keys may be erased during the updating process and/or replaced by new keys.

In some embodiments, the installation message may include an error-detection code (such as a hash or digest or parity construct or the like) of the as-transmitted installation message, exclusive of the error-detection code itself. The end device can calculate the hash based on the as-received version of the installation message, and compare. If there is a mismatch, the end device may conclude that there was a transmission error or that a hacker intervened, or some other mishap, and may reject the update. The end device may then transmit an upcast message informing the hub device of the rejection, or transmit a NACK. The hub device may then try again, preferably using a different single-use key with a different scrambling code.

In some embodiments, the hub device may prepare an error-detection code of the new system code in its decrypted form, and may include that error-detection code in the update installation message. The end device may then calculate the hash of the new system code after decrypting, but before installation into the PROM. Any mismatch may cause the end device to abort the update and alert the hub device.

In some embodiments, the installation message may include a first error-detection code of the as-received installation message, with the system code still encrypted, and a second error-detection code of the decrypted firmware, before it is installed into the PROM. The end device can calculate those hashes before and after decryption, and if either one disagrees with its error-detection code, the end device may reject the message (erasing all RAM for security) and transmit a NACK to the hub. In addition, one or both of these error-detection codes may be encrypted along with the firmware.

In some embodiments, each end device may include two ROM memories for different purposes. For example, one memory may be a PROM containing the single-use key table, the boot sequence, and the operating system. A second memory may be an unalterable UROM containing instructions for performing each step of the update, that is, the update installation instructions. In this version, the operating system has no updating instructions, other than to jump to the second ROM upon receiving an update command from the hub device. The end device may be configured to access the UROM only in response to an installation message. The end device may then begin executing instructions from the unalterable UROM to carry out the installation. An advantage of placing the updating instructions in a separate memory may be that the regular PROM memory can be completely erased and re-written during the installation, since the instructions are contained in the second ROM. An advantage of placing the updating instructions in a second memory may be that it simplifies the updating process. Execution from a PROM while it is being updated can be tricky, and in some cases, impossible. Thus in this embodiment, the PROM contains the boot sequence and operating system which are being re-written, while the processor is executing updating instructions directly from the UROM. The updating instructions may include muzzling the receiver upon receiving the installation message, calculating hashes if desired, extracting the indicated single-use key from the key table according to the index, descrambling the selected single-use key according to the provided scrambling code, then decrypting the system code using the single-use key, then checking the hash of the decrypted system code, then activating the PROM write-enable function using a password, and copying the new system code into the PROM. The UROM code may also include instructions for disabling the PROM write-enable function after installation is finished and checked, erasing RAM and everything erasable, restarting the receiver, and then triggering a re-boot using the new boot sequence. Since the installation steps are dictated by an unalterable memory, in this version, the PROM updating process may be completed securely.

In some embodiments, the installation instructions may be contained in a secure memory installed in the processor of the end device. The in-processor memory may be programmed with the installation instructions at the same time that the other processor functions are written, such as micro-code instructions. The update installation message may provide authorization or a password or other security feature that enables the processor to execute the installation instructions from the in-processor memory, instead of executing from the main PROM. Execution from the in-processor memory during system installation may be necessary, or at least simpler, when the main PROM is being erased and reprogrammed with the new operating system.

In some embodiments, the end device may include a SIM card reader. The SIM card may include a memory containing the operating system and boot sequence, in which case the SIM card memory may be the main secure memory instead of a built-in PROM or UROM. In addition, the SIM card may include the updating and installation instructions, so that the processor can execute the updating and installation instructions from the SIM card memory instead of attempting to execute from the same PROM that is being updated. In other embodiments, the end device may have both a PROM and a SIM card installed, in which case the updating process may be to read a new operating system from a SIM card inserted into the reader and copying the operating system to the PROM of the end device. The SIM card may then be withdrawn after the updating, or it may be left in the device but rendered inaccessible without a password or the like.

Other Cyber Applications

The cybersecurity procedures described above may be used to securely update a wide variety of systems and applications. For example, most modern vehicles are dependent on software. Software generally requires updating to fix bugs, provide enhancements, serve additional applications, enhance user features, and so forth. However, the updating protocols can represent an attack surface which, if breached by a hacker, could allow the vehicle to be remotely controlled by hackers. This security risk may be greatly mitigated by (a) providing a secure memory for the firmware, including the boot sequence and the operating system of the vehicle; (b) configuring the processor to execute instructions only from the secure memory, never from RAM which in principle can be altered by a hacker; (c) providing a table of single-use keys specific to the particular vehicle, also in secure memory of the vehicle; (d) scrambling each single-use key by a different scrambling code, also vehicle-specific and single-use; and (e) wirelessly transmitting an installation message to the vehicle containing the encrypted system code, an index pointing to the selected single-use key, the scrambling code specific to the particular vehicle and to the specific single-use key, and optionally an encrypted password for controlling the write-enable function of the secure memory. The vehicle's processor can then inhibit further receptions during the update, retrieve the scrambled single-use key from its internal table, unscramble the single-use key, decrypt the operating system using the single-use key, install the new operating system (or other update modifications) using the password to enable PROM writing, then erase the scrambling code and the single-use key and the password, disable the PROM write-enable function, restore the receiver, and re-boot for a secure wireless system update.

Further applications that require secure updating may benefit from single-use keys, optionally scrambled by a unique scrambling code, and stored in a secure memory. For example, ordinary computers such as personal computers, as well as computers in general, often require software updates, which are almost always delivered remotely, such as by Internet or wirelessly. Hackers have developed ways to use the updating procedure to inject malware. To prevent such an attack, each computer can include a protected list of (optionally scrambled) single-use keys, installed by the software manufacturer during the initial system installation, and different for each licensed copy of the software. Then, to provide a hacker-proof update wirelessly or by Internet, the software manufacturer can encrypt the update file differently for each licensed copy, using one of the single-use keys associated with that licensed copy. The manufacturer can then transmit the encrypted update file along with the scrambling code, and the processor can descramble and decrypt and install as described previously. A hacker intercepting the update transmission would be unable to use it because the installation message does not include the single-use key. If the hacker has somehow copied the single-use key table and also intercepts the installation message, then in principle the hacker could use the scrambling code to unscramble the single-use key, then decrypt the update file, then figure out how to insert the malware, and then re-encrypt the altered update file, then somehow replace the downloaded file with the corrupted version. Clearly, this is not feasible, since the target computer would already be finished installing the update long before the hacker has had enough time to doctor the code, and in any case the computer would likely reject a retransmission of the update file in the middle of an update, and certainly would reject a second use of the same key. But even if the hacker succeeded in doing all of that, including miraculously solving the re-injection issue, then what has the hacker gained? One-time access to a single PC. None of the information that the hacker has gained would be useful for another attack because all of the computers have different single-use keys and different scrambling codes. Therefore the security risk is judged to be negligible.

Sub-Network Applications

Numerous applications are foreseen for wireless sub-networks such as those disclosed herein. For example, in some embodiments, the sub-network may be non-mobile, in the sense that the distance between the hub device and its end devices remains constant or nearly constant. For example, a robotic welder in a factory may include numerous end devices such as angle sensors, motor actuators, and the like. The robotic welder also includes a hub device configured to manage the end devices, while also communicating as needed with the factory 3GPP network. The end devices may move short distances as the robot does its work, but the change in propagation of sub-network messages would remain negligible.

In some embodiments, the sub-network may be mounted in a moving vehicle, yet the sub-network may be considered static nevertheless, because the end devices and the hub device are mounted together in the vehicle and maintain a constant separation despite the overall motion. Although communications between the hub device and a fixed base station may require Doppler corrections and timing shifts and the like for those 5G/6G communications, the sub-network itself generally remains unaffected by such motion. In some embodiments, the vehicle may also include a base station or relay point, in which case the motional corrections are needed not in uplink-downlink communications but in backhaul between the mobile base station and the rest of the network. Other topologies are possible. In each case, the sub-network communications can avoid the complexities of mobility procedures such as resynchronization, Doppler correction, beam re-alignment, signal fading, and the like, due to motion of the vehicle.

In some embodiments, the vehicle may include a closed 3GPP network including a base station and core network on the vehicle, which maintains contact with various local fixed-position base stations or core networks, as the vehicle passes by. In one embodiment, the vehicle-mounted base station may register as a regular user device on one of the fixed base stations and communicate via Doppler-corrected uplink/downlink communications. In another embodiment, the vehicle-mounted core network may communicate with the fixed core network on backhaul channels, also using Doppler-corrected communications. At the same time, the hub devices communicate with the vehicle base station in regular uplink/downlink communications, and also communicate with their end devices on the restricted upcast/ downcast links. In some cases, the hub devices of the vehicle may communicate with each other in sidelink or a third type of network.

In some embodiments, an autonomous or semi-autonomous vehicle may include one or more sub-networks, each sub-network including multiple sensor-type and actuator-type end devices, the end devices connected by restricted links to a hub device on the vehicle. The sensor-type end devices may be configured to measure, for example, an oil temperature, a water temperature, a battery voltage, a crankshaft rotation rate, a travel velocity and direction, and other internal or mobility parameters of the vehicle. The actuator-type end devices may be configured to operate valves and switches such as carburetor parameters, light switches including automatic light switches and windshield wiper switches, and their associated sensor-type end devices such as a light sensor or a rain sensor, among many other end devices possible. The hub device may be configured to monitor conditions measured by each of the sensor-type end devices, and to activate each of the actuator-type end devices, The hub device may be configured to manage the end devices according to a fixed pre-configured priority, or it may operate the sub-network in a manner that a higher authority (such as the driver) desires. For example, the hub device may operate the actuator-type end devices to minimize fuel consumption, or to avoid maintenance costs, maximize safety, minimize travel time, avoid rapid or sudden accelerations, or other preference that the higher authority may specify. If the higher authority does not specify a particular preference, the hub device may be configured to manage the end devices for a combination of aspects such as a compromise between fuel consumption, wear and tear, and time spent in transit, among many other possible considerations.

In some embodiments, a sub-network in an autonomous or semi-autonomous vehicle may be configured to assist an automatic driving system. For example, the automatic driving system may include a sub-network with end devices configured to control a fuel flow device and a braking device. The automatic driving system may instruct the hub device to decelerate at a particular rate of change until a target velocity is reached. The hub device may then cause a first actuator-type end device to reduce the fuel flow, and a second actuator-type end device to adjust a brake pressure, while causing sensor-type end devices to measure the speed and/or acceleration, thereby causing the controlled deceleration. As a second example, the automatic driving system may instruct a proximity sensor hub device, in a second sub-network, to determine if and when an object enters the detection range of a microwave proximity sensor at the front or rear of the vehicle. The automatic driving system may also instruct the hub device to indicate a time-to-impact based, for example, on repeated proximity measurements. Accordingly, the second hub device may instruct end devices such as proximity sensors to report the distance to any detected objects upon first detection, and to report the distance repeatedly (such as every 10 milliseconds) thereafter. The second hub device may then analyze the data in real-time, transmit a message to the automatic driving system upon first detection, and then calculate the time-to-impact based on the repeated distance measurements, and repeatedly transmit the calculated impact time to the automatic driving system. As a third example, the automatic driving system may instruct a hub device to determine whether the characteristic sound of screeching brakes is present, and in what direction, and whether they are getting louder. Accordingly, the hub device may instruct acoustical-sensor-type end devices arrayed around the vehicle to report when the high-pitched screeching noise is detected, and by which of the acoustical end devices. The hub device may then transmit a message to the automatic driving system indicating that the sound is present, and from which direction it seems to be arriving, and whether it is getting louder or softer, among other possible analysis conclusions. In these ways and many others, the hub devices can manage basic collision-avoidance processes, so that the automatic driving system is relieved of such chores, yet can alert the automatic driving system when necessary to take action.

In some embodiments, an AI model may be useful in determining the operational parameters and priorities that the hub devices are to use in controlling their sub-networks. For example, based on past preferences of a higher authority (such as the driver or other human on-board), the AI model may prioritize speed and minimal travel time, with little regard to fuel consumption or wear and tear, as long as the weather is clear and dry, but may alter the priorities for greater safety when the pavement is wet or icy. The AI model may provide such management by providing, as outputs, instructions to each hub device of the vehicle, indicating operational parameters (such as threshold values, time intervals, target values, limits, and so forth) that the hub device is to manage to. The hub devices can then control their end devices according to the operational parameters that the AI model has advised. Since the AI input parameters include the measurement values of the sensors, which are managed by the hub devices, which are managed by the AI model, a stable operating point may be discerned in which the vehicle is operated optimally according to the preferences and priorities of the higher authority. Humans attempt such a complex operational trade-off daily, but the history of AI has shown repeatedly that a well-trained AI model is almost always better at finding the maximum-preference or minimum-cost point, when the problem involves more than a few competing non-linear input parameters. In summary, a vehicle, whether human-driven or autonomous, may provide better results when an AI model manages the hub devices based on a multitude of input parameters.

Another promising application for sub-networks may be in automated manufacturing. In some embodiments, for example, a system such as an industrial machine may be provided with one or more sub-networks in service to the machine. The sub-networks may be installed during assembly of the machine, or added thereafter. Each end device and hub device on the machine may be pre-configured with firmware installed in the end devices, and with programming installed or downloaded into the hub device. Each end device may include a ROM memory containing a simple operating system suitable for the end devices, including programming to accomplish the tasks that the hub device may request, and all communication parameters (identification codes, frequencies, sub-network protocols, and the like) pre-installed in the end devices, and also optionally the hub device, during assembly or final testing of the machine. In that case, the sub-network may be fully formed when the machine is powered up. Thereafter, the hub device may discover and join a larger network, such as the factory's 3GPP network, as a user device. Even more preferable, to avoid the burdensome 3GPP discovery and initial access protocols, the hub device may be pre-configured with the 3GPP system information (such as the SSB and SIB1 message information), and a C-RNTI identification from the base station, thereby further streamlining the machine commissioning.

Further applications for sub-networks, as disclosed herein, are envisioned. For example, in a retail environment, a store may include numerous sub-networks with sensors to monitor the shelves, determine when each type of product is empty, and prompt a human or robotic re-stocker to move stock onto the shelves or order more of the product as needed. Door sensors on the refrigerated displays can indicate when a door has been left open, which is especially important for the frozen foods department. Networked sensors such as proximity sensors can accumulate valuable statistics on how many people passed through each aisle, how long they lingered in front of each display, and whether they selected the displayed product or passed it by.

In a military environment, sub-networks may enable "humane" landmines (that is, landmines that can be deactivated when hostilities end, preventing many needless civilian deaths thereafter). For example, humane landmines may be configured with transceivers, so that they can be activated and deactivated remotely. The humane landmines may include single-use codes and firmware on ROM to recognize the deactivation command, as described above. In addition, the humane mines may be instructed to transmit a detectable signal on command, such as a radio or acoustical signal, thereby facilitating mine removal when hostilities are over. The terms of truce may be to exchange the de-activation codes, thereby enabling safe demining and preventing civilian casualties. Sea mines may be configured for wireless de-activation in the same way, thereby preventing needless destruction of civilian ships. The bomblets used in cluster munitions may be wirelessly deactivated in the same way, to prevent civilian casualties from unexploded ordnance.

In an agricultural application, sub-networks may enable crop tending with very fine granularity, such as tending each plant individually without human intervention. For example, end devices proximate to each plant may indicate when localized watering or weeding or fertilizing are needed, or when the product is ripe for harvesting, or when a pest has invaded. In addition, the end devices may be configured to emit a low-power RF or sonic or infrared signal, optionally with an identifying code, to guide automated waterers and weeders and fertilizer dispensers and harvesters, among many other important agricultural applications.

In a forestry application, end devices such as temperature sensors may detect wildfires and enable instantaneous precision firefighting by indicating the location of the front in real-time, all without endangering personnel.

In an orchard application, end devices may include frost detectors, which may be distributed throughout each tree. During a cold snap, the end devices can indicate which items of fruit need to be picked and juiced immediately due to frost damage, and which ones can be left to ripen further.

In a chemical processing plant, numerous sensors and valve actuators and thermal controls can be configured as end devices. Each sub-network can be controlled by an intelligent hub device, thereby avoiding burdening the plant 3GPP network with constant little adjustment messages. The hub devices can then transmit digested data such as tallies and process volumes and other summary information to the plant control program, simplifying management and enabling operators to focus their attention on problem solving instead of routine operations.

In a hospital application, end devices may be configured as door monitors on patient rooms, such as the type of door monitors that indicate whether the door is being opened from the inside or the outside. Hence the hub device can determine, from the end device data, whether staff is entering the room as usual, or whether the patient is unexpectedly leaving the room. A similar sub-network may be useful in a prison environment to determine whether a cell door is being opened from the inside or outside, an important distinction.

In an airliner, each seat can be monitored by an occupancy sensor, so that the cabin staff or the pilot can determine when everyone is seated for taking off or landing. Many more applications are envisioned for sub-networks than those disclosed herein.

Glossary of Terms

Terms herein generally follow 3GPP (third generation partnership project) standards, but with clarification where needed. Jargon, ambiguous terms, and unhelpful acronyms are avoided. As used herein, "5G" represents fifth-generation (including 5G Advanced), and "6G" represents sixth-generation (and later-generations) wireless technology. A 3GPP network (or cell or "LAN" Local Area Network or "RAN" Radio Access Network or the like) may include a base station (or "gNB" or generation-node-B or "eNB" or evolution-node-B or "AP" Access Point or "PRAS" premises radio access station, among other names) in signal communication with a plurality of user devices (or "UE" or User Equipment or user nodes or terminals or wireless transmit-receive units) and operationally connected to a core network ("CN") which handles non-radio tasks, such as administration, and is usually connected to a yet larger network such as the Internet. "IoT" or Internet of Things refers to sensors and actuators configured to communicate wirelessly. The time-frequency space is generally configured as a "resource grid" including a number of "resource elements", each resource element being a specific unit of time termed a "symbol period" or "symbol-time", and a specific frequency and bandwidth termed a "subcarrier". Symbol periods may be termed "OFDM symbols" (Orthogonal Frequency-Division Multiplexing) in which the individual signals of multiple subcarriers are added in superposition. Thus a resource element, spanning a single symbol period in time and a single subcarrier in frequency, is the smallest unit of a message. "C-RNTI" (cell radio network temporary identification) is an identification code of a user device. "DRX" (discontinuous reception) refers to devices going into a low-power incommunicative mode periodically. "SSB" (synchronization signal block) and "SIB1" (system information block 1) are system information messages needed for new user devices to register on a 3GPP network. "PUCCH", "PDCCH", "PUSCH", and "PDSCH" are certain managed channels of the 3GPP network. "SNR" represents the signal-to-noise ratio, with no distinction between noise and interference unless specified. "Random" includes both "pseudo-random" (according to a formula), and "true random" (a physically stochastic bit generator).

In addition to the 3GPP terms, the following terms are defined. A "sub-network" is a plurality of end devices wirelessly communicating with a hub device, which communicates with a larger network such as a 3GPP network or the Internet. The sub-network may be a "PIN" (personal IoT network), or a "CPN" (customer/corporate premises network) or other collection of wireless devices, with limitations explained below. The sub-network may be configured in a "star" or "hub-and-spoke" architecture in which multiple end devices communicate with a single hub device. An "end device" is a sensor or actuator configured to communicate wirelessly with a single hub device. A "hub device" is a user device of a larger network, such as a 3GPP network, and also a member of a sub-network, configured to communicate wirelessly with all of the end devices of its sub-network. A "3GPP" network is a network configured according to standards promulgated by 3GPP (Third Generation Partnership Project). A "restricted link" is an exclusive communication link between the hub device and an end device, with restrictions explained herein. On a restricted link, the end device can transmit only data and the hub device can only transmit commands, in some embodiments. "Upcast" refers to unicast messages from an end device to its hub device on a restricted link, and "downcast" refers to unicast messages from a hub device to a particular one of its end devices on a restricted link. "LP-IoT" stands for low-cost low-complexity low-current low-crosstalk Internet of Things. A "higher authority" refers generally to any entity responsible for overall direction of a network, such as the owner. The "bottom" of a memory refers to the lowest location such as zero, and the "top" of the memory refers to the highest location.

Although in references a modulated resource element of a message may be referred to as a "symbol", this may be confused with the same term for a time interval ("symbol-time"), or a composite waveform or "OFDM symbol", or each character in a demodulated message, among many other things. To avoid ambiguities herein, each modulated resource element of a message is referred to as a "modulated message resource element", or more simply as a "message resource element", in examples below. A "demodulation reference" is one or more modulated "reference resource elements" or "reference elements" modulated according to the modulation scheme of the message and configured to exhibit levels of the modulation scheme (as opposed to conveying data). A "short-form" demodulation reference is a demodulation reference that exhibits only selected amplitude or phase levels, such as the maximum and/or minimum amplitude or phase levels, from which the receiver can determine any intermediate levels by calculation. A message may be transmitted "time-spanning" by occupying successive symbol-times on a single subcarrier, or "frequency-spanning" by occupying a single symbol-time on multiple subcarriers (not to be confused with time-division duplexing TDD and frequency-division duplexing FDD which pertain to duplexing of message pairs, and have nothing to do with the shape of each message in time-frequency space).

As mentioned, a "PROM" (programmable read-only memory) can be changed only under certain circumstances such as with a certain voltage applied, a "UROM" (unalterable read-only memory, sometimes called NVROM or non-volatile read-only memory) cannot be changed. As used herein, "ROM" (read-only memory) includes all of those types. In contrast, "RAM" (random-access memory) can be read and written routinely. RAM is generally transitory and volatile, while ROM is usually non-transitory and persistent through power cycles. A "hacker" is anyone attempting unauthorized entry into a network wirelessly.

FIGURES

Turning now to the figures, the following examples show how various arrangements of LC-IoT devices in a sub-network can provide sufficient support for the end devices, without significantly impacting the larger network.

FIG. 1 is a schematic showing an exemplary embodiment of sub-networks connected to a larger managed network, according to some embodiments. As depicted in this non-limiting example, a 3GPP network 110 (dashed circle), such as a 5G or 6G based network, is shown with three sub-networks 104 (dotted enclosures). Each sub-network 104 includes several end devices 101 (circles) in communication with a hub device 102 (squares) via a restricted link 106 (dashed arrow). The 3GPP network 110 includes a base station 103 and a core network 108 (hexagons), communicating with the hub devices 102 (and with other user devices—not shown) via 5G or 6G messaging links 107 (doublewide arrow). The core network 108 communicates with the Internet 111 via a multi-hop link 109, in this case.

In the depicted embodiment, each hub device 102 manages the end devices 101 of its sub-network 104. The hub device 102 transmits instructions to the end devices 101 on the restricted links 106, and also receives data messages from the end devices 101 on the restricted links 106. Simultaneously, the base station 103 and core network 108 manage the 3GPP network 110 via the 5G/6G links 107. The hub devices 102 serve as gateway devices between the end devices 101 and the base station 103. When the 3GPP network 110 needs to send a message to one of the end devices 101, the message proceeds on a 5G/6G link 107 between the base station 103 and the hub device 102, and then the hub device 102 transmits a downcast message to the end device 101 on a restricted link 106. To report data back to the 3GPP network, the end device 101 first transmits the information upcast to the hub device 102 on the restricted link 106, and the hub device 102 sends the information to the base station 103 on the 5G/6G uplink 107.

In the depicted embodiment, the end devices 101 cannot communicate with the base station 103 directly. By avoiding direct communication between the end devices 101 and the base station 103, the 3GPP network 110 is protected from a wide range of cyber attacks. Even in the unlikely circumstance that one of the end devices 101 is somehow compromised, the hub device and the larger network remain protected due to the tightly controlled protocols of the restricted links, as detailed below.

In some embodiments, the hub devices 102 may manage the end devices 101 largely autonomously, transmitting summary reports on the larger network only occasionally. The sub-networks may thereby relieve the base station 103 of the detailed real-time sensor management responsibilities, which the hub devices 102 are better positioned to handle.

Figure 2:
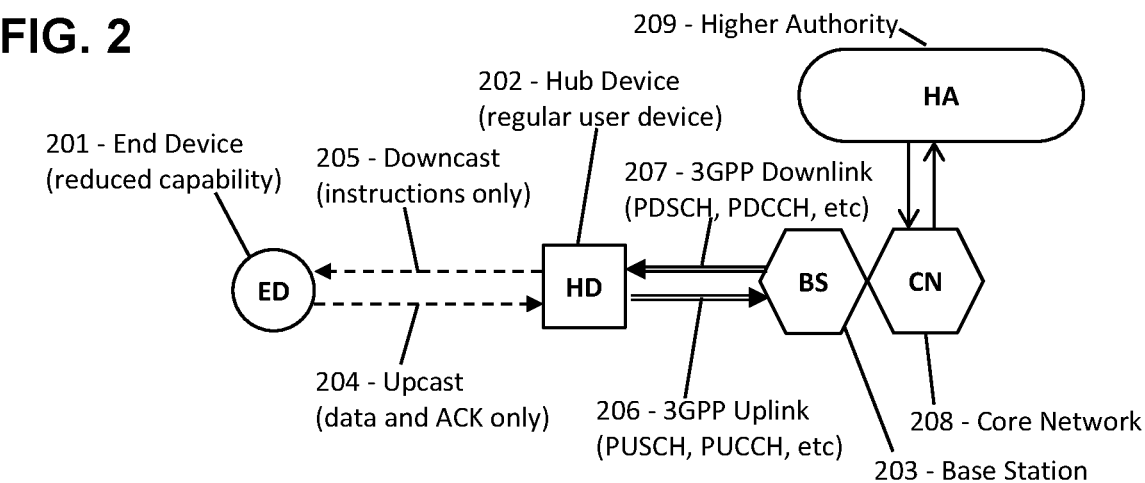
FIG. 2 is a schematic showing an exemplary embodiment of communication between an end device, a hub device, a base station, and a higher authority, according to some embodiments.

FIG. 2 is a schematic showing an exemplary embodiment of communication between an end device, a hub device, a base station, and a higher authority, according to some embodiments. As depicted in this non-limiting example, a reduced-capability end device ED 201 communicates with its hub device HD 202 via restricted links, in this case a restricted upcast link 204, which is permitted to carry only raw measurement data or pre-configured answers such as an acknowledgement to the hub device 202, and a restricted downcast link 205 restricted to carry only instructions to the end device 201. The hub device HD 202 is a regular user device registered on a 3GPP network, communicating with a base station BS 203 via managed 5G/6G downlinks (PDSCH and PDCCH usually) 207 and managed uplinks (PUSCH and PUCCH usually) 206. Not shown are broadcast channels, random access, and a few other special-purpose channels. The base station BS 203 is wired to the core network CN 208 which communicates in various ways (plain arrows) with the higher authority HA 209.

As is apparent in this example, the end devices 201 do not communicate directly with the base station 203, nor with any wireless entity other than the hub device 202. The end devices 201 receive instructions from, and send measurement data to, their hub device 202 only. The hub device 202 is responsible for direct management of its end devices 201, and initial processing of the measurement data 204, before passing the data (usually in summary form, or otherwise processed) to the base station 203. In this example, the hub device 202 communicates instructions to the end device 201 in real-time, and receives data or pre-configured answers from the end device 201. The sub-network operates largely autonomously from the 3GPP network in this case. Communication of the summary results to the base station 203 are generally much less frequent than communication within the sub-network, and input from the higher authority 209 are generally quite rare, in most cases. The higher authority may order a change in overall operations, or may respond to an alarm condition, for example, and otherwise may leave the depicted system alone to do its routine job.

The example also shows how the 3GPP network may be protected from attack coming through the sub-network. Even if the attacker manages to corrupt one of the end devices 201, the attacker is then able, at most, to transmit bogus measurement data or bogus acknowledgements to the hub device 202, since that is all the end device 201 is capable of transmitting. The hub device 202 is programmed to treat everything coming from the end device 201 as raw measurement data or pre-configured acknowledgements. The hub device 202 may be configured to perform averaging or trend extraction or other processed conclusions (collectively termed "summary data") based on the measurement data, and may also be configured to check the measurement data for signs of corruption such as highly improbable measurement data, among other tasks. The hub device 202 can then pass the analyzed or processed summary data to the base station 203. Each of these steps presents a high barrier to the attacker, protecting the hub device 202 from infection since no executable code is transferred upcast, and if it is, the hub device 202 would simply treat it as data and average it with the other measurements, thereby rendering the hidden code unintelligible and harmless. In addition, the hub device 202 is assumed, in this example, to include the same strict cybersecurity protocols as any user device of a 5G/6G network, which generally protects against mistakenly executing data as computer code. In addition, the base station 203 receives only the twice-processed summary data from the hub device 202, thereby destroying any hidden code and further shielding the base station 203 from infection. The restricted upcast link 204 thus acts as a selective firewall protecting the hub device by enabling only data upcast, thereby limiting attack options, and secondly by the hub device 202 treating all upcast messages as data or pre-configured replies exclusively.

Figure 3:
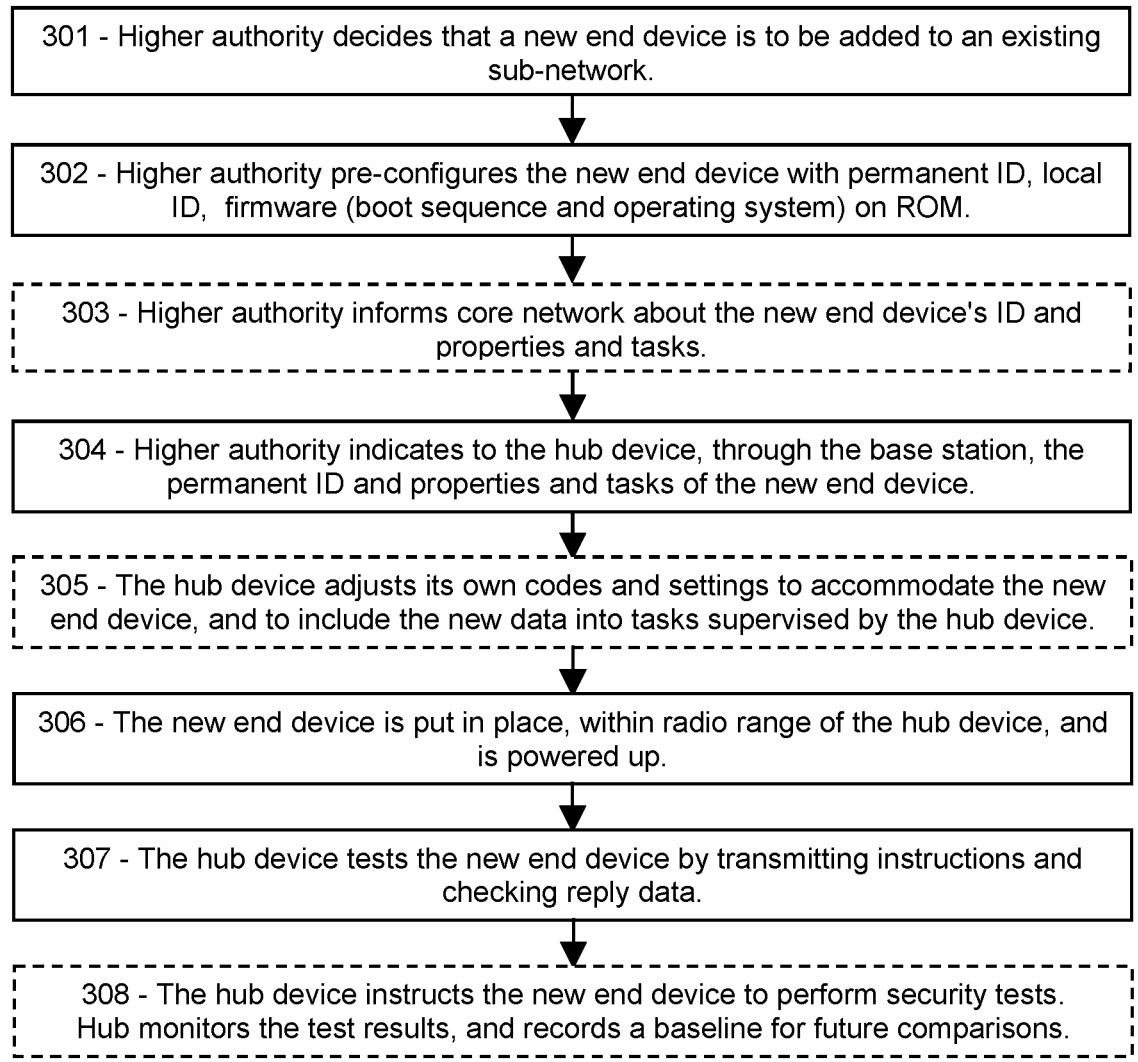
FIG. 3 is a flowchart showing an exemplary embodiment of a procedure for adding an end device to an existing sub-network, according to some embodiments.

FIG. 3 is a flowchart showing an exemplary embodiment of a procedure for adding an end device to an existing sub-network, according to some embodiments. The flowchart items may be executed in any order. As depicted in this non-limiting example, an existing sub-network is joined by a new end device.

At 301 a higher authority (such as an owner or operator or human manager of the network, or an autonomous entity such as an AI controller, or a remote director such as a cloud-based system model) decides that a new end device should be added to an existing sub-network of a 3GPP network. For example, in a chemical processing plant, a multi-step process loop may be controlled by a plant-wide 5G network that includes a base station. User devices of the cell are responsible for various subsystems in the process loop. A particular user device of the 5G network may be responsible for controlling a variable-speed pump, for example. The particular user device may also be the hub of a sub-network that includes a number of end devices, including various sensors and actuators. The sensors and actuators may be wirelessly linked to the particular user device, and may be configured to communicate with nothing else. In this case, the higher authority has decided that another temperature sensor needs to be added to the sub-network, for example to monitor heat losses while material flows through a pipe.

At 302, the higher authority or its agents prepare the new temperature sensor for communications with the hub device, by installing a globally unique permanent identification code, a shorter local identification code, and firmware on ROM. The firmware includes an automatic boot sequence (starting, for example, at a particular address such as zero or hex-100) and an operating system (starting immediately after the boot sequence). Preferably (not shown), the new end device may be bench-tested before installation to ensure correct functioning.

At 303, the higher authority or its agents may indicate to the core network or the base station of the 5G network that a new sensor is being added to the particular sub-network. The higher authority may also specify the identification codes and properties of the new sensor. The 5G network may keep a record of the various sub-networks and their end devices, notwithstanding that the 5G network cannot communicate with the end devices directly, since the larger network generally communicates task orders involving the end devices to the hub device, and receives summary reports from the hub device based on the measurements of the end devices.

In other embodiments, the 5G network may be unaware of the end devices and sub-networks within the 5G network, since it only deals with the hub devices. In that case, the 5G network may be configured to communicate general goals or instructions to the hub devices, to accomplish plant-level tasks, without concern about how the hub devices, and their end devices, accomplish those tasks. The hub device then knows how to trigger its end devices to accomplish the requested tasks.

At 304, the higher authority or its agents communicate to the hub device (by messaging via the base station or the core network for example), indicating the identification codes and the intended functions of the new sensor. The hub device thereby finds out that the new end device is a member of its sub-network, and integrates the new sensor into the process steps that the hub device supervises. For example, the hub device can plan to instruct the new end device to make measurements periodically, monitoring the temperature of the pipe and reporting the results on the same or a different periodicity. Alternatively, the hub device may instruct the new sensor to make a measurement on request, based for example on a flow sensor in the same or different sub-network.

At 305, optionally, the hub device may include software to incorporate the new sensor into its tasks. For example, the hub may record the identification codes and properties of the new device, add the new sensor data to tabulations or analyses of process data, and other steps. The hub device may do these steps autonomously if capable, or with direction from the higher authority. For example, the higher authority may reprogram the hub device to include the new sensor into the process steps, if the hub device is not able to do so itself. It is a matter of implementation whether the hub device is capable of incorporating the new sensor autonomously.

At 306, if not sooner, the new sensor is physically installed on the pipe and is powered up. The new device may have a battery, or it may be wired to the facility DC source, or it may be inductively powered, or it may harvest power from temperature changes in the pipe, or it may have a photoelectric panel, among many other possibilities.

At 307, the hub device tests the new sensor by transmitting commands on the restricted link and checking the measurement results.

At 308, shortly after installation, the hub device may instruct the end device to perform certain security tests, and may record the results of those tests for future comparisons. For example, the hub device may instruct the end device to calculate a hash of the operating system, and may measure the time required for the end device to report the results. The hub device can then check that the hash is correct (and may alert the higher authority if not), and may also record the response time to compare with a future integrity test. For example, when a hacking attack is suspected, the hub device can instruct the end device to again perform the security tests, and can compare the results to the earlier recorded information. In other embodiments, the security testing may be performed during the bench testing and provided to the hub device along with the identification codes. By either method, the hub device may be able to detect a malfunction or a cyber attack according to a change in the security test results or the elapsed time for them. For example, the hub device may determine the amount of time required for the end device to carry out a particular security test and report the results to the hub. The hub device may record the values and times for each of several security tests. At a later time, responsive to a suspicious event or according to a predetermined schedule, the hub device can order the same tests and then determine, from changes in the values reported or the time intervals occupied, whether a problem has arisen.

It may be noted that such time testing is possible only on a real-time at-will communication protocol, as in a sub-network with restricted links. This is generally not possible in a 3GPP network, due to the predetermined symbol granularity and the unknown delays involved in obtaining transmission permissions.

Figure 4:
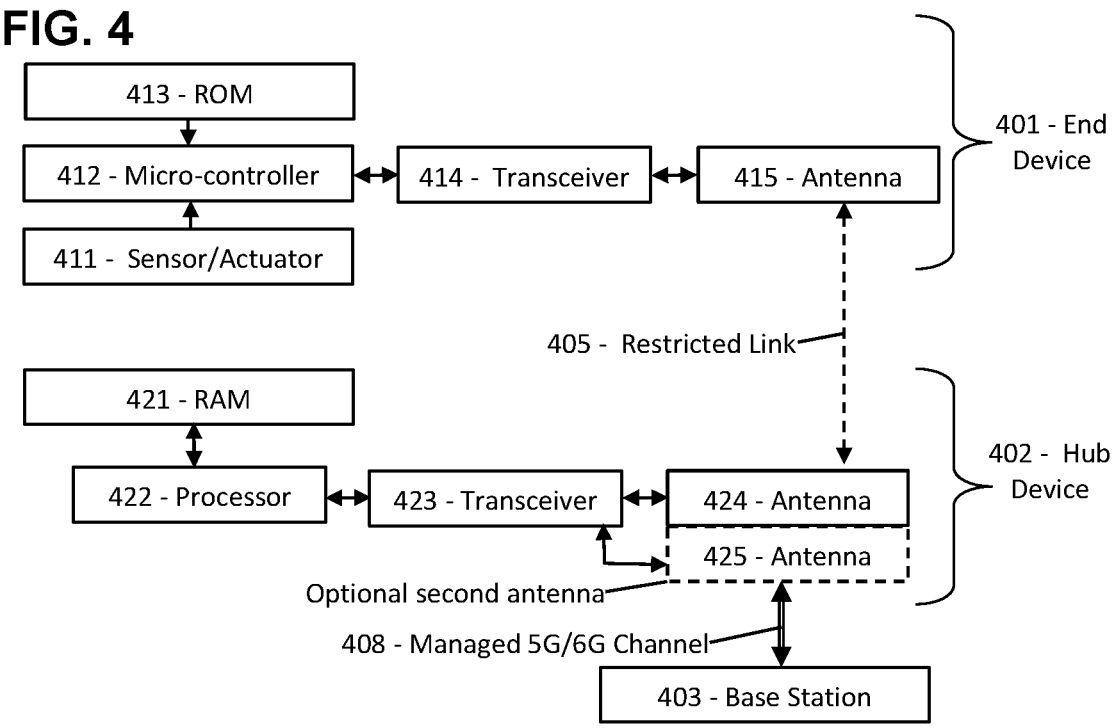
FIG. 4 is a schematic showing an exemplary embodiment of a sub-network communicating with a larger managed network, according to some embodiments.

FIG. 4 is a schematic showing an exemplary embodiment of a sub-network communicating with a larger managed network, according to some embodiments. As depicted in this non-limiting example, an end device 401 of a sub-network communicates with a hub device 402 via a restricted link 405, and the hub device 402 communicates with a 3GPP base station 403 via a 5G or 6G managed channel 408.

The end device 401 includes a sensor or actuator 411 controlled by a processor such as a micro-controller 412 which executes instructions contained in a read-only memory 413. The micro-controller 412 includes, or is connected to, a radio transceiver 414 with an antenna 415 configured for receiving commands and transmitting data to the hub device 402 via the restricted link 405.

The hub device 402 includes a processor 422 with RAM memory 421 (and optionally ROM or other memory, not shown). The processor 422 includes, or is connected to, a transceiver 423 with a first antenna 424 configured to communicate with the end device 401 via the restricted link 405. The hub device 402 is also configured to communicate with the base station 403 via the managed 5G/6G link 408. A second antenna 425 may be required for these two different types of communication. The same antenna 424 may be used for both sub-network and 3GPP network communications if the frequency range allocated to the restricted link 405 is proximate to the frequency range used by the 3GPP network, and if the sub-network signaling can be arranged to avoid interference with the larger network. If, however, the sub-network frequency range is substantially different from the 3GPP frequency range, then the hub device 402 may need the second antenna 425 as shown, to handle both types of communications.

Figure 5:
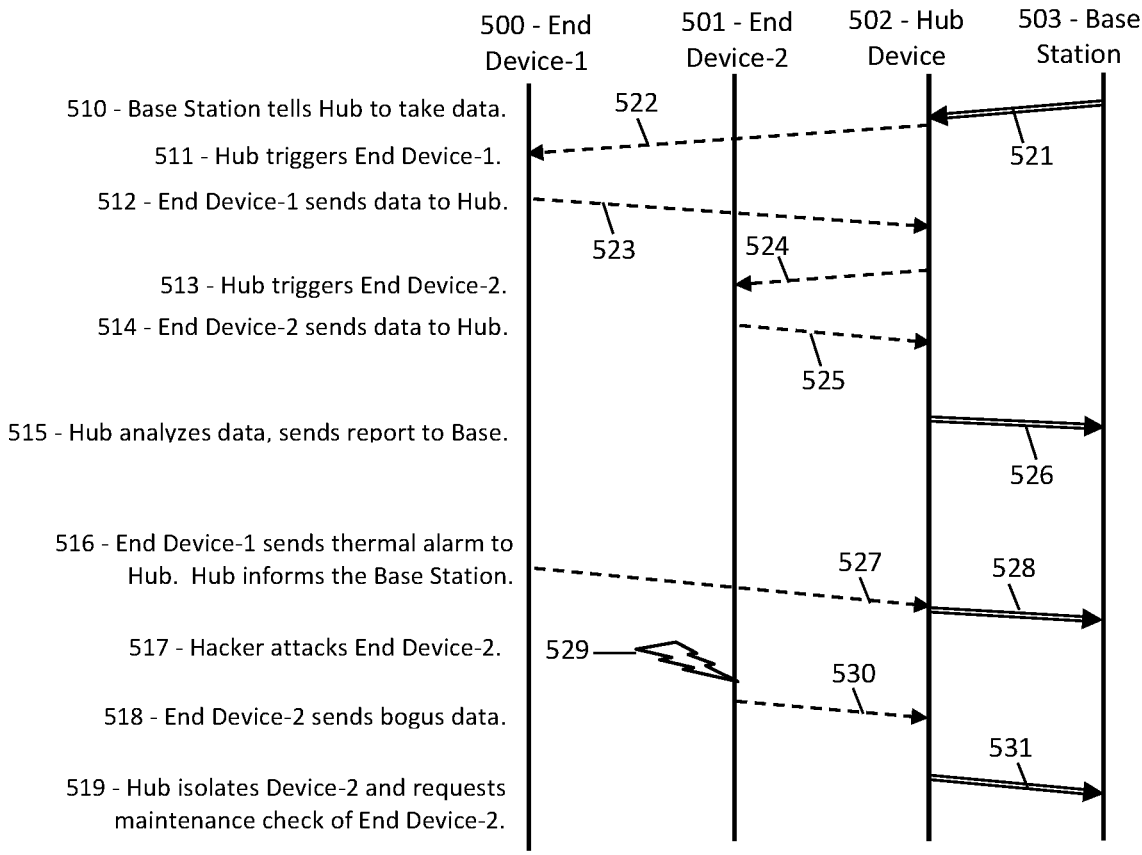
FIG. 5 is a schematic showing an exemplary embodiment of two end devices in a sub-network communicating with a hub device, according to some embodiments.

FIG. 5 is a schematic showing an exemplary embodiment of two end devices in a sub-network communicating with a hub device, according to some embodiments. As depicted in this non-limiting example, a first end device 500 and a second end device 501 of a sub-network are in communication with a hub device 502, and the hub device 502 is in communication with a 3GPP base station 503. Restricted communications in the sub-network are shown dashed, and managed 5G/6G communications in the 3GPP network are shown as doublewide arrows. In this example, the 3GPP network, or a higher authority, decides it is time for the sub-network to take data, which it does. Later, a hacker attacks the sub-network, unsuccessfully.

At 510, the base station 503 transmits a 5G/6G message 521 to the hub device 502 indicating that fresh measurement data is needed from the sub-network. At 511, the hub device 502 transmits a downcast instruction 522 to the first end device 500. The downcast instruction 522 causes the first end device 500 to make a measurement, such as a temperature measurement for example. At 512, the first end device 500 transmits an upcast data message 523 to the hub device 502 indicating the temperature measurement numerically.

At 513, the hub device 502 transmits a downcast message 524 to the second end device 501, instructing it to actuate an actuator such as flipping a switch. At 514, the second end device 501 does so, and then transmits an upcast message 525 indicating that the switch was successfully actuated. At 515, the hub device 502 transmits an uplink message 526 to the base station 503 indicating the temperature and the switch state, thereby concluding the requested operation.

At 516, the first end device 500 detects that the temperature has exceeded a predetermined threshold, and transmits a thermal alarm message 527 to the hub device 502. The hub device 502 may transmit an acknowledgement (not shown) back to the first end device 500. The hub device 502 then transmits a 5G/6G message 528 to the base station 503, informing of the alarm condition. In this case, the base station 503, or a higher authority, decides to resolve the alarm condition by another means, not shown.

At 517, a hacker attempts to intrude into the second end device 501, as indicated at 529, thereby causing the second end device 501 to transmit a bogus data upcast message 530 to the hub device 502 at 518. The hub device 502 receives the bogus message 530, notes that it is an unsolicited message which is not an alarm, and therefore is suspicious. Alternatively, the hub device 502 may determine that the message 530 is meaningless, or in violation of proper sub-network formats, or using an unassigned identification code, among many other aspects that the hub device 502 could check. Upon determining that there is something amiss with the second end device 501, the hub device 502 then transmits, at 519, an uplink message 531 to the base station 503 requesting maintenance of the second end device 501. In addition, to ensure that no infection can propagate to the 3GPP network, the hub device 502 may inhibit all further communications with the second end device 501, and/or may cease all further uplink transmissions in the 3GPP network, until signaled by the 3GPP network that the problem has been resolved.

Optionally, the hub device 502 may warn the base station 503, in the uplink message 531, to handle the uplink request message 531 with care, since the sub-network may be infected. In that case, the base station 503 may quarantine the uplink message 531, or erase it after registering the information. The base station 503 may also quarantine the hub device 502, and therefore the entire sub-network, until the problem has been resolved.

Alternatively, after discovering irrational behavior of the second end device 501, the hub device 502 may cease all transmissions to the base station 503, and instead may instruct the second end device 501 to re-boot. In addition, the hub device may order all of the end devices in its sub-network to re-boot. Each end device would then re-boot from its ROM, and clear all registers and RAM, thereby erasing any presence of the hacker in the sub-network. The hub device 502 may then perform, or cause the second end device 501 to perform, a series of tests to ensure that the infection is gone. Only after verifying that the sub-network is infection-free, the hub device 502 may then transmit an uplink message to the base station 503 informing it of the events and the successful restoration, in this example.

If the second end device 501 continues to act erratically after its re-boot, or fails other system checks that the hub device 502 may order, the hub device 502 may request maintenance of the second end device 501, and may contrive a work-around using other end devices instead of the second end device 501, as well as other actions, depending on the implementation.

Figure 6:
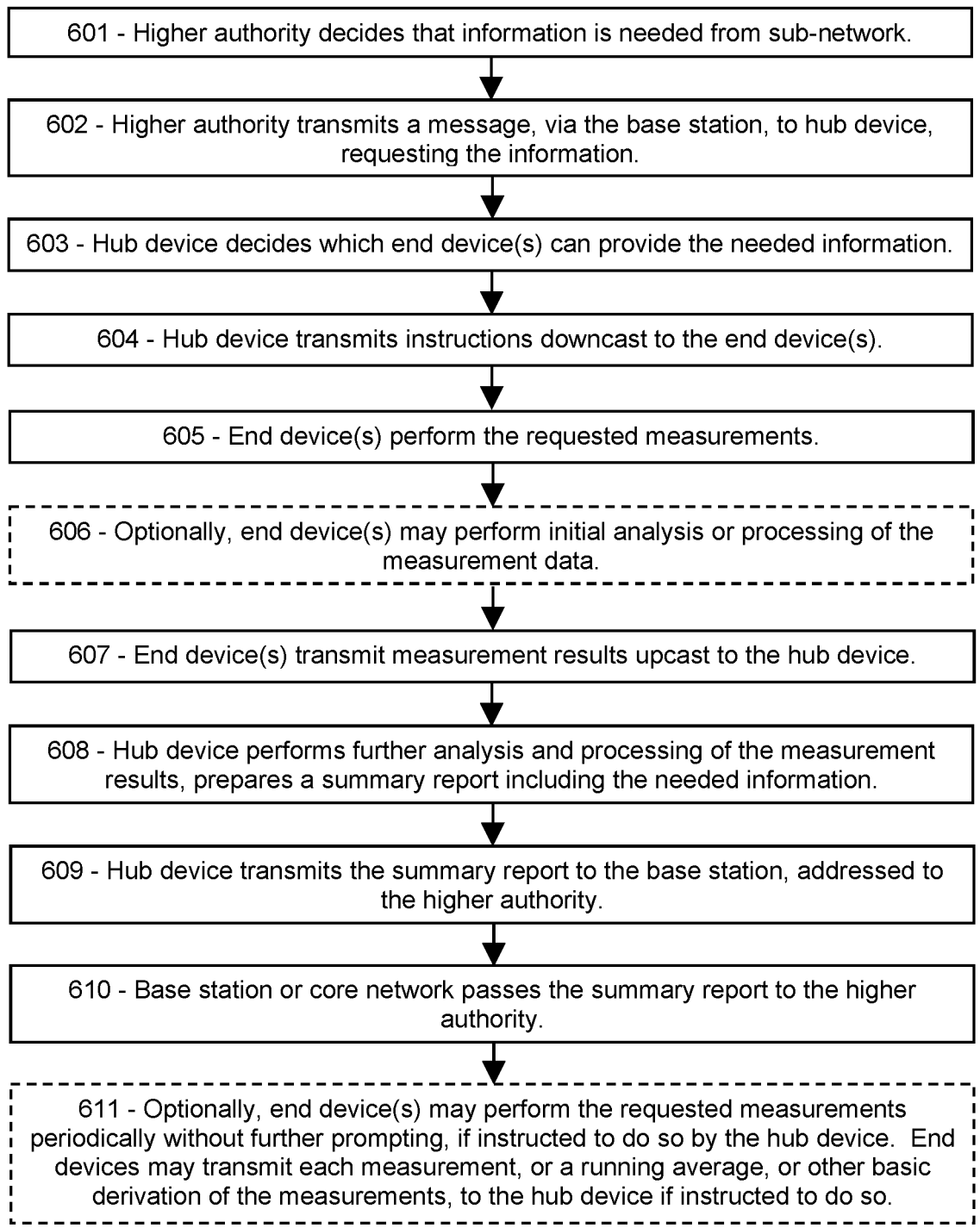
FIG. 6 is a flowchart showing an exemplary embodiment of a procedure for prompting a sub-network to acquire sensor data, according to some embodiments.

FIG. 6 is a flowchart showing an exemplary embodiment of a procedure for prompting a sub-network to acquire sensor data, according to some embodiments. The flowchart items may be executed in any order. As depicted in this non-limiting example, an end device performs a task such as acquiring data.

At 601 the higher authority determines that it is time for the sub-network to perform its task, such as acquiring process data or controlling process parameters, for example. Alternatively, the hub device may determine, from an internal timer for example, that a predetermined interval has expired, and may order the measurement at that time. As another alternative, the hub device may determine, based on one of its sensors, that actions of another one of its end devices are needed, such as reducing a heater when a temperature reaches a threshold, for example.

At 602, in this case, the higher authority or its agents transmit a message through the 5G network to the hub device, requesting the action or measurement result.

At 603, the hub device decides how to perform the requested action or measurement, using its end devices. In this example, the higher authority does not tell the hub device which end devices to trigger or other micro-managing instructions. Instead, the higher authority asks for a result, and the hub device knows (or can figure out) how to get that result.

In another embodiment, the larger network or the higher authority may be more directly involved in the sub-network operations. For example, the higher authority may specify, in a downlink message to the hub device, which sensors to use in making the measurement, and whether to average multiple measurements, and how many times or when to repeat the measurement, and what to do if the temperature gets too high.

At 604, after deciding what needs to be done and in what order, the hub device transmits instructions to one or more end devices, causing them to make measurements or activate switches, for example, which they do at 605. Often a series of basic actions are necessary to accomplish the requested operation, each basic action corresponding to one of the end devices. Some of those basic actions may depend on the results of other basic actions, but it is all managed by the hub device in this case. For example, the hub device may determine that a temperature has reached a threshold, instruct an actuator to open a switch leading to a heater, and then trigger another sensor that checks whether the heater is cooling down. If not, the hub device may determine that the switch is stuck and may command the actuator to open and close the switch repeatedly a few times or until the heater begins cooling. The hub device may also send a maintenance request to the larger network for replacing the sticky switch.

At 606, optionally, an end device may perform an initial analysis of data that it has acquired, before sending the data (or a synopsis) to the hub device. For example, a temperature sensor known to be noisy or low-resolution may be interrogated repeatedly by the end device, collecting multiple measurements. The end device may average or otherwise smooth the data for better precision, and may then transmit just the averaged value to the hub device at 607. If the end device is an actuator, the end device may "know" (based on its firmware) that a particular heater switch is driven by a solenoid, and therefore should be pulsed momentarily to set the switch on or off, instead of leaving the power on continuously. Thus the end device would apply a brief but sufficient pulse to the solenoid to actuate it. For example, the end device may apply a positive pulse or a negative pulse, depending on whether the switch is to be opened or closed. The end devices may be programmed (in their ROM firmware) to do such basic actions needed to carry out their tasks, so that the hub device is not burdened by excessive communications within the sub-network. In the same way, the hub device may know, based on its software, how to instruct its end devices to perform the sub-network operations and get the results needed without having to tell each end device how to do its measurement. (Probably, the hub device has no idea how its end device performs the measurement, but that is ok because the end device does.) In a similar way, the end device may transmit just a summary report (or none at all) to the base station at 608 and 609, thereby avoiding burdening the 3GPP network needlessly with routine or repetitive or unimportant information, barring an alarm condition. In the same way, the base station may transmit just an occasional synopsis of the day's production to the higher authority at 610 instead of a task-by-task update which the higher authority is probably not interested in, unless something went wrong. In summary, the network architecture makes it possible to move tasks downward to the lowest entity capable of performing them, thereby avoiding overloading each communication link and each entity, including the end devices, the hub device, the base station, and the higher authority.

At 611, optionally, the hub device may have instructed an end device to perform its task periodically, such as monitoring a temperature every 10 seconds. The end device may be instructed to report a running average from time to time, or more preferably no report at all unless the temperature goes outside a predetermined range. Each device in the network is thus responsible for performing work at the highest level it is capable of accomplishing, while transmitting only necessary messages up and down when needed. Communication is expensive and bandwidth is limited. Therefore, each entity is expected to do what it can to minimize unnecessary communications and make the overall operation run smoothly.

FIG. 7 is a flowchart showing an exemplary embodiment of a procedure for prompting a sub-network to perform a task using an actuator, according to some embodiments. The flowchart items may be executed in any order. As depicted in this non-limiting example, the task is similar to the previous one, but now focused on actuator commands and complex sequences.

At 701, a higher authority, such as an engineering or operations director, determines when certain work needs to be done. The triggering event may be a situation, such as the arrival of a part that needs to be drilled, or it may be a time, such as a predetermined scheduled time. The higher authority or its agents select which hub device, and which end devices, are to do the work in this example.

At 702, the hub device detects the trigger event, the scheduled time, or the arrival of the part, for example. At 703, if not sooner, the hub device receives a downlink message from the base station indicating which of its end devices is to do which sub-tasks in which order, to complete the work. Accordingly, at 704, the hub device begins instructing the appropriate end devices to do their thing. For example, if the hub device determines that a part has arrived at an automated machining station, the hub device can instruct a gripper tool to grip the part and position it for proper drilling of a hole. In addition (not shown) a sensor such as a limit switch can detect when the part is correctly positioned, and can send a message to the hub device when the limit switch is closed, indicating correct positioning.

At 705, the triggered end devices perform their tasks. For example, the gripper tool grips the part and positions it, then the limit switch device sends an upcast message indicating that the part is positioned, and then the hub device triggers another actuator which lowers a drill into the part, thereby drilling the hole.

At 706, optionally, an actuator end device or other end device may make a measurement after the drilling, to check the hole. The measurement may indicate, for example, whether the hole was drilled in the right place and was drilled all the way through the part.

At 707, the actuator end device transmits a data message to the hub device verifying that the drilling was completed. If validation measurements were performed, the results may also be transmitted to the hub.

At 708, the hub device needs to activate a different end device to finish the job, such as placing the drilled part on a conveyor belt. At 709, the hub device instructs a placer-type end device to pick up the drilled part and place it on the conveyor. The end device does so, and optionally informs the hub device when done. At 710, the hub device checks the results and determines whether the task was properly completed.

At 711, if the task was not completed properly in any of the preceding steps, the hub device may attempt to correct it by transmitting new instructions to the end devices, such as starting over with the initial gripping of the part and then positioning and drilling as mentioned. Alternatively, the recovery process may involve handing the incomplete part to a second machine that provides more versatile responses, or to a human for inspection.

At 712, the hub device may indicate, in a message to a higher authority for example, that the task was finished. The message may also indicate whether there were problems.

FIGS. 8A and 8B are schematics showing an exemplary embodiment of sub-network features that prevent various types of wireless cyber attacks, according to some embodiments. As depicted in this non-limiting example, 39 common hacking attack methods 801 and 811 are listed on the left, and the features of the disclosed sub-networks that negate those threats are listed on the right 802 and 812.

For example, the first threat type is "arbitrary code execution" in which the attacker injects malware code into the victim's execution memory, and the victim processor unknowingly executes it. However, as indicated on the right, the end devices disclosed herein have intrinsic immunity from that type of attack because they execute code only contained in ROM, which no attacker can alter. The attacker might conceivably inject malware into RAM of the end device, but if the processor of the end device is configured to execute code only from ROM, never from RAM or other volatile memory, then the attack fails. In addition, the system code that causes the processor to execute only from ROM is also contained in ROM. Therefore the attacker cannot change the "execute only from ROM" feature without changing the operating system, which he cannot do because it is in ROM. (In some embodiments, the "execute only from ROM" requirement may be hard-wired in the processor micro-code, which the hacker cannot change, thereby providing the same level of protection as the ROM version.)

The other threats such as Backdoor, Advanced Persistent Threat, Zombie, Rootkit, and Bootkit attacks, are defeated for the same reasons—the end device boots from ROM and executes only from ROM. In addition, upon each re-boot, the end device can be configured to erase all RAM and registers and everything else that an attacker could conceivably alter, before proceeding with communications. The re-boot thereby wipes out the attacker's entire progress and eliminates the infection. As mentioned, the end device can be configured to re-boot frequently, such as once per second, minute, or hour, or upon transmitting each upcast message, or after each measurement, or after detecting any suspicious behavior, or at random times, to further frustrate the attacker.

The other attack types in the list have similar protections. For example, Keyloggers that record keystrokes are defeated because the end devices have no keyboard and no keys. Privilege Escalation, in which the attacker succeeds in increasingly adding to its privilege status, is defeated because the end devices have no privilege structure. Shellcode attacks, in which the attacker starts a new shell or thread, are defeated because the end devices do not use shells; they only execute sequential pre-configured ROM code, responsive to each instruction from the hub. Cryptojacking fails because the end devices don't use crypto. Email fraud, Spoofing, and Phishing attacks are useless because the end devices have no email. Screen Scraping (recording information displayed on a user's screen) won't work because there is no user involved, and anyway the end devices have no screen. All of the attacks involving the Internet are moot because the sub-network is not on the Internet. The remaining attack types are also defeated in a similar way, as indicated on the right side of each item.

In each case, a determined hacker may at most succeed in distorting the sensor data of an end device, or vandalistically triggering an actuator, but this is a trivial annoyance limited to one end device, and cannot lead to a wider infection. In addition, such a limited intrusion is readily eliminated by a re-boot of the affected end device, or of the entire sub-network upon any suspicion, thereby promptly eliminating any hacking attack before it can do significant damage. The infection goes no farther.

The attack is generally inconsequential if the infection cannot penetrate the hub device. For example, none of the attack types listed in FIGS. 8A and 8B would lead to an infection or intrusion of the 3GPP network, for the reasons shown 802 and 812. Hence the disclosed sub-networks may be considered fully cybersecure by 3GPP standards, despite having none of the advanced cybersecurity software that the 3GPP user devices (including the hub device) are required to implement.

Figure 9:
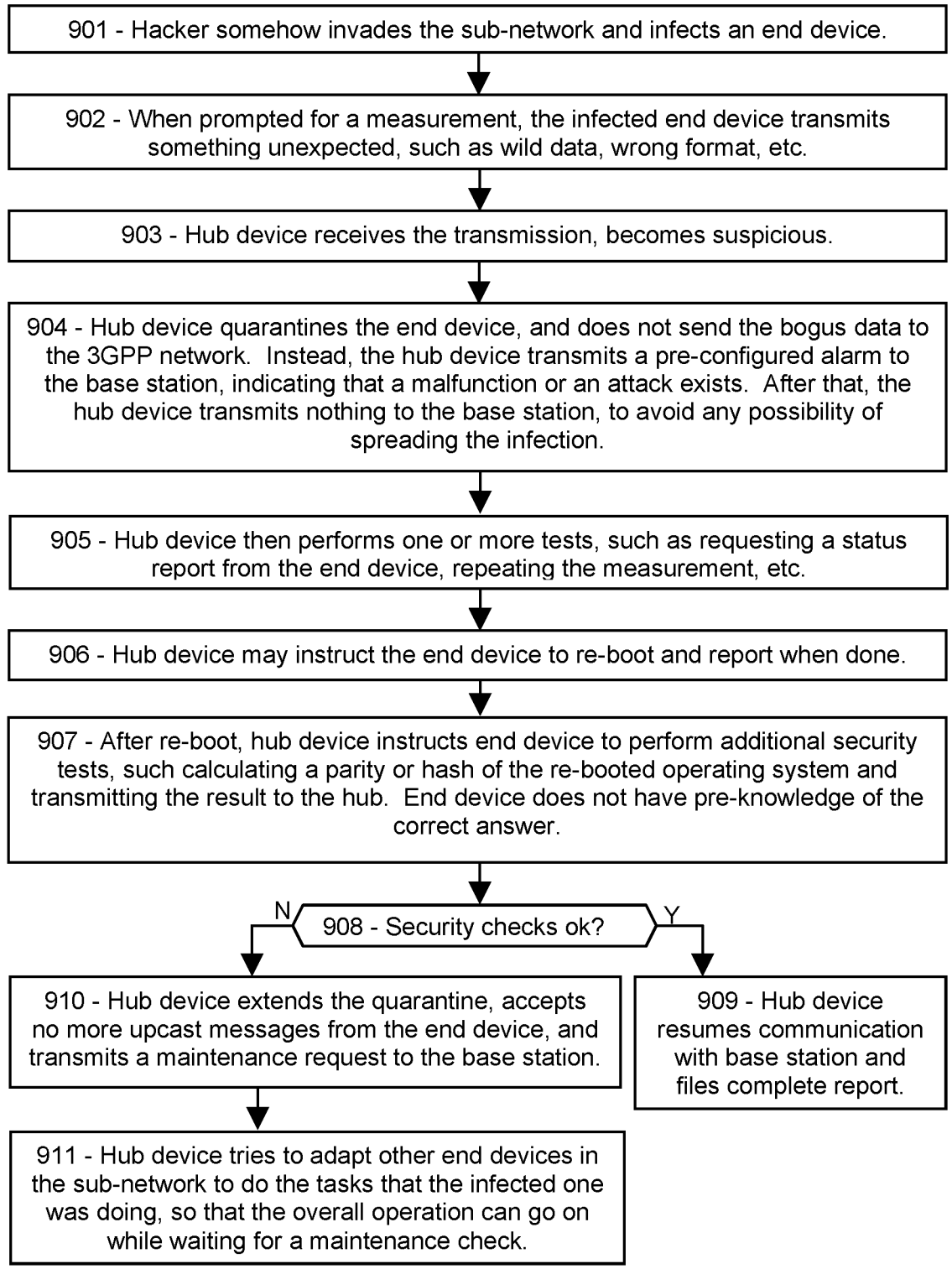
FIG. 9 is a flowchart showing an exemplary embodiment of a procedure for detecting and mitigating a cyber attack on a sub-network, according to some embodiments.

FIG. 9 is a flowchart showing an exemplary embodiment of a procedure for detecting and mitigating a cyber attack on a sub-network, according to some embodiments. The flowchart items may be executed in any order. As depicted in this non-limiting example, the hub device detects the attack based on irregular responses from the infected end device, and takes steps to contain and then eliminate the problem, while protecting the larger network.

At 901, a hacker intrudes into one of the end devices. This is highly improbable since the end devices are configured to re-boot from ROM and execute from ROM, obeying commands only from the hub device, and transmitting only measurement data back to the hub device. There is scarcely room for a hacker to do anything to the end device except interfere with the measurement data, which accomplishes nothing. Nevertheless, in this example, we assume the hacker has somehow gotten into one of the end devices.

At 902, the end device provides incorrect measurement data due to the effects of the hacker, or transmits an upcast message with a format error, or transmits an unrequested result, or other unexpected behavior. At 903, the hub device becomes suspicious due to the erratic results, and at 904 decides to quarantine the end device by suppressing or ignoring communications upcast from the end device. In addition, the hub device may inform the larger network of the suspected problem. To prevent spread of the infection, this message from the hub to the base station may be a pre-determined standard alarm message, as opposed to something that the hacker may have planted, and certainly not the bogus data that the infected sensor provided. After that, the hub device may avoid further uplink messages to prevent the hacker from encroaching on the larger network. If there are no communications, there is no spread.

At 905, the hub device exercises the suspected end device by transmitting instructions and analyzing the resulting data messages. For example, the end device may be capable of doing its own integrity check despite the hacker's interference, and may be able to report its own status as, for example, "likely infected" based on the results of the self-tests. Alternatively, the hub device can order the end device to perform measurements (if a sensor) or to perform actions (if an actuator), and report the results, which may reveal further information about the attack, such as confirming the presence of the hacker, the type and extent of the intrusion, and which capabilities remain within the end device's control. In addition, the hub device may require the end device to calculate a hash or parity of the operating system code of the end device. The hub already knows the correct hash, but the end device does not. The hub device can then compare the reported answer with the correct hash, and thereby determine whether the operating system has been somehow altered.

At 906, the hub device orders the end device to re-boot from ROM. If the boot sequence includes informing the hub device upon completing the restoration, then the end device automatically informs the hub device of the successful completion. If not, the hub can wait until the boot sequence is expected to have completed, and then transmit another downcast message asking for a status report. Re-booting from ROM, including erasing all writable memory and registers, is like a factory-reset since the end device is restored to an initial state. Thus re-booting from ROM is expected to eliminate the hacker and any changes he made.

At 907, the hub device instructs the end device to perform additional checks and report. Preferably, the hub device knows what the correct answer is in each case, whereas the end device does not know the correct answer.

At 908, the end device has performed a clean system-restore from ROM, performed security tests, and has transmitted test results to hub. Hub determines whether the results indicate the infection is gone.

At 909, test results are all ok, so hub device lifts the quarantine, resumes normal operations in the sub-network, and files a report with the base station of the larger network.

At 910, the end device continues to fail one or more integrity tests, even after a clean re-boot from ROM. This may mean that the hacker has somehow survived the re-boot, or that the end device is malfunctioning, or other pathological condition. In each case, the hub device may make the quarantine permanent, sever the restricted link, and warn the larger network of the problem. The hub device can also request maintenance for the end device At 911, the hub device attempts to continue performing the assigned sub-network functions by drawing in other end devices to cover for the quarantined unit, if possible. For example, the hub may request additional temperature measurements from other sensors near the malfunctioning one, and may interpolate to determine the likely temperature at the location of the malfunctioning end device.

In some embodiments, each end device may be programmed to perform its own tasks, and also may be programmed to perform the tasks of other end devices when so commanded. This may enable the hub device to enlist the help of other end devices when one of them is compromised or malfunctioning. In other embodiments, each critical end device may be paired with a second end device, closely proximate, and configured to perform the same function when needed. For example, when one end device is taken off-line due to hacking or failure or whatever reason, the other end device with redundant capabilities can be ordered to perform the missing functions and thereby enable the overall operation to continue until the damaged unit is replaced.

Figure 10:
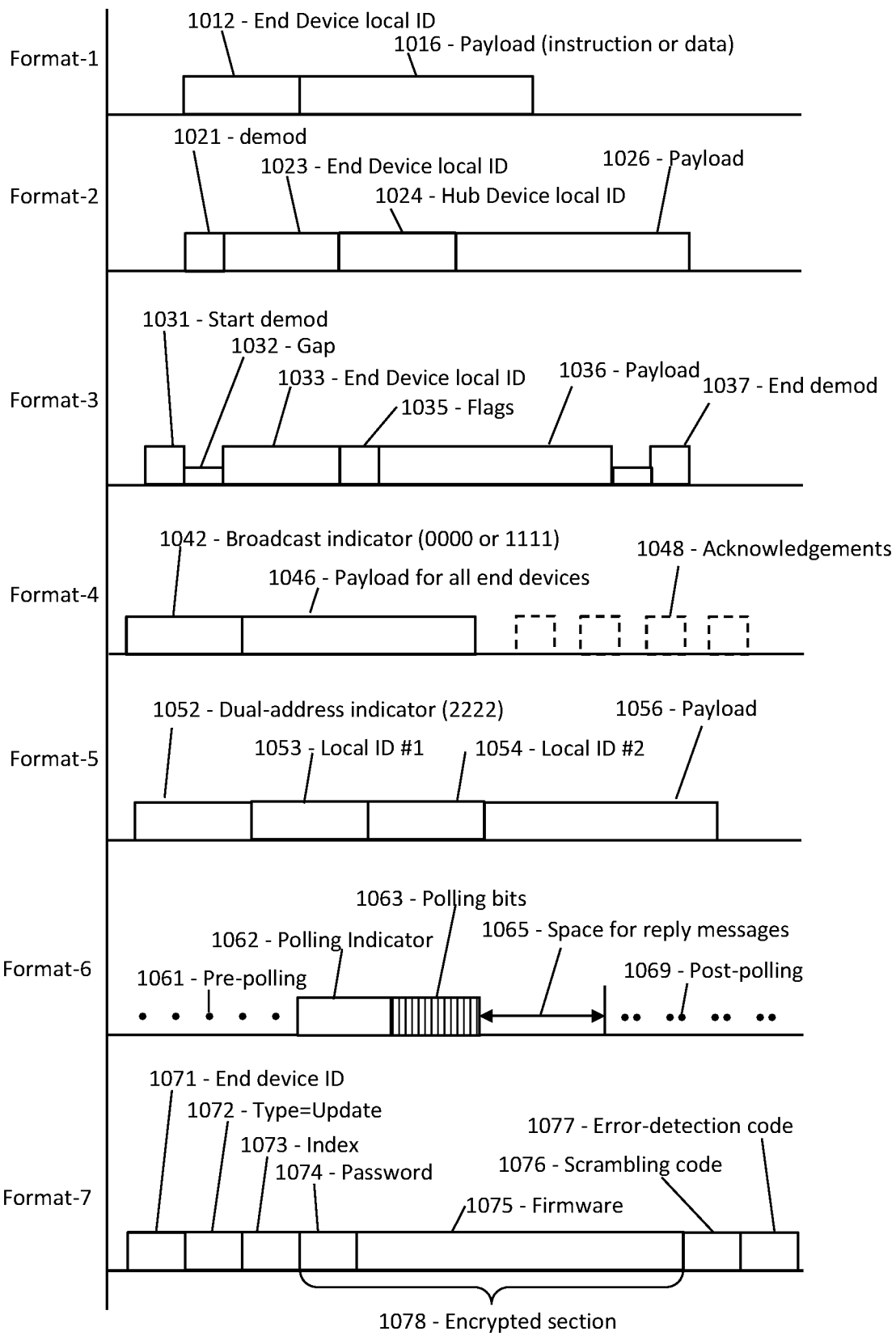
FIG. 10 is a schematic showing an exemplary embodiment of various formats of messages between an end device and a hub device of a sub-network, according to some embodiments.

FIG. 10 is a schematic showing an exemplary embodiment of various formats of messages between an end device and a hub device of a sub-network, according to some embodiments. As depicted in this non-limiting example, an internal sub-network message (either upcast or downcast) according to Format-1 may include the local identification 1012 of an end device, followed by a message payload 1016. For example, in a downcast message from the hub device to the end device, the end device ID 1012 is the local identification code of the end device that the message is intended for, and the payload section 1016 is an instruction such as "take a measurement" or "close the switch".

The same Format-1 may be used in an upcast message from the end device to the hub device. The identification portion 1012 may still be the local ID of the end device, but the payload portion 1016 for an upcast message may be data representing the measurement result. Alternatively, in response to an instruction, the payload portion may be an acknowledgement indicating whether the instruction was carried out, or other pre-configured reply.

Format-1 may be suitable in areas where no other sub-networks are in radio range, hence there may be no need to specify the identification code of the hub device. In a star topology, all messages from the end devices are upcast messages unambiguously intended for the hub device. Therefore, absent conflict with another sub-network, there may be no need to include the hub device identification in the messages.

Format-2 may be used when another sub-network is within radio range. Two sub-networks using the same local identification codes within radio range of each other may mistakenly receive each other's messages, leading to address conflicts. Therefore, in Format-2, the hub device identification code is included in the message, thereby eliminating the conflict since each end and hub device can determine from the hub identification whether the message was intended for it.

In the depicted example, the message starts with a demodulation reference 1021 "demod", for demodulating the rest of the message. The demodulation reference 1021 may be a short-form demodulation reference, of the type that exhibits two modulation phase levels from which any remaining phase levels can be determined by interpolation. In addition, the interface between the two exhibited phase levels of the short-form demodulation reference may serve as a timestamp point. The recipient (or any other member of the sub-network) may adjust its time-base according to the timestamp point, thereby synchronizing with the hub device and, by extension, with the larger network.

Format-2 also includes the local identification code 1023 of the end device involved, for both upcast and downcast messages, as well as the local identification code of the hub device 1024, thereby indicating which sub-network is involved. This mitigates the address conflicts in which neighboring sub-networks have the same end device identifications, because each message now includes the identification of the hub device. The message payload 1026 then follows. Messages intended for one sub-network that are received by the other sub-network may be ignored as soon as the recipient determines, from the hub identification code, that it is listening to the wrong sub-network.

Format-3 begins with a "start demod" 1031 demodulation reference, and ends with an "final demod" 1037 at the end of the message. The start and final demods may differ in, for example, the order of two exhibited phase levels, so that the recipient can readily determine the start and end of the message, calibrate the modulation levels, and adjust its time-base, for best reception of the rest of the message.

After a short gap 1032 of no transmission, indicated here and elsewhere as a short box, the message then includes the local ID of the end device 1033. Then a set of flags 1035, or single-bit indicators, may indicate parameters such as whether the message is upcast or downcast, the presence or absence of the hub identification in that message, the presence or absence of the final demod at the end of the message, and other parameters. The payload 1036 follows, then another gap, then the final demodulation reference 1037. The two demodulation references 1031, 1037 may assist the receiver in demodulating the message, the gaps 1032 may provide time for the recipient to adjust its timing and modulation phase levels before the message begins, and the flags 1035 may assist in recognizing any unexpected behavior, such as noise or interference or a possible hacking attack, for example.

The hub device may transmit or broadcast a message within the sub-network, indicating which format to use. For example, when traffic is light and no address conflicts are detected, the hub device may broadcast a message indicating Format-1, or it may switch to Format-2 to avoid address conflicts when they occur, or switch to Format-3 in a noisy environment.

Format 4 is for broadcast messages from the hub device to all of the end devices. In the depicted case, the broadcast message begins with a broadcast indicator 1042 such as all-zero or all-ones, for example. The all-zero indicator may indicate that the broadcast message does not require an acknowledgement from the end devices, whereas the all-one indicator may indicate that an acknowledgement is required.

The broadcast message 1046 then follows. For example, the hub device may specify transmission parameters to all of the end devices at once, such as a schedule when transmissions are permitted and/or when they are forbidden, format conventions such as whether a demodulation reference is required and whether a gap between the demodulation and the rest of the message is required, among many other possible parameters in the broadcast messages.

If acknowledgements are required, they may be transmitted sequentially after the broadcast message 1046. For example, each end device that receives the broadcast message can transmit a single-bit pulse signal at the end device's pre-assigned time following the broadcast message. The sequence may be according to a predetermined sequence such as the numerical order of the identification code of each end device, or other order specified by the hub. The acknowledgements 1048, in dash, may be a single symbol-time transmission, transmitted at the time allocated for each end device. Any end device that failed to receive the broadcast message would not transmit an acknowledgement pulse, thereby leaving a gap in the reply sequence. The hub device, knowing the sequence, can then determine from the missing acknowledgements, which end devices failed to receive the broadcast message.

Format-5 is for dual-address messages such as those transmitted to two end devices at the same time. For example, a dual-address message may prepare two end device in advance, for a cooperative or simultaneous action, for example. The format begins with a dual-address indicator 1052, which in this case is all-twos, followed by the local identification codes of two end devices 1053, 1054, and then the payload message 1056. The other end devices may note that their identification codes are not listed, and therefore may ignore the rest of the message.

In addition, each end device may be synchronized with the hub device. For example, the hub device can calibrate its time-base according to the 3GPP network, and can then transfer that timing to the sub-network by transmitting timestamp points periodically, such as once per second or ten or 100 seconds. The timestamp point may be a single symbol-time of transmission on a subcarrier of the sub-network. Alternatively, for greater time precision, the timestamp point may be a sudden change of phase in a transmission, which the end devices can detect and calibrate their clocks accordingly. Higher bandwidth may be necessary to sharpen the time resolution, such as briefly switching to 30, 45, 60, or 75 kHz bandwidth, or a higher bandwidth, for the brief timestamp point. If, however, the timestamp point is restricted to the 15 kHz bandwidth, the end devices can still obtain precise timing by correcting the measured timestamp time analytically to account for the distortions due to the bandwidth limitation. By either method, the end devices can thereby calibrate their time-base to the hub device. For example, the hub device can indicate symbol boundary timing in a downcast message such as a demodulation reference or a timestamp point or one of the polling messages. In that case, each modulated message element of an upcast or downcast message in the sub-network may be configured to occupy one of the symbol-times, that is, between the symbol boundaries. In addition, by comparing successive timestamp points, the end devices can also calibrate their frequency to the hub device, and ultimately to the larger 3GPP network. Thus sufficient synchronization may be obtained in the sub-networks without the complex synchronization procedures required for 3GPP communications. (The hub device, on the other hand, would be expected to employ the standard 3GPP protocols in synchronizing with the base station.)

Format 6 is for polling messages, in which the hub device periodically indicates which end devices have a message on hold. The hub device holds messages or task orders for its end devices while they are in DRX sleep mode, and then transmits the messages when the end devices indicate that they are ready to resume operations.

The polling message includes a "type" field containing a polling indicator that indicates that the message is a polling message. For example, the polling indicator 1062 may be all fives, similar to the broadcast message formats. The polling message also includes a sequence of polling bits 1063, each polling bit corresponding to one of the end devices. Each polling bit is set to 1 if the corresponding end device has a message waiting, or 0 otherwise. Following the polling message is a blank space 1065 in which the end devices that have messages on hold can request them. For example, the requests may be just one bit pulse in the blank space 1065, at a position pre-assigned to each end device. The hub device can then determine, from the positions or times of the reply pulses, which end devices request their messages.

As mentioned, the clocks of the sleeping end devices may drift out of alignment with the hub device during long sleep cycles. To help the end devices get back into synchronization, the hub device may transmit pre-polling indicators 1061, which in this case are brief single pulses spaced apart and transmitted by the hub device in the milliseconds preceding the polling message. The polling message is also followed by post-polling indicators 1069 which in this case are double pulses, also spaced apart in time. An end device that wakes up too soon can determine that the polling message is imminent by detecting the pre-polling indicators, and can determine that the polling message has already passed by detecting the post-polling indicators. The end device can then adjust its clock rate and clock setting, so as to wake up at the proper time for receiving the next polling message.

Format-7 is for updating the firmware of an end device. When the boot sequence or operating system of an end device needs to be altered, the hub device may instruct the end device to install new firmware wirelessly using an installation message. Numerous safeguards provide security comparable to that of the larger network.

According to Format-7, an installation message may include the identification code 1071 of the end device to be reprogrammed, a type field 1072 indicating that the message is an installation message, an index 1073 indicating which key, of a set of single-use keys, was used for encryption, a password 1074 that activates the write-enable function of a system PROM in the end device, then the firmware 1075 including the new boot sequence and the new operating system, then a scrambling code 1076, and finally an error-detection code 1077. An encrypted section 1078 includes the password 1074 and the firmware 1075.

In this case, the single-use key indicated by the index 1073 has been scrambled (or encrypted) by the scrambling code 1076, and the password 1074 and firmware 1075 have been encrypted by the single-use key.

Upon receiving the installation message, the end device may turn off its receiver or otherwise ignore incoming signals to prevent interference during the updating process. The end device can then calculate a hash or parity construct of the message (exclusive of the error-detection code 1077 itself), and may compare the calculated value to the provided error-detection code 1077, thereby determining whether there was a reception fault or some kind of cyber attack or other problem with the message. If so, the end device may transmit an alarm to the hub device, and other steps depending on implementation.

If the error-detection code agrees with the calculated hash or parity construct, the end device can retrieve the scrambled single-use key from a hidden key table according to the index 1073, then unscramble the single-use key using the scrambling code 1076. The end device can then decrypt the password 1074 and the firmware 1075 using the unscrambled single-use key. The end device can then activate the PROM write-enable function using the decrypted password, and can copy the decrypted firmware into the write-enabled PROM. The end device can then erase any RAM and registers used, then begin executing at the first location in the boot sequence, which causes the end device to re-boot, and then begin executing the operating system as usual.

Figure 11A:
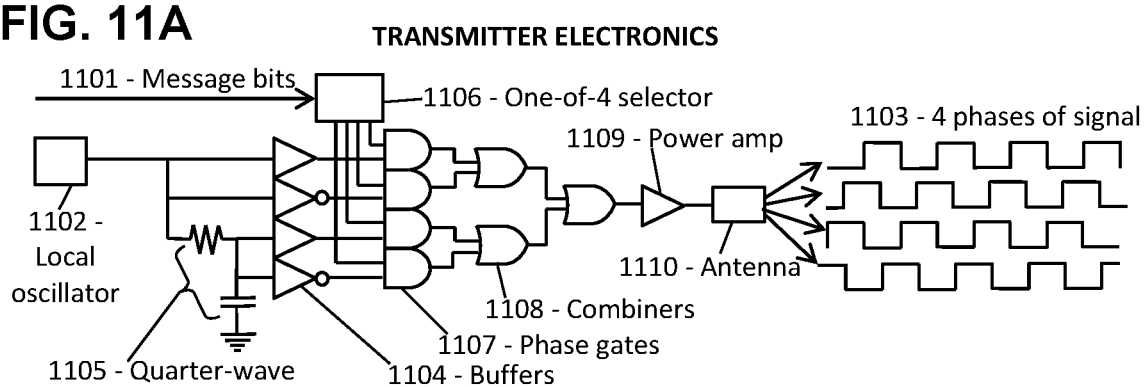
FIG. 11A is a schematic showing an exemplary embodiment of low-complexity transmitter electronics for QPSK messaging, according to some embodiments.

FIG. 11A is a schematic showing an exemplary embodiment of low-complexity transmitter electronics for QPSK messaging, according to some embodiments. As depicted in this non-limiting example, a message between an end device and a hub device in a sub-network may be transmitted without the complex and expensive electronics normally required for transmission in 3GPP networks. The figure depicts a simplified circuit to illustrate the steps of low-complexity transmission assuming QPSK modulation and a time-spanning message on a single subcarrier.

The simplified schematic shows a transmitter for a reduced-capability end device. The inputs are the bits 1101 of a message. The end device includes a local oscillator 1102 tuned to the subcarrier frequency. The output is a transmitted waveform 1103 depicted as four signals differing by 90 degrees of phase. Each waveform 1103 corresponds to one of the bit combinations of 00, 01, 10, and 11 in binary.

To construct the four phases, the local oscillator 1102 signal is provided as input to four buffers 1104, some of which are inverting buffers. In addition, an analog quarter-wave delay 1105 is provided for two of the buffers 1104. The buffers 1104 thereby generate the four phases corresponding to QPSK.

The message bits 1101 are provided to a one-of-4 selector 1106, a circuit that provides a positive voltage to exactly one of its four output lines, depending on the two input bits. The four selector outputs 1106 and the four phased signals from the buffers 1104 are then provided to four phase gates depicted as AND gates 1107. According to the selector 1106, exactly one of the AND gates 1107 will pass the phased oscillator signal forward, thereby providing a signal modulated according to the message bits.

The outputs of the AND gates 1107 are then accumulated by combiners 1108, depicted here as OR gates. The combined signal is amplified by a power amplifier 1109 and transmitted by an antenna 1110. The transmitted waveform 1103 is a copy of the bit-selected phase signal, thereby carrying the bit-level message content according to the phase of the transmitted waveform 1103.

Not shown are various filters and level restorers and the like, which may be added if needed. A purpose of the figure is to show that the message data can be encoded and transmitted using low-cost low-complexity electronics. It is immaterial how the transmitter circuit of the end device is configured, so long as it provides the transmission waveform modulated according to the message bits, is sufficiently low in cost to not inhibit the intended use case, and is sufficiently low in complexity to be operated by a reduced-capability processor such as a basic microcontroller. Artisans may devise other circuits to accomplish the same task without departing from the principles disclosed herein.

Figure 11B:
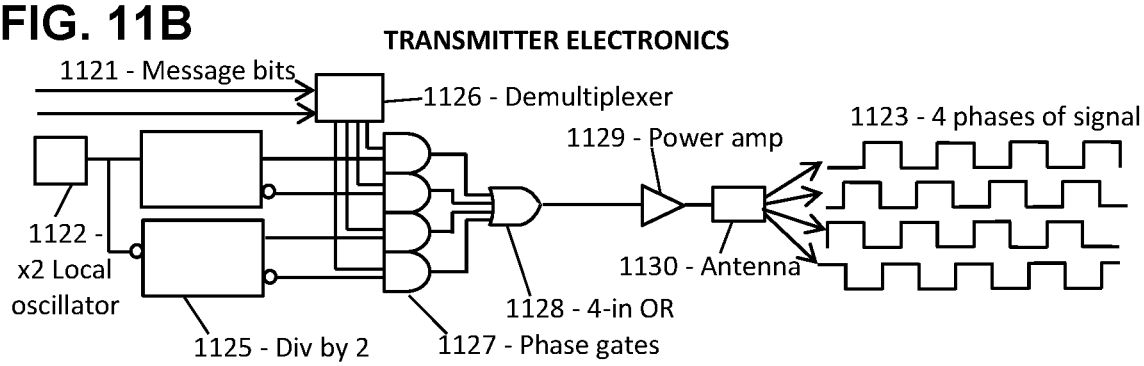
FIG. 11B is a schematic showing another exemplary embodiment of low-complexity transmitter electronics for QPSK messaging, according to some embodiments.

FIG. 11B is a schematic showing another exemplary embodiment of low-complexity transmitter electronics for QPSK messaging, according to some embodiments. As depicted in this non-limiting example, pairs of message bits 1121 are input to a two-to-four demultiplexer 1126, which drives four phase gates 1127 as AND gates. The analog quarter-wave delay circuit 1105 has been eliminated by operating the local oscillator 1122 at twice the subcarrier frequency, then dividing the frequency by 2, synchronous 1125 with either the rising or falling oscillator signal, thereby generating four signals with a 90 degree phase separation digitally (assuming a 50% duty factor, which is common). This avoids the analog portion 1105, which may be cumbersome. In addition, the three combiners 1108 have been replaced by a single 4-input OR gate 1128. As before, a power amp 1129 drives an antenna 1130 with the selected phase, resulting in four output signals 1123 with appropriate phases.

Figure 12A:
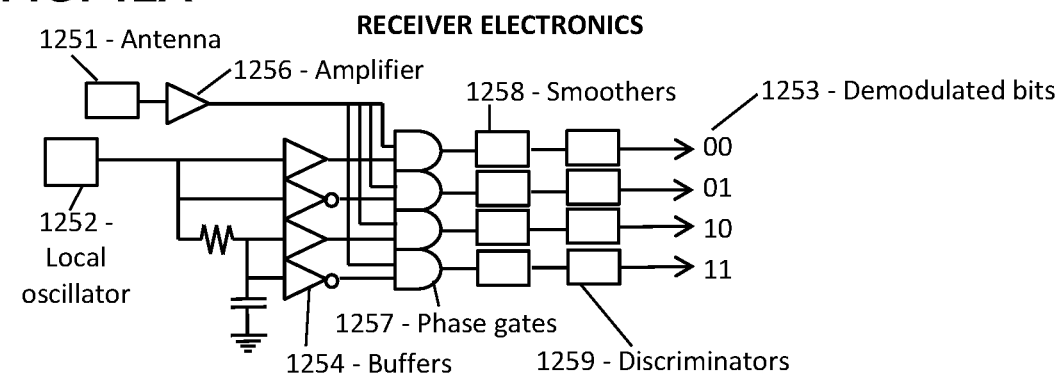
FIG. 12A is a schematic showing an exemplary embodiment of low-complexity receiver electronics for QPSK messaging, according to some embodiments.

FIG. 12A is a schematic showing an exemplary embodiment of low-complexity receiver electronics for QPSK messaging, according to some embodiments. As depicted in this non-limiting example, a low-cost, reduced-capability end device may employ a receiver circuit that takes a signal from an antenna 1251 and a local oscillator 1252 as input, and provides the demodulated bits 1253 of the message as output.

In the simplified circuit depicted, the oscillator signal is used to generate four phases using inverting buffers 1254 as in the previous figure. The antenna output 1251 is amplified 1256 (and filtered or positive-discriminated, not shown) before driving the four phase gates 1257 depicted as AND gates. The gated outputs are low-pass filtered by smoothers 1258 and the highest average voltage is selected by four discriminators 1259, thereby indicating the demodulated bits 1253 as shown.

Figure 12B:
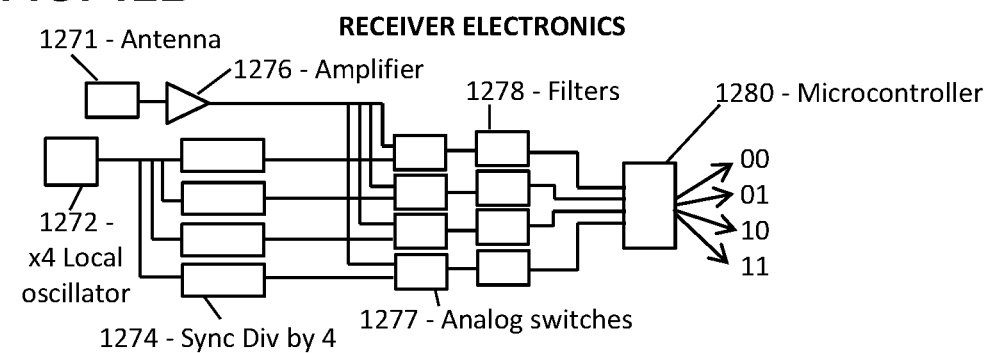
FIG. 12B is a schematic showing another exemplary embodiment of low-complexity receiver electronics for QPSK messaging, according to some embodiments.

FIG. 12B is a schematic showing another exemplary embodiment of low-complexity receiver electronics for QPSK messaging, according to some embodiments. As depicted in this non-limiting example, an antenna 1271 again drives an amplifier 1276 with the received waveform. The local oscillator 1272 is now operated at four times the subcarrier frequency, and is divided by 4, synchronously, by four logic dividers 1274, generating four phase signals that are fed to four analog switches 1277 of the type that either block or pass the phase signals depending on the input from the amplified wave signal. Thus the outputs of the analog switches 1277 indicate which local phase matches that of the received signal. The four outputs are then filtered 1278 and fed to a 4-input microcontroller 1280, which determines which of the filtered signal has a largest amplitude. Alternatively, the microcontroller fits the four amplitudes to a phase model. By either method, the microcontroller then determines the message bits as shown. By demodulating with this method, an amplitude calibration may not be necessary because the four phase states are being compared to each other, not to an absolute level, and the correct phase is then determined according to the amplitude ratios. Therefore, the demodulation method may be resistant to signal fading or SNR degradation or other effects that may lead to reception faults.

Parts for transmitters and receivers as depicted are readily available at very modest cost. Using these circuits or others derived from them, the message bits may be readily modulated and demodulated using basic low-cost low-complexity electronics, without the complex signal processing and software required for 3GPP receivers.

Figure 13:
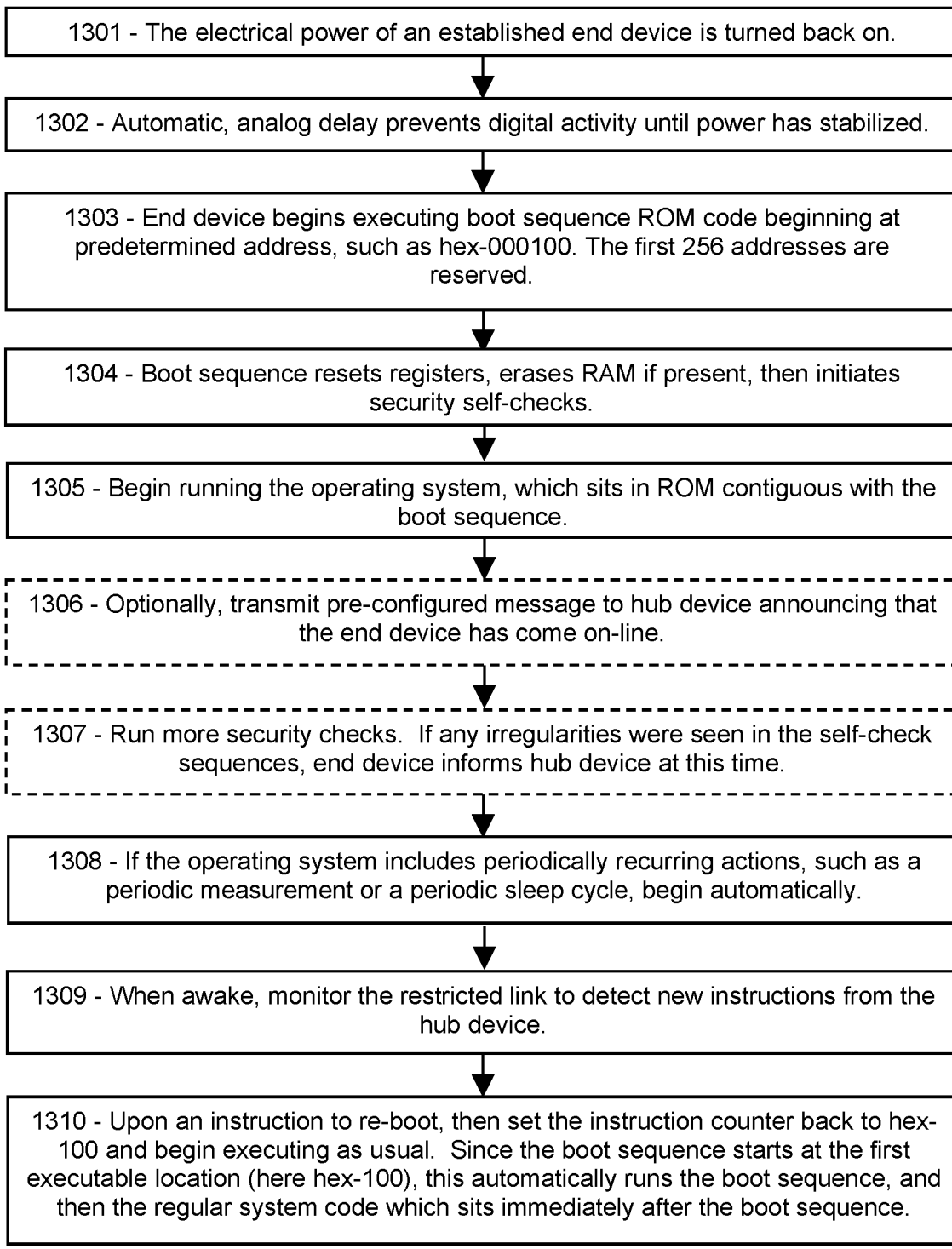
FIG. 13 is a flowchart showing an exemplary embodiment of a procedure for a sub-network to autonomously re-boot, according to some embodiments.

FIG. 13 is a flowchart showing an exemplary embodiment of a procedure for a sub-network to autonomously re-boot, according to some embodiments. The flowchart items may be executed in any order. As depicted in this non-limiting example, after a power failure or other shutdown, the end devices may be configured to automatically start their ROM-based boot sequence, then enter their ROM-based operating system, and await instructions from the hub device.

At 1301, a particular end device, which has previously been a member of a sub-network or has otherwise obtained a local identification code, is powered up. Then at 1302, a built-in delay, such as an analog resistor-capacitor delay, inhibits the processor from executing any instructions until the power has had a chance to stabilize.

At 1303, the power-up delay has expired, and the end device processor automatically begins executing instructions in ROM, starting at a predetermined location, such as the lowest executable location in the ROM, such as hex-000 or hex-100 or other location, depending on implementation. the processor then continues executing ROM instructions to boot up. After the boot sequence, the operating system may begin in the location immediately above the boot sequence, or there may be a series of blank values or NOPs between the boot sequence and the operating system. In either case, the processor automatically begins executing the regular operating system after the boot sequence. ("NOP" causes the processor to skip over that address.)

Certain locations in the ROM may be reserved. For example, the first hex-100 locations or the last hex-100 locations in ROM may be reserved and not executable. The reserved locations may contain special data such as the single-use key table or other security values. The reserved locations may contain executable code such as detailed instructions for updating the firmware in the ROM. The reserved locations may contain pre-configured replies such as acknowledgement sequences.

For example, the end device may include a processor that reads instructions according to an instruction address register that is automatically incremented upon each instruction cycle. The processor may include internal electronics that automatically indicate when the instruction address register is within the reserved address region, in which case the retrieved instruction would read NOP or zero, instead of the actual contents, whenever the processor attempted to execute it. With such protection, the instruction address counter may safely start at address zero when re-booting, since the first hex-100 addresses will appear as NOP and will be skipped over automatically. In a similar way, if the reserved addresses are at the top of the ROM, they will be passed over by the execution engine for the same reason. An advantage of configuring the reserved addresses to read NOP when executed may be greater security, since the operating system does not need to carefully avoid that region. In fact, the processor does not need to know which addresses are reserved. For example, each reserved address may be protected by a wired-in resistance to execution. In that case, the operating system does not know where the key table is hidden, until the single-use key address is revealed by the installation message.

At 1304, as part of the boot sequence, the end device erases all of its built-in registers and RAM, if present. This ensures that unwanted residue is erased, including any malware or attack functions.

At 1305, after finishing the boot sequence, the processor continues incrementing the next execution address, which is the operating system.

At 1306, optionally, upon entering the operating system, the end device may transmit an upcast message to the hub device announcing that the end device has re-booted and is now ready for service. In some embodiments, the ready-for-service message may be a pre-configured sequence. In other embodiments, the operating system may cause the end device to perform security checks, such as calculating a hash of PROM, and may include transmitting the results of those security checks to the hub device in the ready-for-service message.

At 1307, the end device runs a series of self-checks for code integrity, cybersecurity, and its ability to perform its functions such as reading a temperature sensor or turning a switch on and off. For example, the end device may calculate a hash or parity of the firmware, or other security check on the current operating system code, or other security check, thereby revealing faults if present. The end device may transmit a ready-for-service message to the hub device indicating the results of those tests. If the hub device detects a problem with the results, it may quarantine the suspicious end device or take other defensive action.

At 1308, the end device may automatically begin performing its programmed task, such as periodically making a measurement and transmitting the results to the hub device. For example, the operating system or boot sequence may specify that the end device is to automatically start performing measurements, without waiting for a command from the hub device. However, the hub device can interrupt such an automatic cycle with an abort command, then re-start the cycle at a later time. In other embodiments, the end device may wait for the hub device to tell it to begin repetitive operations.

In some embodiments, if the end device includes a sleep-cycle capability, it may begin discontinuous reception (DRX) automatically upon finishing its first programmed measurement. In other embodiments, the end device may wait until commanded by the hub, and then start the DRX cycle, thereby maintaining synchrony with the hub device. This also enables the hub device to know when the end device is awake or asleep.

At 1309, during the awake intervals, the end device may monitor the downcast link for instructions from the hub device, such as instructions to acquire data or to activate an actuator. Alternatively, at 1310, the hub device may instruct the end device to perform a self-reboot. For example, the end device may cause a re-boot by clearing the instruction address counter, which causes the processor to start over at address zero or whatever the first executable address is in PROM. Alternatively, the re-boot command may include setting the instruction address to hex-100 or other predetermined re-boot location, at which the processor resumes execution, thereby causing the end device to erase everything erasable and to restart at the bottom of the operating system, before resuming normal operations.

Figure 14:
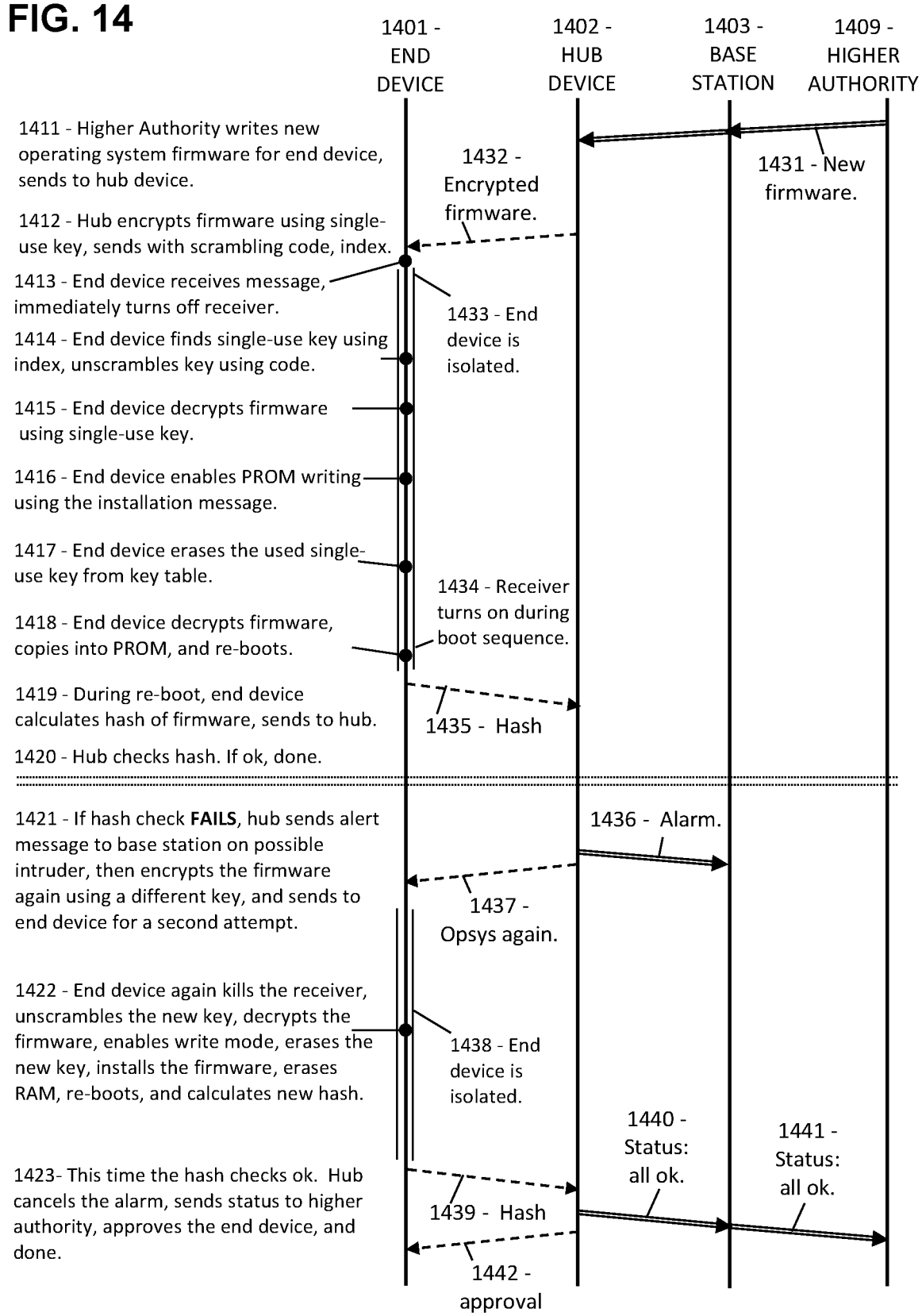
FIG. 14 is a schematic showing an exemplary embodiment of a procedure for updating the firmware operating system of an end device wirelessly, according to some embodiments.

FIG. 14 is a schematic showing an exemplary embodiment of a procedure for updating the firmware operating system of an end device wirelessly, according to some embodiments. As depicted in this non-limiting example, a hub device can provide the new system code in an encrypted form, which can only be decrypted using a single-use key sequestered in the end device's ROM and is scrambled by a scrambling code, which the hub provides in the installation message. The installation message also provides an index pointing to the single-use key, hidden in a ROM memory of the end device. The procedure thereby provides a very high level of security. In addition, for even greater security, the end device is configured to turn off (or disregard) its receiver immediately after receiving the update order, thereby preventing interference from a potential hacker.

The end device 1401, hub device 1402, base station 1403, and higher authority 1409 are shown across the top. Time proceeds downward on the page. 5G/6G communications of the 3GPP network are shown as doublewide arrows, and restricted link sub-network communications are shown as dashed arrows.

At 1411, the higher authority 1409 provides a new firmware (boot sequence and operating system) for the end device 1401. In some embodiments, the higher authority 1409 may choose to physically demount the end device 1401, install the new firmware manually, on a bench for example, and then reinstall the end device 1401. In that case there is no risk of a cyber attack during the upgrading process because the end device is off-line. But it's a lot of work. Therefore, in this example, the higher authority 1409 decides to perform the firmware upgrade wirelessly. The higher authority 1409 transmits a message containing the new firmware 1431 to the hub device 1402 via the base station 1403, along with instructions such as which end device to update, and what the changes entail, and how the changes may affect the sub-network operations.

At 1412, the hub device receives the new firmware 1431. In this example, the hub device 1402 holds the unscrambled single-use key table in its memory, along with the scrambling codes and other security information, for each of its end devices.

The hub device then encrypts the firmware using the single-use key, and then scrambles the single-use key with the scrambling code for that key. The hub device 1402 then transmits an installation message to the end device 1401, containing a type section indicating that this is an update command, the full globally-unique identification code of the intended end device 1401, the encrypted firmware 1432, the scrambling code for descrambling the single-use key, the index of the scrambled single-use key, and optionally an encrypted write-enable password. Thus the firmware and the password are encrypted by the single-use key, while the type section, the identification code, the scrambling code, and the index are not encrypted. The installation message does NOT include the single-use key itself, either plain or scrambled.

At 1413, the end device 1401 receives the message 1432, determines that it is an installation command, and that it is intended for the end device. Upon finishing receiving the message, the end device 1401 immediately turns off or inhibits its receiver to prevent interference during the updating process. The isolation of the end device is indicated by lines 1433.

At 1414, the end device 1401 retrieves a particular single-use key from tis key table (hidden in non-executable ROM), according to the index in the update command message 1432. As a security feature, the end device also checks the scrambled single-use key to make sure it is not all zeros, since that would indicate that the key associated with the index has been employed previously, a violation. If the end device also has a used-key table containing either the indexes of previously used keys, or the previously used keys themselves (whether scrambled or not), then it checks whether the indicated key has been used before, also a violation. If the end device finds that the indicated key was in fact used before, then the end device would abort the update process and inform the hub device of the violation. Such a violation may indicate a cyber attack, a message reception error, a mistake by the hub device, some kind of system glitch, or other unknown problem. In every case, the end device rejects the installation message and sends an alarm to the hub device.

At 1415, no error has been detected, so the end device 1401 then proceeds to unscramble the single-use key using the scrambling code which is also provided in the installation message 1432. The end device then uses the unscrambled single-use key to decrypt the firmware (and the password, if provided). Importantly, a hacker may listen to the installation message, but would be unable to tamper with the new firmware without knowing the scrambled single-use key which is hidden in the key table, nor to decrypt the new code without the correct single-use key, nor to descramble the single-use key without the scrambling code. In addition, there is simply no time for a hacker to intervene before the end device turns off its receiver at the end of the installation message 1432. Hence, the firmware is protected and secure, up to the point of installation.

At 1416, the end device 1401 uses the installation message to unlock the PROM write-enable feature, and at 1417 deletes (or over-writes with zeros) the used key from the the single-use key table, so that it can never be used again.

At 1418, the end device uses the unscrambled single-use key to decrypt the firmware, copies it into PROM, and re-boots.

The end device may be configured to avoid over-writing the section of PROM that it is executing, while copying the system code. In one embodiment, the end device may copy the decrypted code into the PROM by calling a simple copy loop that copies the new firmware into sequential addresses of the PROM. Over-writing the copy loop is to be avoided since that would stop the copying. To avoid over-writing the copy loop, the processor may include a copy function in hardware, and may invoke that built-in copy loop to copy the new firmware into the PROM. Alternatively, the copy loop may be provided in a small UROM, separate from the PROM, and is executed by the processor after the decryption is finished. As a third option, the copy loop may be positioned at the top of the PROM address space, so that it is over-written only after all the addresses in the PROM have been written to.

In each of these cases, or other means for performing the firmware installation, the processor then returns to the boot sequence. For example, an address counter of the copy loop may "roll over", or generate a carry bit, after reaching the highest PROM address, and the carry bit may cause the instruction address counter to be cleared or set to zero or set to the lowest executable address, for example. The processor then begins executing at that point, and thereby executes the new boot sequence and then enters the new operating system, as desired.

The installation procedure may include turning off the write-enable feature of the PROM after completing the installation, erasing all RAM and registers, and then re-enabling the receiver. The boot sequence may include those same instructions, for extra security. Alternatively, the end device may continue to hold the receiver off until after contacting the hub device in the next step.

At 1419, as part of the boot sequence, the end device calculates a hash 1435 of the new firmware and transmits it to the hub device 1402. In some embodiments, the end device then turns on the receiver just before transmitting the hash to the hub device, sufficiently to perform the LBT collision avoidance, and not before. The end device then does nothing while waiting for the hub device to approve the update. The hub device 1402 knows the correct hash value because the hub device has the unencrypted firmware. If the hash is correct, then at 1420, the hub device transmits a message to the end device instructing it to resume normal operations (not shown, because this time there was a problem with the installation).

At 1421, below the double dotted line, the hub device finds that the hash is incorrect. This indicates either that something went wrong or a hacker somehow interfered. Therefore, the hub device transmits an alarm message 1436 to the base station 1403 and then tries again. the hub device encrypts the new firmware a second time, using a different single-use key. The hub device then transmits another installation message, with the newly encrypted firmware, the associated index, and the new scrambling code to the end device.

At 1422, the end device 1401 again receives the installation message 1437, disables its receiver 1438, unscrambles the new single-use key, decrypts and copies the firmware, calculates the hash again, then automatically re-boots, calculates the hash 1439, and transmits it to the hub device 1402, and again waits for approval.

At 1423, the hub determines that the second attempt was successful. Therefore the hub device cancels the alarm 1440, transmits a status message to the higher authority 1441, and finally sends an approval message 1442 to the end device, enabling it to begin normal operations.

The example includes the end device activating the write-enable feature of the PROM, based on the installation message. In some embodiments, for greater security, the routine that activates the write-enable feature may be protected by a password. In a first version, the password may be provided by the hub device, but encrypted, such as encrypted along with the firmware by the single-use key. The end device can decrypt the password at the same time as the rest of the firmware. For even greater security, the password may be split into two halves, in which one half is provided in the update instruction message and encrypted along with the firmware, while the other half is stored in a hidden location of the currently-installed version of the firmware. The hub device would be responsible for remembering the location and value of the hidden password portion. A hacker could not change the PROM without receiving and decrypting the password portion in the update instruction message, and also discovering the location of the other half of the password in the old firmware. In that case, the updating process is protected by the scrambled and inaccessible single-use keys in the key table, and also by the password which is split between the encrypted message and the hidden code portion, as well as by the deactivation of the receiver as soon as the installation message has been received. Each of these security features is readily decoded by the end device using basic procedures such as XOR decoding. From a security perspective, however, reconstructing all those keys and codes from transient wireless signals would take a determined hacker indeed.

Figure 15:
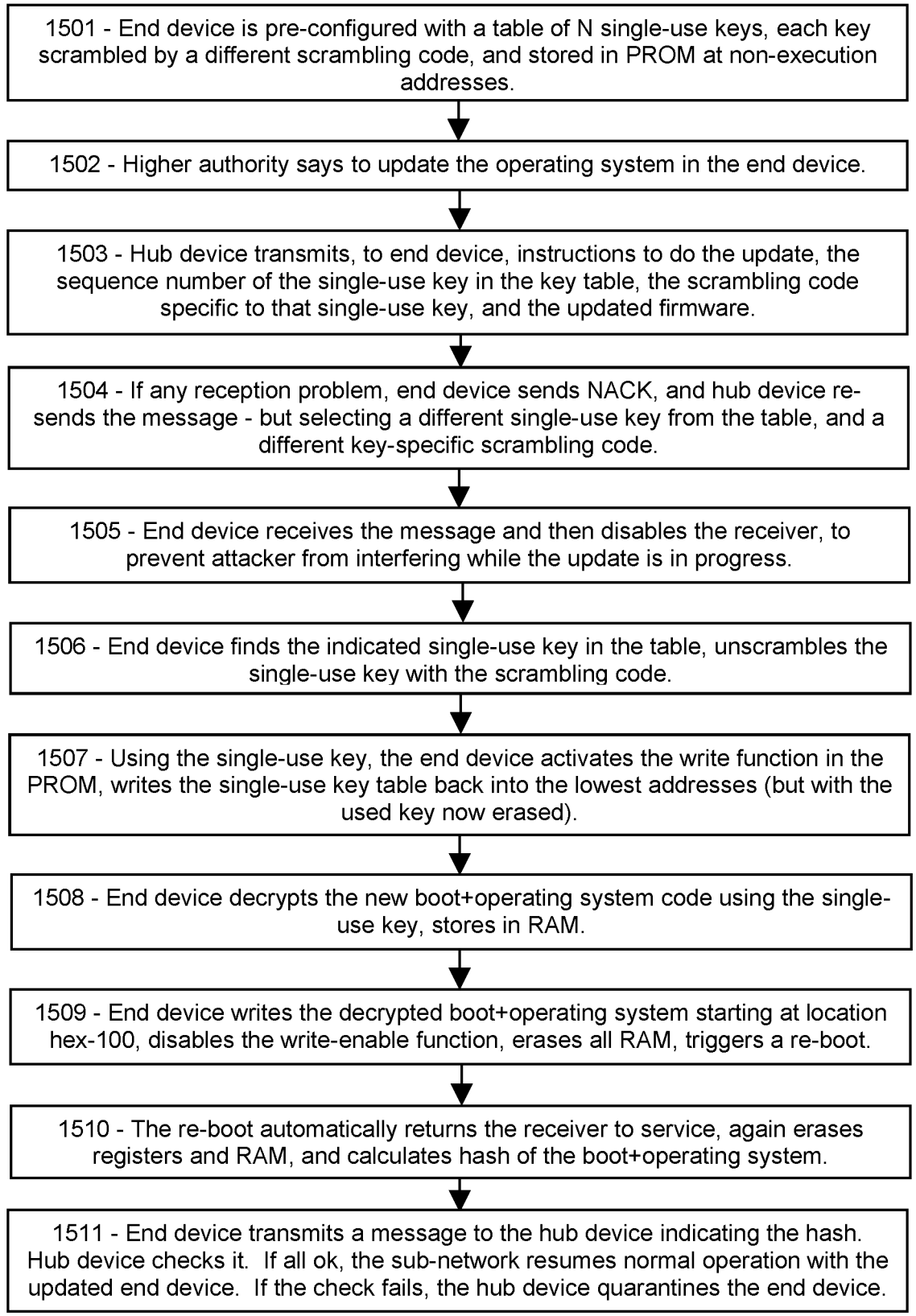
FIG. 15 is a flowchart showing an exemplary embodiment of a procedure for securely updating firmware in an end device, according to some embodiments.

FIG. 15 is a flowchart showing an exemplary embodiment of a procedure for securely updating firmware in an end device, according to some embodiments. The flowchart items may be executed in any order. As depicted in this non-limiting example, the system wirelessly updates the boot sequence and operating system of an end device, while maintaining the same high level of security as the 3GPP network.

At 1501, the end device has been pre-configured with a table of single-use keys, each one scrambled by a different scrambling code which the end device does not know. The single-use key table is stored in non-executable addresses of the system PROM, such as the first or last addresses of the PROM, or in a separate UROM, or permanently encoded in the processor chip itself, among other possibilities. For example, the single-use key table may be installed, along with the boot sequence and operating system, during manufacture of the end device. Alternatively, the single-use key table may be inserted during an assembly process using a physical enablement, or other secure manner. In this example, the end device processor does not have access to the single-use key table except when instructed by the hub device, and even then is able to retrieve only the key corresponding to the index provided in the installation message.

At 1502, the higher authority has determined that the end device needs to update its operating system, perhaps to handle a different task or to correct a defect. Higher authority sends a message to the hub device specifying the updated firmware for the end device.

At 1503, the hub device encrypts the new firmware using one of the single-use keys, then scrambles the key using a scrambling code. The hub device then transmits an installation message to the end device containing: a special instruction to install the new operating system, the identification code of the intended end device, the encrypted operating system, an encrypted password for unlocking the write-enable function of the PROM, an index number or address of the single-use key in the key table, the scrambling code by which that single-use key was scrambled, and an error-detection code. The installation message does not include the single-use key in any form. All of this is contained in a single unbroken downcast transmission in a predetermined format.

After receiving the installation message, the end device turns its receiver off and calculates the hash or parity of the as-received message. If the hash disagrees with the error-detection code, the end device determines that there are reception problems, rejects the installation message, turns its receiver back on, and transmits a NACK to the hub device.

Upon receiving the NACK, the hub device encrypts the system code again using a different single-use key, with a different index and a different scrambling code, and transmits the entire message again at 1504. (Alternatively, the hub device may instruct the end device to re-boot first, and then run security tests, and only then may attempt the update if the end device passes all the security tests, and quarantines the end device otherwise.)

At 1505, the end device again checks the received message according to the error-detection code. This time, the hash is correct and the message was successfully received. The end device then (if not sooner) disables the receiver to prevent an attacker from interfering while the installation is in progress. Optionally, the end device can transmit an ACK to the hub after verifying the hash. During the update process, the end device is to be isolated until the new operating system is installed and tested.

At 1506, the end device retrieves the single-use key from the table using the index provided, then unscrambles it with the scrambling code provided.

At 1507, the end device prepares to install the new firmware in the PROM memory. Generally a PROM requires a write-enable function to be activated before the PROM can be altered. For extra security, the write-enable function may be protected by a password. In a first embodiment, the password may be provided in the update installation message, encrypted along with the operating system. The end device can decrypt the password and then use it to update the PROM. In a second embodiment, the password may be hidden somewhere in the old operating system. The hidden location may be unknown to the end device and may be revealed by the hub device in the installation message, encrypted along with the firmware. In a third embodiment, the password may be divided into two portions, one of which is provided in the installation message and the other half is hidden in the old operating system. The end device knows which method, or other method, is used to provide the password, but does not know the hidden parameters. After decrypting the installation message, the end device retrieves the password from its hiding place, decrypts it using the unscrambled key, and then uses the password to activate the write-enable function of the PROM. The end device then erases the single-use key in the key table at the specified address, thereby preventing its re-use.

At 1508, the end device decrypts the new firmware, using the descrambled single-use key, and copies it into the PROM at 1509.

In one embodiment, the end device may store the encrypted firmware as-received in RAM, then decrypts it into more RAM, then copies it from the RAM into the PROM starting at the first executable address.

In another embodiment, the end device may demodulate each message element of the installation message as it is being received, determines the single-use key and the password while still receiving the message, decrypts the new firmware while it is being received, and stores each line of the decrypted firmware in RAM. The end device may then calculate a hash or parity construct from the decrypted firmware and compare to a provided value, such as a value included in the installation message. If the decrypted firmware fails this test, the end device may abort the installation by erasing the RAM copies of the firmware, turning the receiver back on, and sending a NACK or other warning to the hub device. But if the decrypted firmware appears correct, then the end device may copy the firmware from the RAM into the PROM and proceed to run the new boot sequence.

In another embodiment, the end device may demodulate each message element of the installation message as it is being received, thereby determining the single-use key and the scrambling code and the password while still receiving the message, and then decrypts the new firmware while it is being received. The end device can then write each line of the decrypted firmware directly into its PROM address without storing anything in RAM.

In some embodiments, the PROM is of the type that can be written one address at a time while other addresses are being executed. In that case, there are several ways the installation instructions may be arranged, to enable PROM updating. The following are some examples.

In a first embodiment, the end device may initially move a "copy loop" of processor instructions into highest memory addresses of the PROM. The new firmware may also include the same copy loop in the highest addresses of the new firmware. (The copy loop copies the new operating system from RAM into the PROM, starting at the bottom of the PROM and proceeding upward.) When the copy loop finally reaches its own address, the copy loop will over-write the copy loop instructions with the same instructions, thereby completing the firmware installation. Then, having reached the top of memory, the instruction address counter will then roll over to zero while generating a carry bit, which causes the processor to proceed to the first address or the first executable address in the PROM, which now holds the new boot sequence, thereby completing the installation.

In a second embodiment, the end device may include a second PROM or UROM containing the installation instructions. Alternatively, the installation instructions may be hard-wired in the processor or other protected location other than the main PROM. These cases may be applicable when the PROM is of the type that cannot support execution at the same time as being written. For example, the installation message causes the processor to execute the installation instructions from the second PROM or UROM or protected location, so that the new firmware can be copied into the main PROM. When the copying is completed, the instruction address counter may be cleared, causing the execution of the new boot sequence, for example.

At 1510, the end device automatically resumes execution of the new operating system after the re-boot. The boot sequence or the operating system may again erase the RAM and all traces of the secret keys and codes. In some embodiments, the last task of the boot sequence may be to calculate a hash of the new operating system and transmit that hash to the hub device as a security check at 1511. The end device does not know the correct answer, but the hub device knows it because the hub calculated the hash before encrypting the new operating system. If the hash is correct, the end device is free to begin normal operations (in some embodiments, the hub may demand further testing). If the hash is wrong, then the hub device may attempt yet another system update, using a different single-use key. After multiple updating failures, the hub may determine that the end device is somehow damaged, in which case the hub device may again quarantine the end device and request maintenance.

The procedures of this example may provide enhanced security during wireless system updates, by tightly controlling information and timing. The single-use keys are stored in hidden and normally inaccessible memory of the end device, and are all scrambled with a scrambling code (different for each single-use key) which the end device does not know. In addition, the end device cannot read the single-use key table at all until instructed by the hub device, and even then can only extract the one entry corresponding to the index transmitted by the hub device. In addition, the single-use keys are useless to a hacker without the associated scrambling code. In addition, the end device turns off its receiver immediately after receiving the installation message, thereby denying a hacker any opportunity to affect the updating. Anything that the hacker transmits to the end device after the installation message will be rejected, because the end device has turned off (or ignores) its receiver until the entire updating process is finished and the new firmware has been verified by the hub device. In addition, the password-protected write-enable function of the PROM would require the hacker to determine either an encrypted portion in the message or a hidden portion in the previously installed firmware, or both. In short, using the disclosed procedure, the hub device can achieve the system update wirelessly, while preventing any outsider from influencing the installation.

The example assumes that the encryption and scrambling are done by the hub device, and the other security parameters are stored in the hub device. In another embodiment, for even tighter security, the higher authority can store the key table, scrambling codes, passwords, and so forth. The higher authority can encrypt the new operating system and transmit only the encrypted version, and the index, and the scrambling code to the hub device. The higher authority then keeps the decrypted and unscrambled versions secure, while the hub device passes the encrypted version down to the end device in the installation message. In addition, the hub device may not know the correct value of the hash of the encrypted or decrypted operating system, and the correct answers to other security tests that the end device may perform when ordered. Instead, the hub device may pass the results of those tests up to the higher authority for checking. In that case, all security values are maintained by the higher authority, and thus would not be exposed even if the hub device is compromised.

FIG. 16A-16G are charts showing various exemplary embodiments of a memory configuration in an end device, according to some embodiments. As depicted in these non-limiting examples, the secure memory of an end device can include space for a single-use key table, a boot sequence, and an operating system.

Figure 16A:
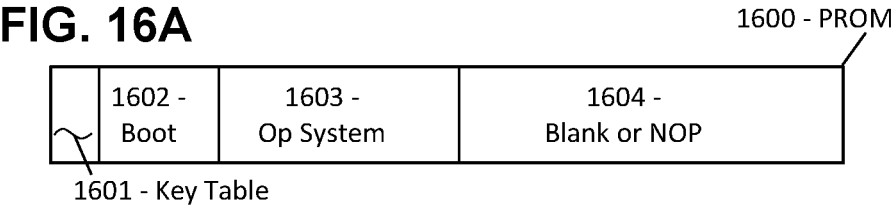
FIG. 16A-16G are charts showing various exemplary embodiments of a memory configuration in an end device, according to some embodiments.

FIG. 16A depicts a secure memory of an end device as a PROM 1600, subdivided into a region for the single-use key table 1601 at the bottom of memory at address zero, followed by a boot sequence 1602, followed by the operating system 1603. The rest of memory 1604 is blank or zero or a NOP (no-operation) instruction, any of which causes the processor to advance to the next location until rolling over the top of memory and continuing at the first executable address, which is the boot sequence. The key table 1601 is in non-executable memory.

Processors generally include an instruction address counter that indicates the address of the next instruction to be executed. The instruction address counter is automatically incremented upon each instruction execution, and after reaching the top of memory, reverts to zero address. In normal operation, the processor should never attempt to execute a memory location outside of the operating system, and if it does, this indicates a malfunction or a cyber attack. Therefore, an advantage of filling the unused memory with NOPs may be that if the processor ever arrives there, the instruction address counter would automatically cycle around to the first executable address, thereby re-booting and erasing the attack.

In addition, the processor should never attempt to execute an address in the key table 1601, since those addresses contain data, not instructions. To avoid treating the single-use keys 1601 as instructions, the processor may be configured to recognize that addresses in the key table space are non-executable, and to skip over them until reaching an executable location, which in this case is the first instruction of the boot sequence 1602. Alternatively, the processor may be configured to read the key table contents as NOPs, which would also cause it to skip ahead. If the instruction address counter did arrive at the key table space, due to a malfunction or a cyber attack for example, each address would be read as a NOP, in which case the instruction address counter would then cycle up to the first address in the boot sequence and re-boot.

Upon finishing the boot instructions, the processor automatically begins executing the operating system 1603 instructions, which is positioned immediately above the boot sequence. In some embodiments, the last instructions in the boot sequence may be to send a message to the hub device indicating that the re-boot has finished, and the first instructions in the operating system may to wait for a message from the hub device. In other embodiments, the operating system may automatically begin doing something pre-configured, such as taking measurements periodically or entering a DRX sleep cycle.

Upon receiving and demodulating a downcast message, the operating system 1603 interprets the message as a command. For example, the end device may execute a pre-configured routine associated with the command. The routine may be stored somewhere in the operating system 1603, and may be configured to cause the end device to perform a measurement or activate an actuator. In some embodiments, the routine also includes replying to the hub device, either after receiving the message (such as an acknowledgement) and/or after completing the assigned task (such as a pre-configured "done" message).

In some embodiments, the last instruction of each command routine may be to reset the instruction address counter to the a particular instruction of the operating system 1603. The particular instruction may be to wait for the next hub command. Alternatively, if the end device is instructed to begin doing something repetitively, such as periodically measuring or activating, or entering a DRX sleep cycle, for example, then the last instruction of those autonomous routines would be to reset the instruction address counter to the first address of that autonomous routine, thereby causing the end device to continue repeating the routine until instructed to stop. Alternatively, and more commonly, the periodic task may be triggered by an internal timer in the processor, which causes an interrupt when the timer expires. In that case, the end of the routine would include resetting the timer and returning to a wait state of the operating system. When the interrupt occurs, it generally includes or indicates the address of the periodic routine that is to be executed at that time.

Figure 16B:
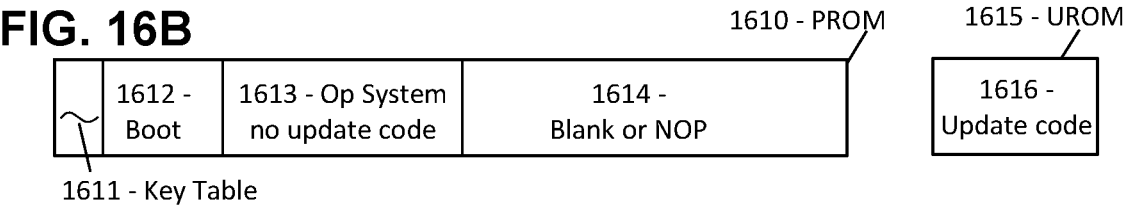

FIG. 16B depicts the secure memory of an end device as a PROM 1610 and an unalterable UROM 1615. The PROM 1610 contains the key table 1611, the boot sequence 1612, the operating system 1613, but not the instructions related to updating or installing new firmware, followed by a final blank or NOP section 1614. The UROM 1615 contains the instructions 1616 for updating and installing new firmware. An advantage of placing the updating instructions 1616 in a separate memory 1615 may be that the processor can execute the updating instructions 1616 while the main memory PROM 1610 is erased or partially over-written. For some types of ROM, it is difficult to install new instructions into a memory while executing instructions from that memory. Another advantage may be that a hacker cannot alter the installation instructions 1616 since they are secured separately, thus eliminating vulnerabilities related to the updating process.

Figure 16C:
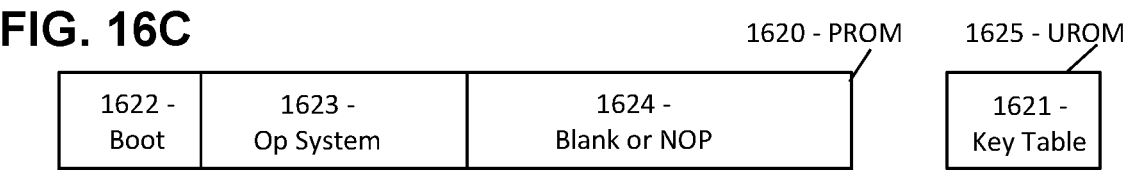

FIG. 16C depicts secure memories of an end device, including a PROM 1620 and a UROM 1625. In this case the PROM 1620 includes a boot sequence 1622 starting at address 0000, followed by the operating system 1623, then the unused section 1624. In this case, the operating system 1623 includes the updating instructions. The UROM 1625 holds the single-use key table 1621. An advantage of placing the key table 1621 in unalterable memory 1625 may be that the single-use keys 1621 may thereby remain safe from accidental alteration or deliberate sabotage by a hacker. An advantage of placing the boot sequence 1622 at the bottom of the PROM 1620 may be that a re-boot can then be implemented simply by clearing (that is, setting to zero) the instruction address counter, without bothering about non-executable addresses and the like. In this case, all of the PROM memory addresses are executable, although the higher section 1624 contains only null instructions. Another advantage may be that if the processor somehow gets into the blank section 1624, it will simply advance to the end without doing anything, roll over to address zero, and continue executing there, which is the beginning of the boot sequence 1622. Thus any glitch causing an incursion into the blank area 1624 inevitably triggers an automatic re-boot.

Figure 16D:
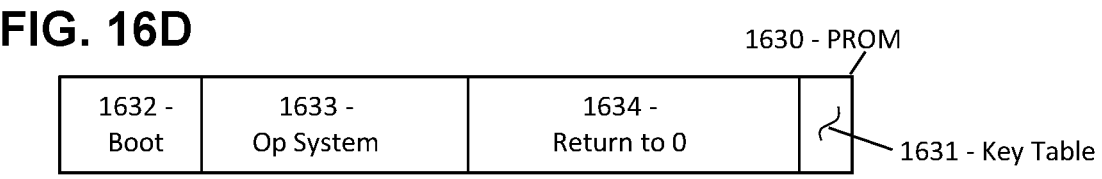

FIG. 16D depicts a PROM 1630 of an end device containing the boot sequence 1632 starting at the bottom address 0000, followed by the operating system 1633, then a blank section 1634 which is filled with instructions to clear the instruction address counter. Thus each instruction of the blank section 1634 sends the processor back to the first instruction of the boot sequence 1632, as desired. The last section is the single-use key table 1631, which is protected from incursion by the reset commands of the blank section 1634.

Figure 16E:
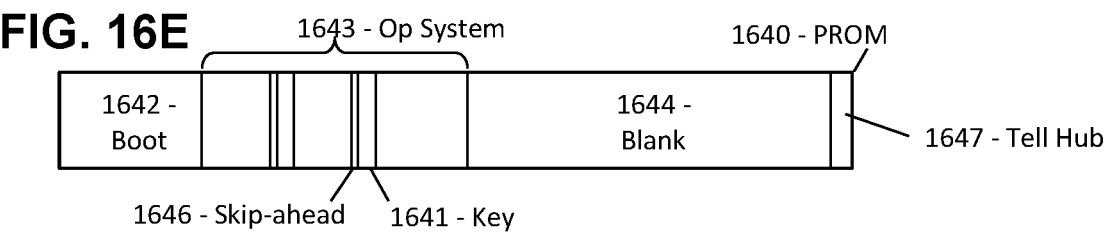

FIG. 16E depicts a PROM 1640 of an end device including first a boot sequence 1642, then an operating system section 1643, followed by a blank section 1644. The operating system section 1643 includes the the single-use keys 1641 inserted at multiple places, such as N places where N is the number of single-use keys. Each single-use key 1641 is preceded by a "jump-ahead" instruction 1646 which instructs the processor to jump over the single-use key and continue executing thereafter. Only two such portions are depicted for clarity, but the intent is to store all of the single-use keys interleaved with the operating system instructions.

In this case, the top of memory includes a special set of instructions 1647 labeled "Tell Hub". The purpose here is to transmit a message to the hub device whenever the processor erroneously begins executing anything in the blank area 1644. The instruction address counter then steps through all the NOP instructions until reaching the Tell Hub section 1647, which causes the end device to transmit an alarm message to the hub device, informing it that something is amiss in the end device, and that it is about to re-boot itself. The hub device may thereby be warned that a hacker may be loose or that the end device has some kind of malfunction, since the end device should never try to execute anything in the blank section 1644.

Figure 16F:
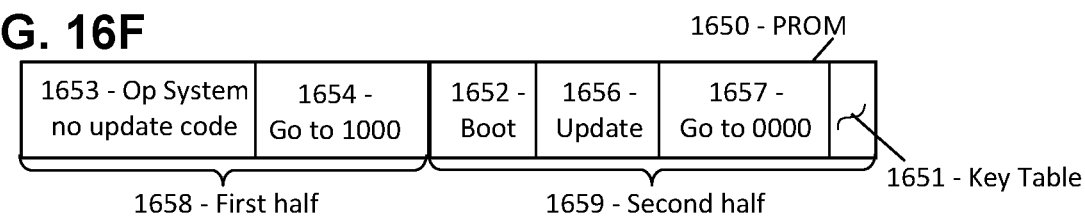

FIG. 16F depicts a PROM 1650 of an end device, divided into two halves, a first half 1658 and a second half 1659. For example, addresses in the first half 1658 may start with 0 and in the second half 1651 may start with a 1. The first half 1658 includes the operating system 1653, but with no updating and installation instructions. This is followed by a blank section filled with instructions to go to the first address of the second half 1659, which in this case would be hex-1000. The second half 1659 includes the boot sequence 1652, followed by an updating and installation code 1656, followed by a blank section 1657 filled with instructions to clear the instruction address counter, or equivalently, go to 0000 which is the first instruction of the operating system 1653. Finally the key table 1651 is at the top of the second half 1659. The last instruction of the boot sequence 1652 in this case is to clear the processor instruction address counter to 0000, which automatically starts the operating system 1653 after each re-boot, and also protects the updating section 1656 from unintentional intrusion.

An intent of the first blank section 1654 filled with instructions to go to 1000 may be to force an immediate re-boot if the processor ever tries to execute an instruction in the first blank area 1654. An intent of the second blank area 1657 filled with instructions to go to 0000 may be to begin running the operating system 1653 automatically as soon as the updating instructions 1656 are finished. Another intent may be to protect the single-use key table 1651 from unintentional access. Only the updating instructions 1656 can access the range of addresses corresponding to the key table 1651.

As a further security feature, the processor may be configured to interpret all addresses that start with a 1, that is, all addresses in the second half 1659, as non-executable during normal operations, other than re-booting. The update installation message may provide the ability to access to the second half 1659 for updating. For example, upon receiving an installation message from the hub device, the processor may enable access to the second-half 1659 and begin executing at the first instruction of the update section 1656. The update section 1656 can then retrieve just one of the single-use keys 1651 according to an index provided by the installation message. In this way, the second half 1659 is off-limits except for re-booting and updating.

Figure 16G:
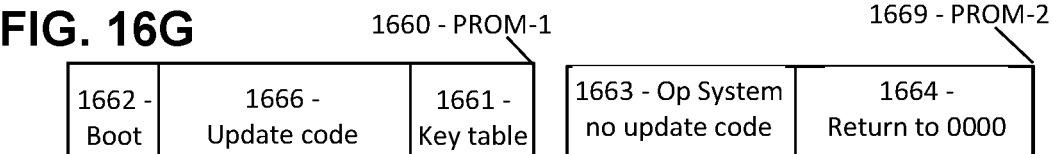

FIG. 16G depicts two PROM memories in an end device. A PROM-1 1660 includes a boot sequence 1662 starting at the first address, followed by an update installation code 1666, and finally a single-use key table 1661. Blank regions are not shown, but may be added to separate those three regions. Those blank regions may be filled with commands to re-boot. The blank regions may also include informing the hub of the problem. PROM-2 1669 includes an operating system 1663 with no updating or installation instructions, followed by a blank region 1664 filled with instructions to return to address zero, which is the start of the boot sequence 1662. An advantage of using two PROM memories may be that one of them (PROM-2 1669) can be updated with a new operating system, while the other one (PROM-1 1660) manages the updating process. Another advantage may be that PROM-1 1660 contains routines and data that are unlikely to change, whereas the operating system 1663 is likely to change whenever the tasks of the sub-network change.

In some embodiments, PROM-1 can also be changed, using instructions that may be present in PROM-2 1669 for example. In that case, the key table 1661 may be refreshed by a PROM-1 update, enabling an unlimited number of system updates. Allowing PROM-1 to be updated also enables installation of an improved update code. If PROM-1 is the type of memory in which individual addresses can be re-written, then each single-use key may be deleted when it is used, or optionally replaced by a new key.

The memory configurations of FIGS. 16A-G are not exhaustive presentations of options for secure memory configurations in the end devices. Further embodiments, not shown here, include the option of storing the key table and/or the update code in a small secure memory within the processor, which may be considered as a separate ROM in some embodiments. Artisans may devise other memory configurations after reading this disclosure, without departing from the present principles.

Figure 17:
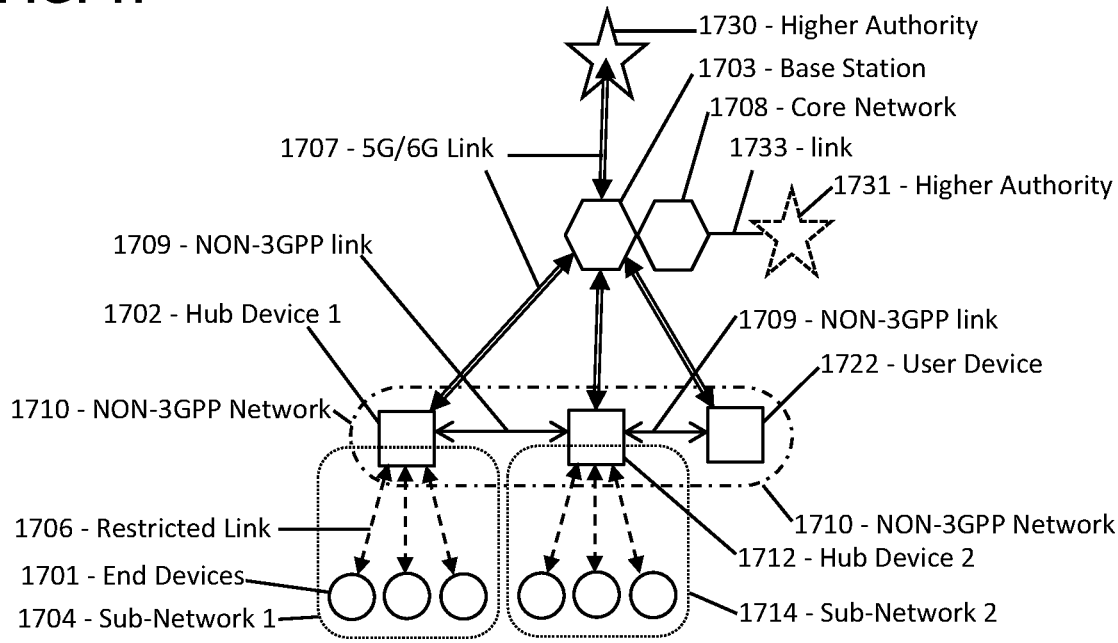
FIG. 17 is a schematic showing an exemplary embodiment of hub devices belonging to multiple networks, according to some embodiments.

FIG. 17 is a schematic showing an exemplary embodiment of hub devices belonging to multiple networks, according to some embodiments. As depicted in this non-limiting example, hub devices are regular user devices of a 3GPP network, and a sub-network for managing the end devices, and also a third network for direct hub-to-hub communication. The third network may be a sidelink or ad-hoc or non-3GPP network that includes other hub devices, and optionally the other non-hub user devices of the larger network. The third network may provide communication capabilities that the larger network cannot, such as real-time cooperation.

The figure depicts a higher authority 1730 communicating on a 5G/6G link 1707 as a regular user device to a base station 1703. Alternatively, in dash, the higher authority 1731 may communicate by a wired or other type of link 1733 to the core network 1708 which is in contact with the base station 1703. The base station 1703 is in 5G/6G communication 1707 with a first hub device 1702, a second hub device 1712, and another user device 1722 which is not a member of a sub-network. The two hub devices 1702, 1712 communicate via restricted links 1706 with end devices 1701, thereby forming a first sub-network 1704 and a second sub-network 1714.

In addition, the two hub devices 1702, 1712 and the other user device 1722 belong to a non-3GPP network 1710 (dot-dash enclosure). The hub devices 1702, 1712 and the other user device 1722 communicate with each other via non-3GPP network links 1709 (plain arrows). The non-3GPP network 1710 may be, for example, a Wi-Fi network or other grant-free type of network, of which many choices exist. Alternatively, the third network may be a new sidelink "mode-3" network which is allocated by the 3GPP network to provide real-time communications opportunities between hubs and user devices, without interfering with the managed 3GPP channels.

The three network types (that is, the 3GPP network, the sub-networks, and the non-3GPP hub-to-hub network) may support operations and cooperation among devices. In addition, communications may be supported that would be cumbersome (or in some cases impossible) on the 3GPP network, due to the tightly managed messaging opportunities and complex requirements of 3GPP standards. For example, the hub devices 1702, 1722 may need to exchange information with each other or with the user device 1722 in real-time, in a synchronization task or cooperative task for example. Passing information up to the base station 1703, after obtaining multiple grants, and then transferring the information to the recipient after detecting a control-type scheduling message, clearly involve a number of unpredictable time delays. In contrast, the non-3GPP links 1709 may be grant-free and asynchronous, thereby enabling the transmitting entity to transmit at will. In many applications involving coordination among hub devices, such real-time versatility may be enabling, as shown in the following example.

Figure 18:
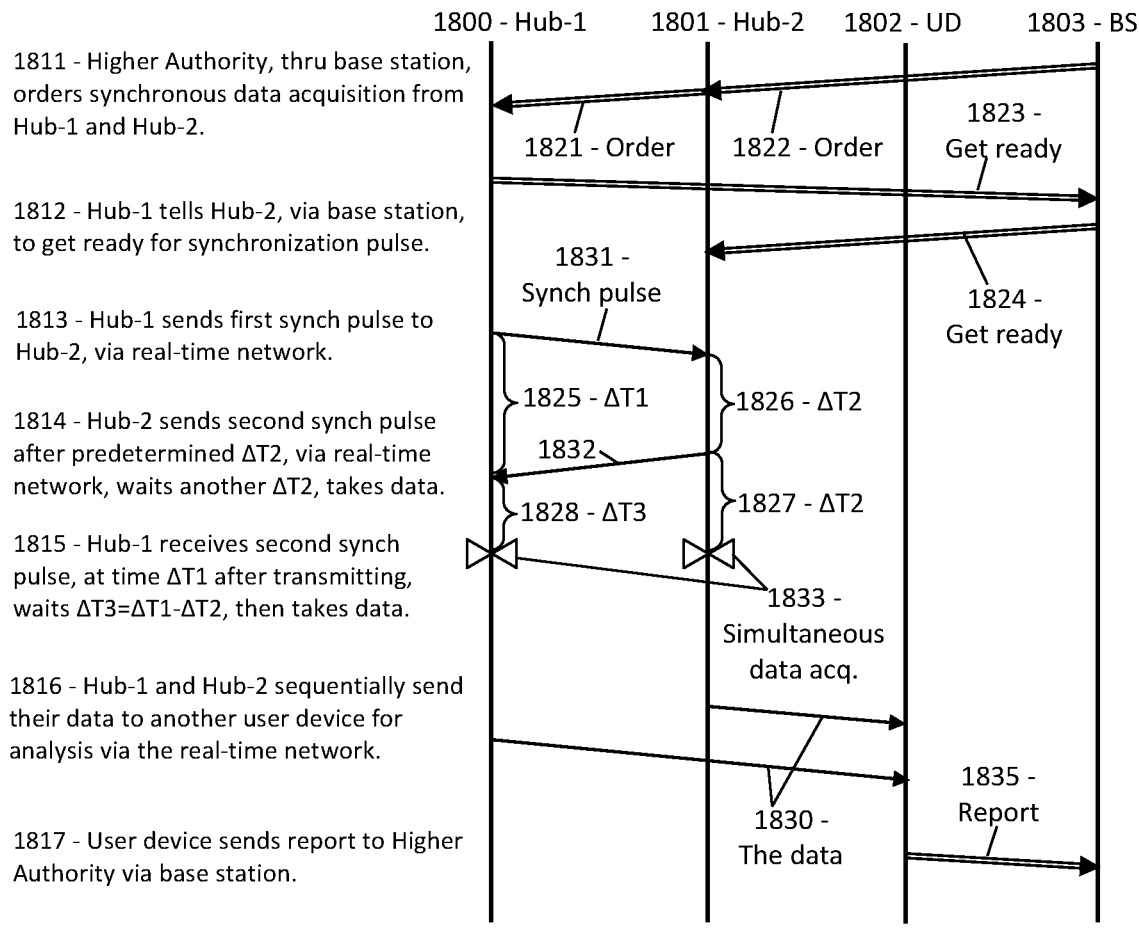
FIG. 18 is a chart showing an exemplary embodiment of communications between hub devices belonging to multiple networks, according to some embodiments.

FIG. 18 is a chart showing an exemplary embodiment of communications between hub devices belonging to multiple networks, according to some embodiments. As depicted in this non-limiting example, two hub devices synchronize their data acquisition using a separate ad-hoc network that provides real-time signaling.

Across the top are the item labels including a hub-1 device 1800, a hub-2 device 1801, a user device 1802 of a 3GPP network, and the base station 1803. Communications on the 3GPP network are shown as doublewide arrows. Communications on the real-time network are shown as plain arrows. No communications with the end devices are depicted in this example.

At 1811, a higher authority transmits an order 1821, 1822 to hub-1 and hub-2 1800, 1801 to perform a simultaneous data acquisition. At 1812, hub-1 transmits a get-ready message 1823 to hub-2 via the base station 1803, and the base station transmits the downlink get-ready message 1824 to hub-2.

At 1813, hub-1 transmits a first synchronization pulse 1831 on the real-time network including a timestamp point that indicates a particular time. At 1814, hub-2 receives the first synchronization pulse 1831, waits a predetermined time interval ΔT2 1826 after the timestamp point, and then transmits another timestamp point in a second synchronization pulse 1832 on the real-time network. At 1815, hub-1 receives the second synchronization pulse 1832 and determines a time interval ΔT1 labeled 1825, between transmitting the first timestamp point and receiving the second timestamp point. Hub-1 then waits ΔT3 1828 equal to ΔT1−ΔT2, and then takes data at a time indicated as 1833. In the mean time, hub-2 waits an additional ΔT2 1827 after transmitting the second synchronization message 1832, and then takes data 1833. Due to the exchange of timestamp point messages 1831, 1832 on the real-time network, the two data acquisitions 1833 are simultaneous, as required.

In this example, the time delay between a hub transmitting an instruction to an end device, and the end device executing the instruction, is negligible, or at least is the same for the two sub-networks, so that delay cancels out. If the response times are not the same, then the difference in response times may be calibrated in advance and corrected for.

At 1816, hub-1 and hub-2 sequentially transmit their data 1830 to another user device 1802 which is not a hub of a sub-network; the user device 1802 is just a regular user device of the larger network. For example, the user device 1802 may be responsible for accumulating and analyzing the data 1830, and then 1817 transmitting a report 1835 to the higher authority via the base station 1803 on the 3GPP network.

In this example, the real-time network is an unmanaged, asynchronous network that allows members to transmit at will, without a grant or a scheduling request, directly to another device. The hub-1 and hub-2 devices chose to exchange their synchronization messages on the real-time network to avoid the timing uncertainties of 3GPP protocols which require users to wait for an SR opportunity, then submit a scheduling request, then submit a BSR message when permitted, then transmit the message when permitted, and then wait for a control message to the recipient on downlink, and then finally receive the message at the destination. In addition, signals on 3GPP networks have an unavoidable timing granularity equal to one symbol-time which, depending on the numerology, ranges from multiple microseconds to multiple tens of microseconds. On the real-time network, on the other hand, hub-1 can transmit the first synchronization pulse 1831 whenever convenient, and hub-2 can transmit the second synchronization pulse 1832 exactly ΔT2 after detecting the timestamp point in the first message 1831, without delays. In addition, on the non-3GPP network, devices may be permitted to transmit occasional brief pulses with high bandwidth, thereby enabling sharper timing. The two hub devices can therefore time their data acquisitions 1833 with much higher precision, using the real-time network for coordination. It is likely (depending on the implementation) that the two hub devices can arrange to acquire their data within a few nanoseconds, or better, using the real-time signaling with the depicted protocol, which may be difficult or impossible to achieve on the larger network.

To avoid interference and contention problems, the two hub devices may transmit a keep-silent command to their end devices upon receiving the get-ready messages. This may cause the end devices to withhold upcast messages until the hub devices have completed their synchronized task.

Figure 19:
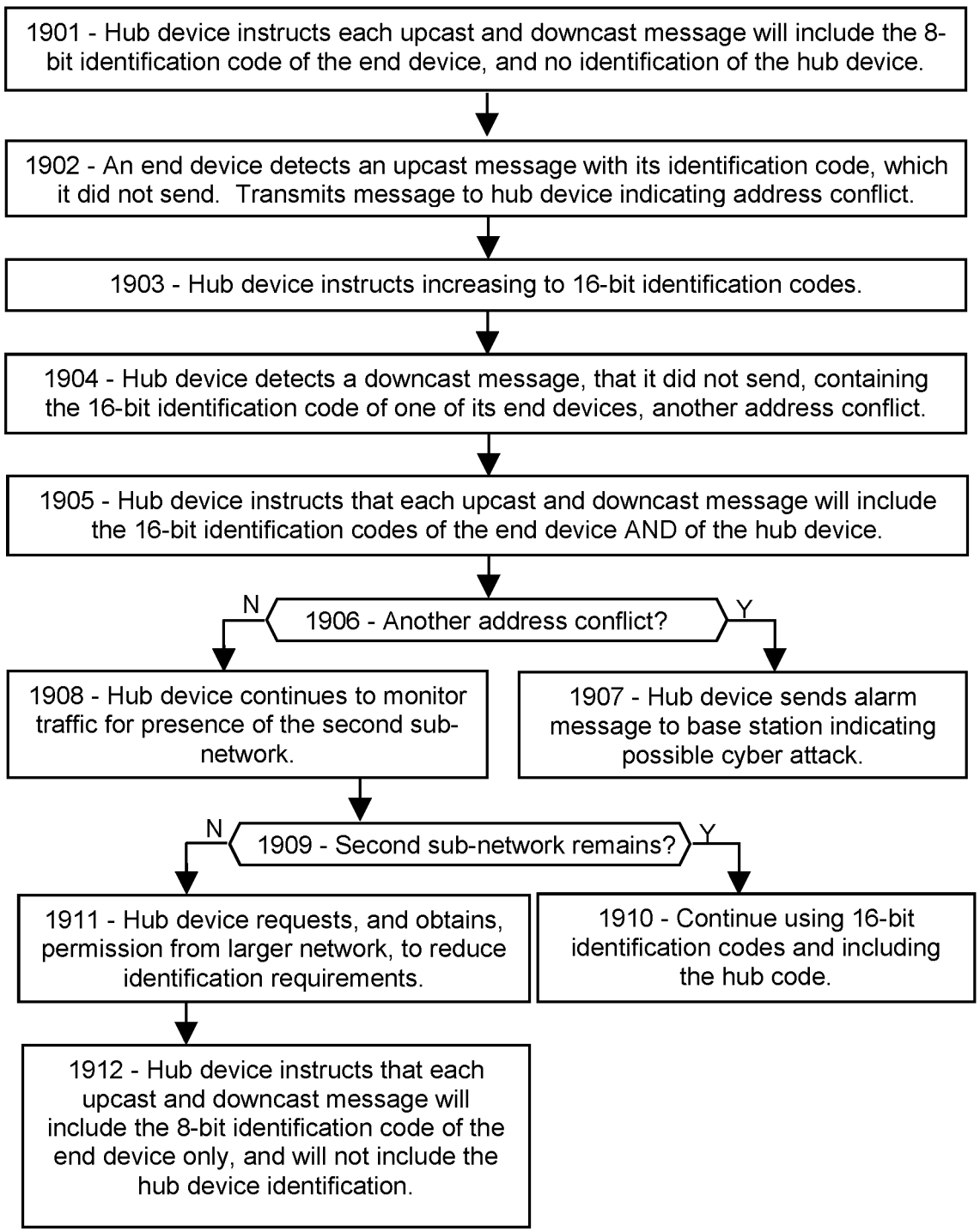
FIG. 19 is a flowchart showing an exemplary embodiment of a procedure for selecting identification codes, according to some embodiments.

FIG. 19 is a flowchart showing an exemplary embodiment of a procedure for selecting identification codes, according to some embodiments. The flowchart items may be executed in any order. As depicted in this non-limiting example, a sub-network increases its identification code requirements in response to address conflicts with another sub-network that happens to be using the same local identification codes.

At 1901, the hub device of a first sub-network instructs its end devices to use their short 8-bit local identification codes in each upcast message, and to expect each downcast message to also include the recipient end device's 8-bit identification code. Also, no need to include the hub's identification since there is no conflicting traffic nearby.

At 1902, however, one of the end devices detects an upcast message, which it did not send, and which includes that end device's 8-bit identification code. This is an address conflict, indicating that a second sub-network has come within radio range and is using the same identification code for at least one of its end devices. The end device tells the hub device.

At 1903, the hub device instructs its end devices to begin using their 16-bit identification codes, to avoid further address conflicts. Now, since the second sub-network is still within radio range, those end devices may have received that instruction at the same time as the first sub-network end devices. Thinking that the instruction was intended for them, the second sub-network end devices may also switch to their 16-bit codes. The hub of the second sub-network probably also received the instruction message from the first hub device, and may have deduced that it came from the hub of the first sub-network due to address conflicts. Therefore, the second hub device decided that upswitching the identification codes is a good idea, and therefore took no action, thereby allowing the second sub-network to switch to the 16-bit codes at the same time as the first sub-network.

In another embodiment, each hub device may be configured to include, in each broadcast message, the identification code of the hub device by default. In that case, there would be no confusion regarding which sub-network had changed to the 16-bit codes. After detecting the first hub device's instructions to its own end devices to switch to the 16-bit ID codes, the second hub device may do the same and instruct its end devices to switch to the 16-bit codes too. In other cases, the second hub device may decide to keep using the 8-bit identification codes. Such decisions may depend on the implementation, or may rely on the larger network for arbitration.

At 1904, at a later time, the hub device of the first sub-network detects a downcast message, which it did not send, including the 16-bit address of one of its end devices. This is another address conflict.

At 1905, therefore, the hub device of the first sub-network instructs that its end devices should begin adding the 16-bit identification code of the hub device to all of their upcast and downcast messages, in addition to the 16-bit identification codes of the end device. As mentioned, the hub device may sign this instruction with its own 16-bit identification code so that the end devices of the first and second sub-networks will know which end devices are intended.

At 1906, the hub device and the end devices watch for any more address conflicts. They don't expect any, because the 16-bit identification codes for the end devices and the 16-bit identification codes for the hub device, in each message, represents a high threshold for coincidental conflict.

At 1907, however, another address conflict is detected. This raises the suspicion that a hacker is afoot, so the hub device sends a message to the base station alerting that a hacker may be attempting to spoof the end devices or the hub device. After that, depending on implementation, the hub device may instruct its end devices to re-boot or take other security measures. The hub device may change its own identification code to a different random value, and inform its end devices of the change. The hub device may instruct that the longer 32-bit codes be used instead of the 16-bit codes. The larger network may require further steps to isolate the possible cyber attack, or diagnose the problem if not a cyber attack.

At 1908, on the other hand, there are no further address conflicts. The hub device continues to monitor the presence of the second sub-network by detecting messages signed by the hub device of the second sub-network, for some period of time.

At 1909, the hub determines whether the second sub-network is still within radio range. If so, at 1910, the hub device allows its end devices to continue using the 16-bit identification codes and including the hub code in each message.

At 1911, the hub device has found that the second sub-network is no longer within radio range, based on a lack of messages signed by the hub device of the second sub-network for some period of time. In some embodiments, the hub device may instruct its end devices to switch back to the 8-bit codes without further delay. In other embodiments, the hub device may be required to obtain permission from the larger network before making the switch. For example, the larger network may manage the identification requirements of the sub-networks, because the larger network likely knows which sub-networks are in proximity with other sub-networks in its domain, and likely knows which sub-networks are performing critical tasks and which ones may be delayed. In the depicted case, the larger network agrees that the sub-network can reduce its identification requirements.

At 1912, the hub device instructs its end devices to revert to the original 8-bit identification codes, and to omit the hub code, in all upcast and downcast messages.

In some embodiments, when address conflicts occur, the larger network may direct that a first sub-network can use the shorter codes while a competing second sub-network must use the longer codes. This may be based, for example, on the larger network placing higher priority on the first sub-network's activities.

In some embodiments, the larger network may allocate time for sub-networks to communicate, and may allocate different time intervals for the two sub-networks, thereby eliminating address conflicts even if the two sub-networks have the same end device identification codes, since the two hubs have different allowed times.

In some embodiments, the competing hub devices may agree on a particular signal that differentiates the messages in the two sub-networks. For example, one sub-network may begin all messages with a first demodulation reference while the second sub-network may use a second and different demodulation reference. For example, the first sub-network may precede messages with a short-form demodulation reference consisting of a 90-degree phase signal followed by a 270-degree phase signal, whereas the second sub-network may use a 270-degree signal followed by a 90-degree signal, or equivalent. Alternatively, one sub-network may precede messages with a single pulse signal followed by a gap of no transmission, while the other may use two pulses followed by a gap.

In some embodiments, the hub devices may change their identification codes, or the identification codes of their end devices, to disambiguate the messages. For example, the hub devices may communicate through the larger network to agree on the new, and different, hub identification codes, and then may inform their end devices of the change.

In some embodiments, the larger network may manage such conflicts and resolutions for benefit of the higher authority or the plant productivity. For example, the larger network may direct the hub devices, that are known to be proximate to each other, to use communication methods and identification code versions to avoid future address conflicts, which may be different for each sub-network in the plant. For example, a sub-network responsible for controlling a critical process flow may be permitted to use the fast 8-bit identification codes, while another sub-network responsible for custodian work may be required to use the slower 16-bit versions.

In some embodiments, an AI model may be configured to manage the sub-networks including identification protocols and formats. The AI model may take as input the responsibilities and capabilities of each sub-network in the plant, and current process conditions in the plant, and may provide as output a series of instructions to the hub devices, instructing them as to tasks, protocols, identification types, and the like.

Figure 20:
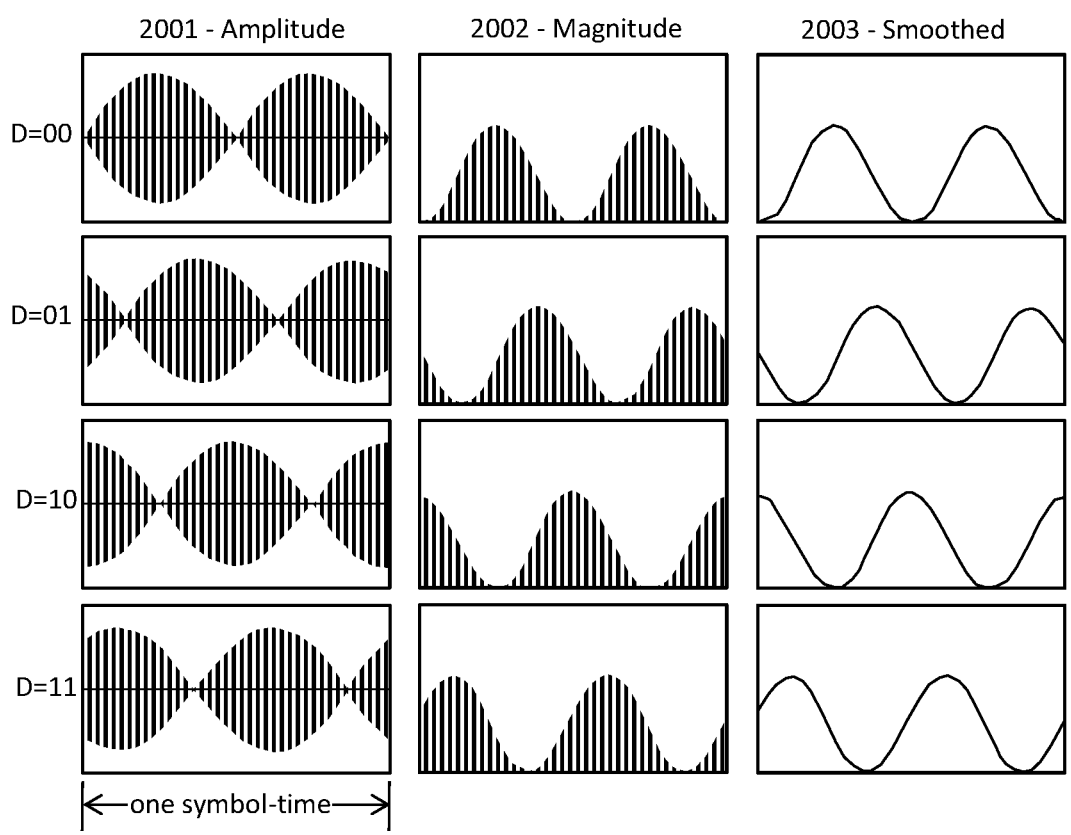
FIG. 20 is a chart showing an exemplary embodiment of interference signals from phase-modulated subcarrier signals, according to some embodiments.

FIG. 20 is a chart showing an exemplary embodiment of interference signals from phase-modulated subcarrier signals, according to some embodiments. As depicted in this non-limiting example, a transmitter is transmitting a message time-spanning on two adjacent subcarriers, and has arranged the initial relative phase of the two subcarrier signals to differ by 0, 90, 180, or 270 degrees according to the message bits D which are 10, 01, 00, and 11 in binary, respectively. The two signals interfere because they have slightly different frequencies. The four different interference patterns are the result of imposing four different phase relations between the two subcarrier signals. For low-cost receivers in an LC-IoT sub-network, demodulating a message according to the interference patterns may be simpler and cheaper than separating the subcarrier signals using expensive high-frequency signal processing.

In some embodiments, the two interfering subcarrier signals may generate a "beat frequency" equal to the difference in the two frequencies. For example, the beat frequency may be in the audio region even when the signals themselves are in the radio frequency region. The beat frequency may have any number of interference wavelengths in the symbol-time, depending on the subcarrier frequency difference and the length of the symbol-time. In some embodiments, the number of interference wavelengths is arranged to be one wavelength per symbol-time, that is, the faster subcarrier frequency advances by one more cycle than the other subcarrier frequency in the duration of a single symbol-time. In the depicted example, however, the symbol-time is arranged to be twice as long, so that there are two interference wavelengths in one symbol-time. Usually the number of interference wavelengths per symbol-time is an integer so that the adjacent subcarrier signals are "orthogonal" in the sense of zero crosstalk when integrated over the entire symbol-time, but this is not a necessity and non-orthogonal configurations exist. The choice of two interference wavelengths per symbol-time for the depicted cases may provide improved SNR and easier demodulation for low-complexity receivers that have minimal communication requirements. The principles disclosed may apply to any number of interference wavelengths per symbol-time, including fractional wavelength numbers, since orthogonality is irrelevant when the two subcarrier signals are processed together, as a vector sum signal.

In each chart, the interference pattern includes two "peaks" or maximum amplitude regions separated by minima or "valleys". The two peaks correspond to times when the two subcarrier signals interfere constructively, and the valleys correspond to times when they interfere destructively, for the present case in which the symbol-time includes two wavelength differences between the two subcarrier frequencies. As is apparent, the positions of the peaks and valleys depend on the initial phase difference between the two subcarrier signals, and hence on the bit content D of the message element.

In a first column of traces, the amplitude 2001 of the received sum-signal is shown for one symbol-time of a message. The depicted traces correspond to the sum-signal received by a low-complexity receiver of the type that does not separate the two subcarrier signals, but instead receives them both added together, resulting in the interference pattern shown for each value of D.

In the second column, the receiver has determined a magnitude 2002 of the amplitudes 2001. For example, a diode bridge may be used to obtain the magnitude signals 2002. The two peaks in the magnitude traces correspond to the two amplitude enhancements in the corresponding amplitude trace.

In the third column, the magnitude signals 2002 are smoothed 2003 or low-pass filtered, to suppress the RF structure, leaving just a smoothed envelope pattern with a frequency in the audio range such a 15 kHz signal. Depending on how the smoothing is done, the smoothed signals 2003 may be positive-only as shown, or they may be zero-centered.

A low-cost reduced-capability receiver may receive the sum-signal on two adjacent subcarriers as an interference amplitude 2001 as shown, and may rectify the signal producing the magnitude 2002 as shown, and may smooth the magnitude to obtain the smoothed signals 2003 as shown. The receiver may then determine the bit content of the message element (that is, demodulate the message element) according to the timing of the peaks and valleys of the smoothed signals 2003. Alternatively, the receiver may determine the phase of the audio-range signal and determine the bit content accordingly. Such a phase/timing determination may be simpler and cheaper to implement in the audio range than in the full RF range where expensive signal processing technology is required to demodulate 3GPP signals, for example.

In some embodiments, the receiver may determine the sign of the interference as well as the magnitude. In that case, the receiver may demodulate the message element by determining a zero-cross time of the interference signal instead of determining a minimum-amplitude point. Greater time precision may be obtained thereby.

In some embodiments, the receiver may use a multiplication circuit for the rectification instead of a diode bridge. For example, the received signal may be converted to a rectified signal using a squaring circuit that outputs a square of the analog input signal, or a product circuit that outputs a product of two analog input signals in which the two inputs are tied together, among other ways to rectify the interference signal.

In some embodiments, the transmitter may additionally leave two other subcarriers blank, immediately above and below the two signal-carrying subcarriers, to further isolate the interfering signals and avoid unnecessary crosstalk with other messages.

In some embodiments, an AI model may be used to analyze the smoothed audio-frequency signal to discern the most likely bits of the original message. Since the subnetwork is generally limited to low power transmission, and may be in an electromagnetically noisy environment, the SNR of the received signals may be marginal. Repeated NACKs may indicate a noise or reception problem. In that case, the AI model may be configured to take the smoothed audio-frequency interference signal of each message element, process each signal using a trained AI pattern-recognition model, and provide as output the most likely bit sequence involved, or alternatively a likelihood for each of the possible bit sequences of the modulation scheme. In this way, the AI model may account for a myriad of subtle distortions and still provide an optimal, or at least superior to humans, demodulation of the message.

Many applications of LC-IoT subnetworks involve basic end devices with severe cost constraints and very minimal communication requirements. In such applications, encoding the message data as a phase difference between two interfering subcarrier signals may enable very inexpensive demodulation, thereby making the overall application economically viable which may not be feasible otherwise.

CONCLUSIONS

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security. Artificial intelligence models and/or machine learning may be used to adjust parameters of the systems and methods disclosed herein, for example by finding correlations among those parameters that may be impossible for a human to comprehend due to their complexity, but which may enable substantial improvements in performance of the systems and methods.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A wireless network comprising a base station and a plurality of user devices in signal communication with the base station, the base station comprising a wireless transmitter configured to transmit messages to the user devices of the plurality, and a wireless receiver configured to receive messages from the user devices of the plurality, wherein:
    a) a particular user device of the plurality of the user devices comprises a hub device of a sub-network, the sub-network comprising a plurality of end devices, each end device comprising a sensor or actuator, and the hub device comprising a gateway device between the end devices and the base station;
    b) wherein each end device is configured to communicate wirelessly with the hub device and to avoid communicating with the base station;
    c) wherein each end device comprises a read-only memory ("ROM") containing a boot sequence and an operating system, the operating system comprising instructions enabling the end device to perform sensor measurements or actuator actuations, and the boot sequence comprising instructions for restoring the end device to a predetermined state;
    d) wherein each end device is configured to execute the boot sequence upon receiving a re-boot instruction from the hub device; and
    e) wherein each end device is further configured to transmit a message to the hub device, during or after executing the boot sequence, indicating that the end device is executing or has executed the boot sequence.

2. The wireless network of claim 1, wherein the user devices are configured to communicate with the base station according to 5G or 6G technologies.

3. The wireless network of claim 1, wherein each end device is further configured to periodically execute the boot sequence, according to a predetermined periodicity.

4. The wireless network of claim 1, wherein each end device is further configured to execute the boot sequence according to random or pseudorandom intervals.

5. The wireless network of claim 1, wherein each end device is further configured to execute the boot sequence after completing each sensor measurement or actuator actuation, or upon attempting and failing to complete each sensor measurement or actuator actuation.

6. The wireless network of claim 1, wherein each end device is further configured to execute the boot sequence after transmitting data to the hub device, unless previously instructed by the hub device to withhold executing the boot sequence after transmitting data to the hub device.

7. The wireless network of claim 1, wherein each end device is further configured to execute the boot sequence after detecting evidence of a cyber attack.

8. The wireless network of claim 7, wherein the evidence of a cyber attack comprises unusual or unexpected data acquired by the end device, as determined by a processor of the end device.

9. The wireless network of claim 7, wherein the evidence of a cyber attack comprises receiving, by the end device, an unusual or unexpected message, as determined by a processor of the end device.

10. A wireless network comprising a base station and a plurality of user devices in signal communication with the base station, the base station comprising a wireless transmitter configured to transmit messages to the user devices of the plurality, and a wireless receiver configured to receive messages from the user devices of the plurality, wherein:
    a) a particular user device of the plurality of user devices comprises a hub device of a sub-network, the sub-network comprising a plurality of end devices, each end device comprising a sensor or actuator, and the hub device comprising a gateway device between the end devices and the base station;
    b) wherein a particular end device of the plurality of end devices is configured to set an actuator to a particular state, of a plurality of predetermined states, and to record the particular state in a state memory of the end device;
    c) wherein the particular end device is further configured to determine, at a later time, whether the actuator is still set to the particular state;

d) wherein, upon determining that the actuator is still set to the particular state at the later time, the particular end device is configured to do nothing until instructed by the hub device to set the actuator to a different state; and e) wherein, upon determining that the actuator is set to any state different from the particular state at the later time, the particular end device is configured to transmit a message to the hub device indicating that the actuator has spontaneously changed.

11. The wireless network of claim 10, wherein the particular end device is further configured to determine whether the actuator is still set to the particular state, before setting the actuator to another state different from the particular state.

12. The wireless network of claim 10, wherein the particular end device is further configured to compare a current state of the actuator to the state memory at a later time, and thereby determine whether the actuator is still set to the particular state at the later time.

13. The wireless network of claim 12, wherein the particular end device is further configured to leave the state memory unchanged when a boot sequence is executed.

14. The wireless network of claim 10, wherein the particular end device is further configured to, upon determining that the actuator is set to a state different from the particular state:

a) sequentially set, or attempt to set, the actuator to each state of the plurality of predetermined states, and then determine whether the actuator was thereby set to the state that the particular end device set or attempted to set; and b) then transmit a message to the hub device indicating whether the actuator was or was not set sequentially to each of the predetermined states.

15. A wireless network comprising a base station and a plurality of user devices in signal communication with the base station, the base station comprising a wireless transmitter configured to transmit messages to the user devices of the plurality, and a wireless receiver configured to receive messages from the user devices of the plurality, wherein:

a) a particular user device of the plurality of user devices comprises a hub device of a sub-network, the sub-network comprising a plurality of end devices, each end device comprising a sensor or actuator, the hub device comprising a gateway device between the end devices and the base station;

b) wherein the particular hub device is configured to instruct a particular end device to perform a self-test and then transmit a report message to the hub device indicating a result of the self-test;

c) wherein the hub device is further configured to compare the result of the self-test to a predetermined value, thereby determining whether the result of the self-test is correct;

d) wherein the hub device is further configured to measure an elapsed time between instructing the particular end device to perform the self-test and receiving the report message, and to compare the elapsed time to a predetermined time, thereby determining whether the elapsed time is consistent or inconsistent with the predetermined time; and e) wherein the hub device is further configured, upon determining that the elapsed time is inconsistent with the predetermined time, to transmit an alarm message to the base station, the alarm message indicating that the particular end device is experiencing either a malfunction or a cyber attack.

16. The wireless network of claim 15, wherein the hub device is configured to transmit the alarm message, upon determining that the elapsed time is inconsistent with the predetermined time, regardless of whether the self-test result agrees with the predetermined value or not, wherein the self-test result agrees with the predetermined value when the self-test result is consistent with the predetermined value, and the self-test result fails to agree with the predetermined value otherwise.

17. The wireless network of claim 15, wherein the predetermined time is a time interval previously measured by the particular user device while the particular end device performs the self-test and transmits the report message.

18. The wireless network of claim 15, wherein the predetermined time is a time interval previously calculated to be sufficient for the particular end device to perform the self-test and transmit the report message.

19. The wireless network of claim 15, wherein the particular end device is configured to transmit the report message asynchronously, as soon as the self-test is finished.

20. The wireless network of claim 15, wherein the self-test comprises determining an error-detection code comprising a hash or parity construct or cyclic redundancy code of at least one of:

a) a read-only memory ("ROM") of the particular end device;

b) a boot sequence of the particular end device;

c) an operating system of the particular end device;

d) registers contained in a processor of the particular end device;

e) current contents of a random-access ("RAM") of the particular end device;

f) contents of a random-access ("RAM") of the particular end device after the RAM has been erased by the particular end device; or g) combinations of these.

* * * * *